US011682161B2

(12) United States Patent
Smith-Lacey et al.

(10) Patent No.: US 11,682,161 B2
(45) Date of Patent: Jun. 20, 2023

(54) INTERSECTION TESTING IN A RAY TRACING SYSTEM USING A RAY COORDINATE SYSTEM

(71) Applicant: Imagination Technologies Limited, Kings Langley (GB)

(72) Inventors: Peter Smith-Lacey, Hertfordshire (GB); Rostam King, Hertfordshire (GB); Gregory Clark, Hertfordshire (GB); Simon Fenney, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/700,377

(22) Filed: Mar. 21, 2022

(65) Prior Publication Data
US 2022/0351458 A1 Nov. 3, 2022

(30) Foreign Application Priority Data
Mar. 23, 2021 (GB) ..................................... 2104063

(51) Int. Cl.
*G06T 15/06* (2011.01)
*G06T 15/00* (2011.01)
(52) U.S. Cl.
CPC ............ *G06T 15/06* (2013.01); *G06T 15/005* (2013.01)
(58) Field of Classification Search
None
See application file for complete search history.

(56) References Cited

U.S. PATENT DOCUMENTS

| 6,621,925 | B1 * | 9/2003 | Ohmori | ................. | G06T 15/005 |
| | | | | | 358/518 |
| 3,059,122 | A1 | 11/2011 | MacGillivray | | |
| 10,825,230 | B2 | 11/2020 | Laine et al. | | |
| 2007/0165035 | A1 * | 7/2007 | Duluk, Jr. | ............... | G06T 15/20 |
| | | | | | 345/506 |

(Continued)

FOREIGN PATENT DOCUMENTS

| EP | 2335224 A1 | 6/2011 |
| EP | 2592600 A2 | 5/2013 |
| JP | H05128274 A | 5/1993 |

OTHER PUBLICATIONS

"Ray tracing primitives"; https://www.cl.cam.ac.Uk/teaching/1999/AGraphHCI/SMAG/node2.html#SECTION00023100000000000000.

(Continued)

*Primary Examiner* — Andrew G Yang
(74) *Attorney, Agent, or Firm* — Potomac Law Group, PLLC; Vincent M DeLuca

(57) ABSTRACT

A method and an intersection testing module for performing intersection testing of a ray with a convex polygon in a ray tracing system. The ray and the convex polygon are defined in a 3D space using a space-coordinate system. The ray is defined with a ray origin and a ray direction. A ray-coordinate system is used to perform intersection testing, wherein the ray-coordinate system has an origin at the ray origin, and wherein the ray-coordinate system has three basis vectors. A first of the basis vectors is aligned with the ray direction. A second and a third of the basis vectors: (i) are both orthogonal to the first basis vector, (ii) are not parallel with each other, and (iii) have a zero as one component when expressed in the space-coordinate system. A result of performing the intersection testing is outputted for use by the ray tracing system.

20 Claims, 12 Drawing Sheets

(56) References Cited

U.S. PATENT DOCUMENTS

| | | | |
|---|---|---|---|
| 2015/0363970 A1* | 12/2015 | Spinella-Mamo | G06T 7/596 |
| | | | 345/420 |
| 2020/0051314 A1 | 2/2020 | Laine et al. | |
| 2020/0193683 A1 | 6/2020 | Saleh | |
| 2020/0193685 A1* | 6/2020 | Saleh | G06T 15/80 |
| 2020/0302677 A1 | 9/2020 | Saleh | |
| 2021/0390759 A1* | 12/2021 | Muthler | G06T 17/205 |
| 2022/0180086 A1* | 6/2022 | Mitani | H04N 17/002 |
| 2022/0270762 A1* | 8/2022 | Crawford | G06V 20/70 |

OTHER PUBLICATIONS

Havel et al; "Yet Faster Ray-Triangle Intersection (Using SSE4)"; IEEE Transactions On Visualization and Computer Graphics; vol. 16; No. 3; May/Jun. 2010; pp. 434-438.

Kensler et al; "Optimizing Ray-Triangle Intersection via Automated Search"; School of Computing; University of Utah; pp. 1-6.

Mahovsky et al; "Fast Ray-Axis Aligned Bounding Box Overlap Tests with Plucker Coordinates"; vol. 9; No. 1; pp. 35-46.

Möller et al; "Fast, Minimum Storage Ray/Triangle Intersection"; pp. 1-7.

Shevtsov et al; "Ray-Triangle Intersection Algorithm for Modern CPU Architectures"; Russia, Moscow, Jun. 23-27, 2007; pp. 1-7.

Smits; "Efficiency Issues for Ray Tracing"; University of Utah; Feb. 19, 1999; pp. 1-12.

Toth; "On Ray Tracing Parametric Surfaces"; Computer Graphics Development; Ford Motor Company; vol. 19; No. 3; 1985; San Francisco Jul. 22-26; pp. 171-179.

Woop et al; "Watertight Ray/Triangle Intersection"; Journal of Computer Graphics Techniques; vol. 2; No. 1; 2013; pp. 65-82.

\* cited by examiner

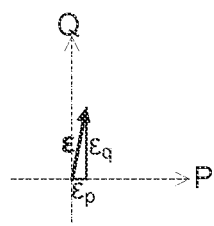

FIGURE 10

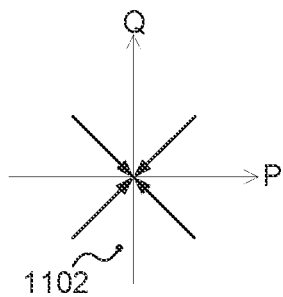

$(p_i, q_i, p_j, q_j) \in \{(\neq 0, \neq 0, =0, =0)\}$
$f = p_i \varepsilon_q - q_i \varepsilon_p$
$sgn(w) := sgn(p_i)$

FIGURE 11a

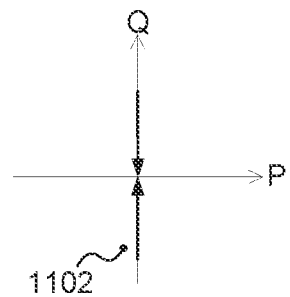

$(p_i, q_i, p_j, q_j) \in \{(=0, \neq 0, =0, =0)\}$
$f = -q_i \varepsilon_p$
$sgn(w) := !sgn(q_i)$

FIGURE 11b

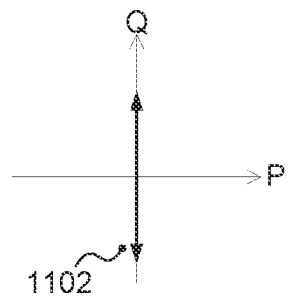

$(p_i, q_i, p_j, q_j) \in \{(=0, \neq 0, =0, \neq 0)\}$
$f = \varepsilon_p q_j - q_i \varepsilon_p$
$sgn(w) := sgn(q_j) = !sgn(q_i)$

FIGURE 11c

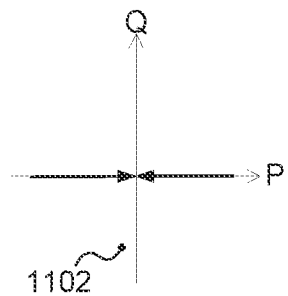

$(p_i, q_i, p_j, q_j) \in \{(\neq 0, =0, =0, =0)\}$
$f = p_i \varepsilon_q$
$sgn(w) := sgn(p_i)$

FIGURE 11d

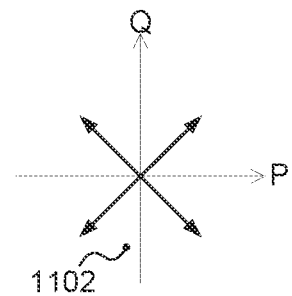

$(p_i, q_i, p_j, q_j) \in \{(\neq 0, \neq 0, \neq 0, \neq 0)\}$
$f = p_i \varepsilon_q + \varepsilon_p q_j - q_i \varepsilon_p - \varepsilon_q p_j$
$sgn(w) := sgn(p_i) = !sgn(p_j)$

FIGURE 11e

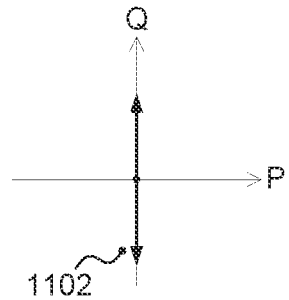

$(p_i, q_i, p_j, q_j) \in \{(=0, =0, =0, \neq 0)\}$
$f = \varepsilon_p q_j$
$sgn(w) := sgn(q_j)$

FIGURE 11f

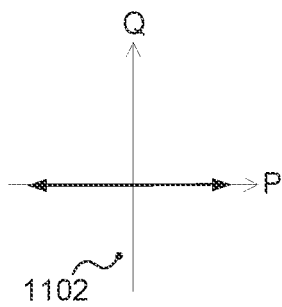

$(p_i, q_i, p_j, q_j) \in \{(\neq 0, =0, \neq 0, =0)\}$
$f = p_i \varepsilon_q - \varepsilon_q p_j$
$sgn(w) := sgn(p_i) = !sgn(p_j)$

FIGURE 11g

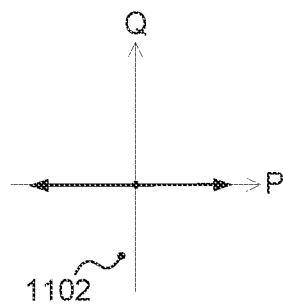

$(p_i, q_i, p_j, q_j) \in \{(=0, =0, \neq 0, =0)\}$
$f = -\varepsilon_q p_j$
$sgn(w) := !sgn(p_j)$

FIGURE 11h

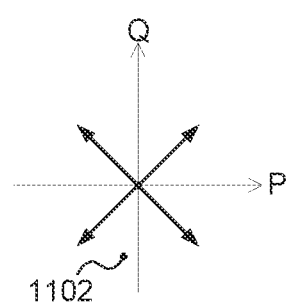

$(p_i, q_i, p_j, q_j) \in \{(=0, =0, \neq 0, \neq 0)\}$
$f = \varepsilon_p q_j - \varepsilon_q p_j$
$sgn(w) := !sgn(p_j)$

FIGURE 11i

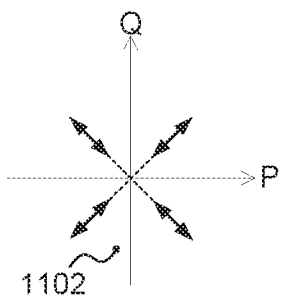

$(p_i, q_i, p_j, q_j) \in \{(\pm_p, \pm_q, \pm_p, \pm_q)\}$
$f = p_i \varepsilon_q + \varepsilon_p q_j - q_i \varepsilon_p - \varepsilon_q p_j$
$sgn(w) := sgn(f)$

FIGURE 11j

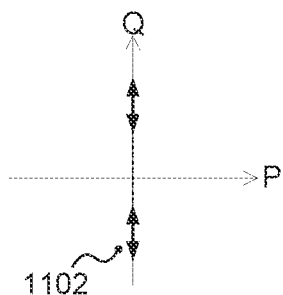

$(p_i, q_i, p_j, q_j) \in \{(=0, \pm_q, =0, \pm_q)\}$
$f = \varepsilon_p q_j - q_i \varepsilon_p$
$sgn(w) := X$

FIGURE 11k

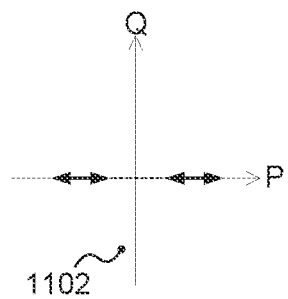

$(p_i, q_i, p_j, q_j) \in \{(\pm_p, =0, \pm_p, =0)\}$
$f = p_i \varepsilon_q - \varepsilon_q p_j$
$sgn(w) := X$

FIGURE 11l

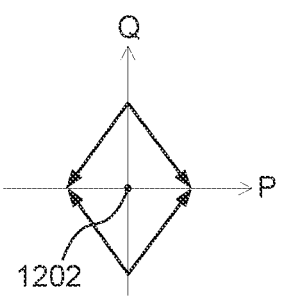

$(p_i, q_i, p_j, q_j) \in \{(=0, \neq 0, \neq 0, =0)\}$
$f = -q_i p_j$
$sgn(w) := !(sgn(q_i) \oplus sgn(p_j))$

FIGURE 12a

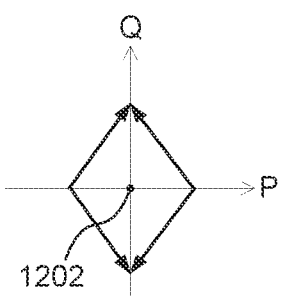

$(p_i, q_i, p_j, q_j) \in \{(\neq 0, =0, =0, \neq 0)\}$
$f = p_i q_j$
$sgn(w) := (sgn(p_i) \oplus sgn(q_j))$

FIGURE 12b

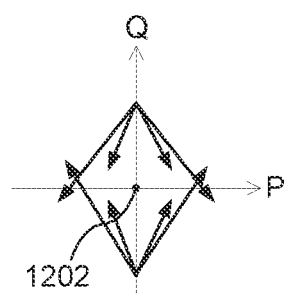

$(p_i, q_i, p_j, q_j) \in \{(=0, \neq 0, \neq 0, =0)\}$
$f = -q_i p_j$
$sgn(w) := !(sgn(q_i) \oplus sgn(p_j))$

FIGURE 12c

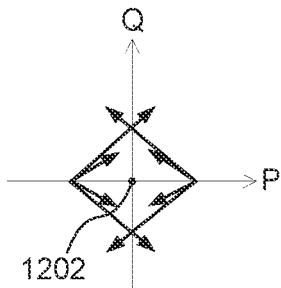

$(p_i, q_i, p_j, q_j) \in \{(\neq 0, =0, \neq 0, \neq 0)\}$
$f = p_i q_j$
$sgn(w) := (sgn(p_i) \oplus sgn(q_j))$

FIGURE 12d

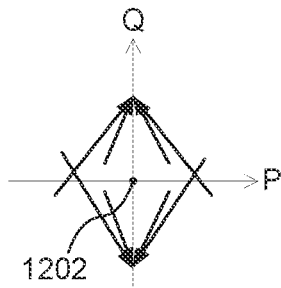

$(p_i, q_i, p_j, q_j) \in \{(\neq 0, \neq 0, =0, \neq 0)\}$
$f = p_i q_j$
$sgn(w) := (sgn(p_i) \oplus sgn(q_j))$

FIGURE 12e

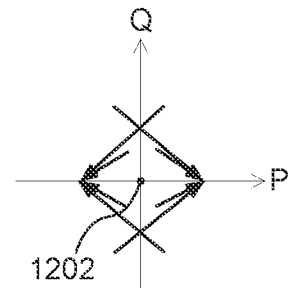

$(p_i, q_i, p_j, q_j) \in \{(\neq 0, \neq 0, \neq 0, =0)\}$
$f = -q_i p_j$
$sgn(w) := !(sgn(q_i) \oplus sgn(p_j))$

FIGURE 12f

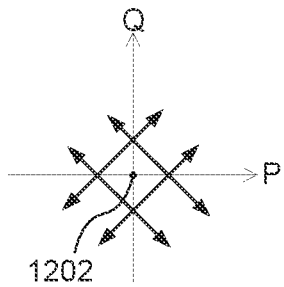

$(p_i, q_i, p_j, q_j) \in \{(\pm_p, \pm_q, \mp_p, \mp_q)\}$
$f = p_i q_j - q_i p_j$
$sgn(w) := sgn(f)$

FIGURE 12g

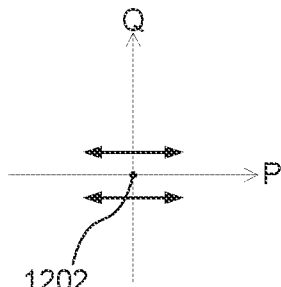

$(p_i, q_i, p_j, q_j) \in \{(\pm_p, \pm_q, \mp_p, \pm_q)\}$
$f = p_i q_j - q_i p_j$
$sgn(w) := (sgn(p_i) \oplus sgn(q_j))$

FIGURE 12h

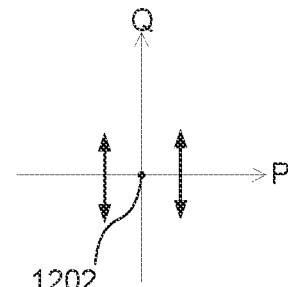

$(p_i, q_i, p_j, q_j) \in \{(\pm_p, \pm_q, \pm_p, \mp_q)\}$
$f = p_i q_j - q_i p_j$
$sgn(w) := !(sgn(q_i) \oplus sgn(p_j))$

FIGURE 12i

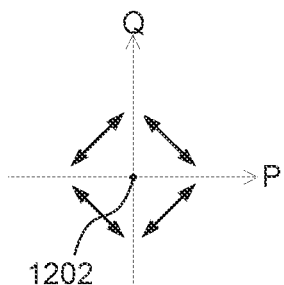

$(p_i, q_i, p_j, q_j) \in \{(\pm_p, \pm_q, \pm_p, \pm_q)\}$
$f = p_i q_j - q_i p_j$
$sgn(w) := sgn(f)$

FIGURE 12j

INTERSECTION TESTING IN A RAY TRACING SYSTEM USING A RAY COORDINATE SYSTEM

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. A "tree node" refers to a node which has pointers to other nodes in the hierarchical acceleration structure, i.e. a tree node has child nodes in the hierarchical acceleration structure. A "leaf node" refers to a node which has one or more pointers to one or more primitives, i.e. a leaf node does not have child nodes in the hierarchical acceleration structure. In other words, leaf nodes of the acceleration structure represent regions bounding one or more primitives in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The objects may be represented as convex polygons. Often the convex polygons are triangles, but they may be other shapes, e.g. squares, rectangles, pentagons, hexagons, etc. If more than one intersection is found for a ray then the closest of the intersection points to the ray's origin (i.e. the first intersection that the ray encounters in the scene) may be identified and the ray may be determined to intersect at this identified closest intersection. It is possible that there may be multiple closest hits for a ray, and in this case some tie-break logic may be used to select one of the multiple closest hits to use as the identified closest intersection. For some types of rays, the closest intersection might not need to be identified. For example, when processing shadow rays, an indication that there is at least one intersection is sufficient, without determining which of the intersections is the closest, and some APIs may allow the traversal of an acceleration structure for shadow rays to be terminated in response to finding any intersection, to thereby reduce the number of intersection tests that need to be performed.

A ray (r) can be defined as $r = O + Dt$ where O is a vector which represents the ray origin, D is a vector which represents the ray direction and t represents a distance along the ray from the origin. A primitive can be represented as a convex, or further strictly convex, polygon. A polygon (e.g. triangle) is defined by an ordered set of planar vertices whereby consecutive pairs of vertices define the polygon edges and the overall vertex order (its winding order) is used to indicate the front face of the polygon, given a fixed orientation (i.e., clockwise or anticlockwise). A convex polygon is a polygon with no interior angle greater than 180°. A strictly convex polygon is a polygon with no interior angle greater than or equal to 180°. The origin and direction vectors defining the ray, and the positions of the vertices defining the convex polygon can be represented with components in a space-coordinate system. The space-coordinate system may represent a world space of the scene being rendered, or it may represent an instance space of an object instance that is placed within the scene being rendered.

To determine whether a ray intersects a convex polygon, an intersection point of a ray and the plane containing the convex polygon can be determined, and then it can be determined whether the intersection point is inside the polygon. One general approach is to map the vertices (i.e., the coordinates in world or instance space) onto a plane via a projection parallel to the ray direction. Provided it does not contain the ray, the plane may be freely specified such that both orthographic and oblique projections are permissible. This reduces the problem to a 2D problem, and there are many ways of determining whether a 2D point is within a 2D convex polygon. For example, where the convex polygon is a triangle, the intersection point can be transformed into a UV coordinate for the triangle, which makes the intersection test trivial. Problems can occur if it is determined that the ray intersects a point on the boundary, i.e. an edge or vertex, of the polygon. In particular, often objects are represented with multiple polygons, e.g. with meshes of polygons, resulting in shared vertices which define two or more of the convex polygons. Furthermore, polygons can have shared edges, i.e., edges where both endpoints are shared vertices. An important type of shared vertex is one at the centre of a closed fan: A closed fan is defined as two or more polygons sharing a vertex that are connected by shared edges, such that these shared edges are the only edges with the shared vertex as one of its endpoints. If a ray intersects a point on a shared edge or shared vertex of a closed fan, then, in most cases, it is desirable for the ray to be found to intersect one or more of the polygons. If the intersection tests ensure that a ray that intersects a point on a shared edge or shared vertex of a closed fan intersects at least one of the polygons then the intersection tests are described as being "watertight". If the intersection tests ensure that a ray that intersects a point on a shared edge or a shared vertex of a closed fan intersects one (and only one) of the polygons then the intersection tests are described as being "non-redundantly watertight", noting that in this case only a subset of its boundary may be considered part of a polygon. If a ray which intersected a point on a shared edge was found to intersect zero polygons then it may appear as though the polygon mesh has a hole in it, such that a colour behind the polygon mesh can be seen through the mesh in the rendered image (this can occur for non-watertight intersection tests, but not for watertight intersection tests). These sorts of rendering errors can be very noticeable, e.g. if the colour behind the polygon mesh is significantly different to the colour of the polygon mesh. Furthermore, if a ray which intersected a point on a shared edge was found to intersect more than one polygon then the colour that is rendered at positions on that shared edge may depend upon the order in which the polygons are tested for intersection, such that the rendering may become non-deterministic. These sorts of rendering errors can be detrimental to the perceived quality of the rendered image. Further reasons to have non-redundant watertight intersection tests include: (i) to avoid redundant work, and (ii) to avoid shading discontinuities at any double/multiple hits in transparent objects resulting from duplicated intersections. The testing of a ray for intersection with a first polygon is normally performed independently of the testing of the ray for intersection with a second polygon, and it is noted that ensuring watertightness, and specifically non-redundant watertightness, for the intersection tests is not trivial.

Since intersection tests of rays against convex polygons (e.g. triangles), are performed many times in a ray tracing system, it can be beneficial to implement the functionality for performing these intersection tests in dedicated hardware modules, e.g. using fixed function circuitry, rather than implementing these intersection tests using software modules executed on general purpose processing units. Software implementations generally provide more flexibility because software is more easily altered after it is designed and/or created than hardware implementations are. However, hardware implementations generally provide more efficient implementations in terms of latency and power consumption, so if the desired functionality is known in advance, hardware implementations may be preferred over software implementations. When designing a hardware implementation of an intersection testing module which is configured for performing intersection testing there are generally competing aims of having: (i) a smaller size (i.e. smaller silicon area), (ii) a lower latency, and (iii) lower power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of performing intersection testing of a ray with a convex polygon in a ray tracing system, wherein the ray and the convex polygon are defined in a 3D space using a space-coordinate system, and wherein the ray is defined with a ray origin and a ray direction, the method comprising:

using a ray-coordinate system to perform intersection testing, wherein the ray-coordinate system has an origin at the ray origin, and wherein the ray-coordinate system has three basis vectors, wherein a first of the basis vectors is aligned with the ray direction; and wherein a second and a third of the basis vectors: (i) are both orthogonal to the first basis vector, (ii) are not parallel with each other, and (iii) have a zero as one component when expressed in the space-coordinate system; and outputting a result of performing the intersection testing for use by the ray tracing system.

The method may further comprise translating vertices defining the convex polygon, for use in performing the intersection testing, by subtracting the ray origin from the positions of the vertices defining the convex polygon.

The second and the third of the basis vectors of the ray-coordinate system may have a value of ±1 as one component when expressed in the space-coordinate system.

The first basis vector, S, when expressed with components of the space-coordinate system may be $S=A(D_x,D_y,D_z)$, wherein the second basis vector, P, when expressed with components of the space-coordinate system may be $P=B(D_z,0,-D_x)$; and wherein the third basis vector, Q, when expressed with components of the space-coordinate system may be $Q=C(0,D_z,-D_y)$; wherein $D_x$, $D_y$ and $D_z$ are components of the ray direction in the space-coordinate system and A, B and C are scalar values. B may be a simplified fraction with $D_x$ in its denominator, and C may be a simplified fraction with $D_y$ in its denominator.

The first basis vector, S, when expressed with components of the space-coordinate system may be $S=A(D_x,D_y,D_z)$, wherein the second basis vector, P, when expressed with components of the space-coordinate system may be $$P = \left(\pm 1, 0, \mp \frac{D_x}{D_z}\right);$$

and wherein the third basis vector, Q, when expressed with components of the space-coordinate system may be $$Q = \left(0, \pm 1, \mp \frac{D_y}{D_z}\right);$$

wherein $D_x$, $D_y$ and $D_z$ are components of the ray direction in the space-coordinate system and A is a scalar value.

The first basis vector, S, when expressed with components of the space-coordinate system may be $S=A(D_x,D_y,D_z)$, wherein the second basis vector, P, when expressed with components of the space-coordinate system may be $$P = \left(\pm \frac{D_z}{D_x}, 0, \mp 1\right);$$

and wherein the third basis vector, Q, when expressed with components of the space-coordinate system may be $$Q = \left(0, \pm \frac{D_z}{D_y}, \mp 1\right);$$

wherein $D_x$, $D_y$ and $D_z$ are components of the ray direction in the space-coordinate system and A is a scalar value.

The first basis vector, S, when expressed with components of the space-coordinate system may be $S=A(D_x,D_y,D_z)$, wherein the second basis vector, P, when expressed with components of the space-coordinate system may be $$P = \left(\pm \frac{1}{D_x}, 0, \mp \frac{1}{D_z}\right);$$

and wherein the third basis vector, Q, when expressed with components of the space-coordinate system may be $$Q = \left(0, \pm \frac{1}{D_y}, \mp \frac{1}{D_z}\right);$$

wherein $D_x$, $D_y$ and $D_z$ are components of the ray direction in the space-coordinate system and A is a scalar value.

The first basis vector, S, when expressed with components of the space-coordinate system may be $S=A(D_x,D_y,D_z)$, wherein the second basis vector, P, when expressed with components of the space-coordinate system may be $P=(\pm D_z, 0, \mp D_x)$; and wherein the third basis vector, Q, when expressed with components of the space-coordinate system may be $Q=(0,\pm D_z,\mp D_y)$; wherein $D_x$, $D_y$ and $D_z$ are components of the ray direction in the space-coordinate system and A is a scalar value.

In some examples $$A = \frac{1}{|D_z|}.$$

The method may further comprise transforming the ray and the convex polygon from the space-coordinate system into the ray-coordinate system, wherein the intersection testing may be performed in the ray-coordinate system.

The intersection testing may be performed using fixed function circuitry. The fixed function circuitry may comprise one or more multiply-and-add components for performing multiplications and additions using the second and third basis vectors of the ray-coordinate system.

The method may further comprise selectively permuting the components of the ray and the vertices defining the convex polygon, such that $|D_z| \geq |D_x|$ and $|D_z| \geq |D_y|$, before performing intersection testing of the ray with the convex polygon.

The method may further comprise selectively reversing the components of the ray and the vertices defining the convex polygon, such that $D_x \geq 0$, $D_y \geq 0$ and $D_z \geq 0$, before performing intersection testing of the ray with the convex polygon.

The method may further comprise storing a mapping indication of whether the mapping from the space-coordinate system to the ray-coordinate system affects the perceived polygon orientation, wherein the mapping indication may be used to perform said intersection testing of the ray with the convex polygon.

Values of at least one of:

$$\frac{D_x}{D_z} \text{ and } \frac{D_y}{D_z}, \tag{i}$$

$$\frac{D_z}{D_x} \text{ and } \frac{D_z}{D_x}, \tag{ii}$$

$$\frac{1}{D_x} \text{ and } \frac{1}{D_y}, \tag{iii}$$

and $$\frac{1}{D_z} \tag{iv}$$

or $D_z$, may be pre-computed for the ray and stored in a store, wherein the method may comprise reading the stored values from the store for use in performing intersection testing.

The outputted result may be used in the ray tracing system for rendering an image of a 3D scene.

The convex polygon may be a triangle.

The is provided a method of performing intersection testing of a ray with a convex polygon in a ray tracing system, wherein the ray and the convex polygon are defined in an n-dimensional space using a space-coordinate system, wherein $n \geq 3$, and wherein the ray is defined with a ray origin and a ray direction, the method comprising:

using a ray-coordinate system to perform intersection testing, wherein the ray-coordinate system has an origin at the ray origin, and wherein the ray-coordinate system has n basis vectors,
wherein a first of the basis vectors is aligned with the ray direction,
wherein (n−1) of the basis vectors are orthogonal to the first basis vector,
wherein no pairing of the (n−1) basis vectors are parallel with each other, and
wherein the (n−1) basis vectors have zeros for (n−2) components when expressed in the space-coordinate system; and
outputting a result of performing the intersection testing for use by the ray tracing system.

There is provided an intersection testing module, for use in a ray tracing system, configured to perform intersection testing of a ray with a convex polygon, wherein the ray and the convex polygon are defined in a 3D space using a space-coordinate system, and wherein the ray is defined with a ray origin and a ray direction, the intersection testing module being configured to:

use a ray-coordinate system to perform intersection testing, wherein the ray-coordinate system has an origin at the ray origin, and wherein the ray-coordinate system has three basis vectors,
wherein a first of the basis vectors is aligned with the ray direction; and
wherein a second and a third of the basis vectors: (i) are both orthogonal to the first basis vector, (ii) are not parallel with each other, and (iii) have a zero as one component when expressed in the space-coordinate system; and
output a result of performing the intersection testing for use by the ray tracing system.

The first basis vector, S, when expressed with components of the space-coordinate system may be $S=A(D_x,D_y,D_z)$, wherein the second basis vector, P, when expressed with components of the space-coordinate system may be P=B$(D_z,0,-D_x)$; and wherein the third basis vector, Q, when expressed with components of the space-coordinate system may be Q=C$(0,D_z,-D_y)$; wherein $D_x$, $D_y$ and $D_z$ are components of the ray direction in the space-coordinate system, A is a scalar value, and either:

$$B = \pm \frac{1}{D_x} \text{ and } C = \pm \frac{1}{D_y}, \quad \text{(i)}$$

or $$B = \pm \frac{1}{D_z D_x} \text{ and } C = \pm \frac{1}{D_z D_y}. \quad \text{(ii)}$$

The intersection testing module may comprise fixed function circuitry configured to perform intersection testing using the ray-coordinate system. The fixed function circuitry may comprise one or more multiply-and-add components for performing multiplications and additions using the second and third basis vectors of the ray-coordinate system.

The intersection testing module may further comprise a store configured to store values of at least one of:

$$\frac{D_x}{D_z} \text{ and } \frac{D_y}{D_z}, \quad \text{(i)}$$

$$\frac{D_z}{D_x} \text{ and } \frac{D_z}{D_y}, \quad \text{(ii)}$$

$$\frac{1}{D_x} \text{ and } \frac{1}{D_y}, \quad \text{(iii)}$$

and $$\frac{1}{D_z} \quad \text{(iii)}$$

or $D_z$, for the ray, wherein the intersection testing module may be configured to read the stored values from the store for use in performing intersection testing.

There is provided an intersection testing module, for use in a ray tracing system, configured to perform intersection testing of a ray with a convex polygon, wherein the ray and the convex polygon are defined in an n-dimensional space using a space-coordinate system, wherein n≥, and wherein the ray is defined with a ray origin and a ray direction, the intersection testing module being configured to:

use a ray-coordinate system to perform intersection testing, wherein the ray-coordinate system has an origin at the ray origin, and wherein the ray-coordinate system has n basis vectors,
  wherein a first of the basis vectors is aligned with the ray direction,
  wherein (n−1) of the basis vectors are orthogonal to the first basis vector,
  wherein no pairing of the (n−1) basis vectors are parallel with each other, and
  wherein the (n−1) basis vectors have zeros for (n−2) components when expressed in the space-coordinate system; and
output a result of performing the intersection testing for use by the ray tracing system.

There may be provided an intersection testing module configured to perform any of the methods described herein.

There may be provided computer readable code configured to cause any of the methods described herein to be performed when the code is run.

There may be provided a method of performing intersection testing, in a ray tracing system, for a ray with respect to a plurality of convex polygons, wherein each of the convex polygons is defined by an ordered set of vertices, and wherein at least one of the vertices is a shared vertex which is used to define two or more of the convex polygons, the method comprising:
  projecting the vertices of the convex polygons onto a pair of axes orthogonal to the ray direction, wherein the origin of the pair of axes corresponds with the ray origin, and wherein a vertex ordering scheme defines an ordering of the projected vertices which is independent of the ordering of the vertices in the ordered sets of vertices defining the convex polygons; and
  for each of the convex polygons:
    for each edge of the convex polygon defined by two of the projected vertices, determining a parameter indicative of which side of the edge the ray passes on, wherein if the ray is determined to intersect a point on the edge then the parameter is determined based upon whether the ordering, defined by the vertex ordering scheme, of the projected vertices defining the edge matches the ordering of the vertices in the ordered set of vertices defining the convex polygon; and
    determining whether the ray intersects the convex polygon based on the parameters determined for the edges of the convex polygon;
  wherein for two or more of the convex polygons the ray is determined to intersect a point on an edge of that convex polygon.

There may be provided an intersection testing module, for use in a ray tracing system, configured to perform intersection testing for a ray with respect to a plurality of convex polygons, wherein each of the convex polygons is defined by an ordered set of vertices, and wherein at least one of the vertices is a shared vertex which is used to define two or more of the convex polygons, the intersection testing module being configured to:
  project the vertices of the convex polygons onto a pair of axes orthogonal to the ray direction, wherein the origin of the pair of axes corresponds with the ray origin, and wherein a vertex ordering scheme defines an ordering of the projected vertices which is independent of the ordering of the vertices in the ordered sets of vertices defining the convex polygons; and
  for each of the convex polygons:
    for each edge of the convex polygon defined by two of the projected vertices, determine a parameter indicative of which side of the edge the ray passes on, wherein the intersection testing module is configured to determine the parameter, if the ray is determined to intersect a point on the edge, based upon whether the ordering, defined by the vertex ordering scheme, of the projected vertices defining the edge matches the ordering of the vertices in the ordered set of vertices defining the convex polygon; and
    determine whether the ray intersects the convex polygon based on the parameters determined for the edges of the convex polygon.

There may be provided a method of performing intersection testing, in a ray tracing system, for a ray with respect to a plurality of convex polygons, wherein each of the convex polygons is defined by an ordered set of vertices, and wherein at least one of the vertices is a shared vertex which is used to define two or more of the convex polygons, the method comprising:

projecting the vertices of the convex polygons onto a pair of axes orthogonal to the ray direction, wherein the origin of the pair of axes corresponds with the ray origin; and for each of the convex polygons:
for each edge of the convex polygon defined by two of the projected vertices, determining a signed parameter, wherein the sign of the signed parameter is indicative of which side of the edge the ray passes on, wherein the position of a first of the projected vertices $v_i$ defining the edge is defined with coordinates $p_i$ and $q_i$ along the respective axes of the pair of axes, and wherein a position of a second of the projected vertices $v_j$ defining the edge is defined with coordinates $p_j$ and $q_j$ along the respective axes of the pair of axes, wherein if the ray is determined to intersect a point on the edge then the sign of the signed parameter is determined using a module which is configured to:
take as inputs, indications which classify each of the $p_i$, $q_i$, $p_j$ and $q_j$ coordinates as negative, zero or positive, and
output, for valid combinations of classifications of the $p_i$, $q_i$, $p_j$ and $q_j$ coordinates, an indication of the sign of the signed parameter; and
determining whether the ray intersects the convex polygon based on the signs of the signed parameters determined for the edges of the convex polygon;
wherein for two or more of the convex polygons the ray is determined to intersect a point on an edge of that convex polygon.

There may be provided an intersection testing module, for use in a ray tracing system, configured to perform intersection testing for a ray with respect to a plurality of convex polygons, wherein each of the convex polygons is defined by an ordered set of vertices, and wherein at least one of the vertices is a shared vertex which is used to define two or more of the convex polygons, the intersection testing module being configured to:

project the vertices of the convex polygons onto a pair of axes orthogonal to the ray direction, wherein the origin of the pair of axes corresponds with the ray origin; and for each of the convex polygons:
for each edge of the convex polygon defined by two of the projected vertices, determine a signed parameter, wherein the sign of the signed parameter is indicative of which side of the edge the ray passes on, wherein the position of a first of the projected vertices $v_i$ defining the edge is defined with coordinates $p_i$ and $q_i$ along the respective axes of the pair of axes, and wherein a position of a second of the projected vertices $v_j$ defining the edge is defined with coordinates $p_j$ and $q_j$ along the respective axes of the pair of axes, wherein the intersection testing module is configured to use a module to determine the sign of the signed parameter if the ray is determined to intersect a point on the edge, wherein the module is configured to:
take as inputs, indications which classify each of the $p_i$, $q_i$, $p_j$ and $q_j$ coordinates as negative, zero or positive, and
output, for valid combinations of classifications of the $p_i$, $q_i$, $p_j$ and $q_j$ coordinates, an indication of the sign of the signed parameter; and
determine whether the ray intersects the convex polygon based on the signs of the signed parameters determined for the edges of the convex polygon.

The intersection testing module may be embodied in hardware on an integrated circuit. There may be provided a method of manufacturing, at an integrated circuit manufacturing system, an intersection testing module. There may be provided an integrated circuit definition dataset that, when processed in an integrated circuit manufacturing system, configures the system to manufacture an intersection testing module. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying an intersection testing module.

There may be provided an integrated circuit manufacturing system comprising: a non-transitory computer readable storage medium having stored thereon a computer readable description of the intersection testing module; a layout processing system configured to process the computer readable description so as to generate a circuit layout description of an integrated circuit embodying the intersection testing module; and an integrated circuit generation system configured to manufacture the intersection testing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4 is a flow chart for a first example method of determining a parameter to indicate which side of an edge of a polygon a ray passes on;

FIG. 5 is a flow chart for a second example method of determining a parameter to indicate which side of an edge of a polygon a ray passes on;

FIG. 9 is a flow chart for a third example method of determining a parameter to indicate which side of an edge of a polygon a ray passes on;

FIG. 10 illustrates a perturbation ε which can be applied to positions of vertices;

FIGS. 11a to 11l illustrate different situations in which a 2D cross product can be exactly zero;

FIGS. 12a to 12j illustrate further situations in which a 2D cross product can be determined to be zero due to underflow when a rounding mode which is not a round away from zero rounding mode is used to determine the 2D cross product;

Figure 1:
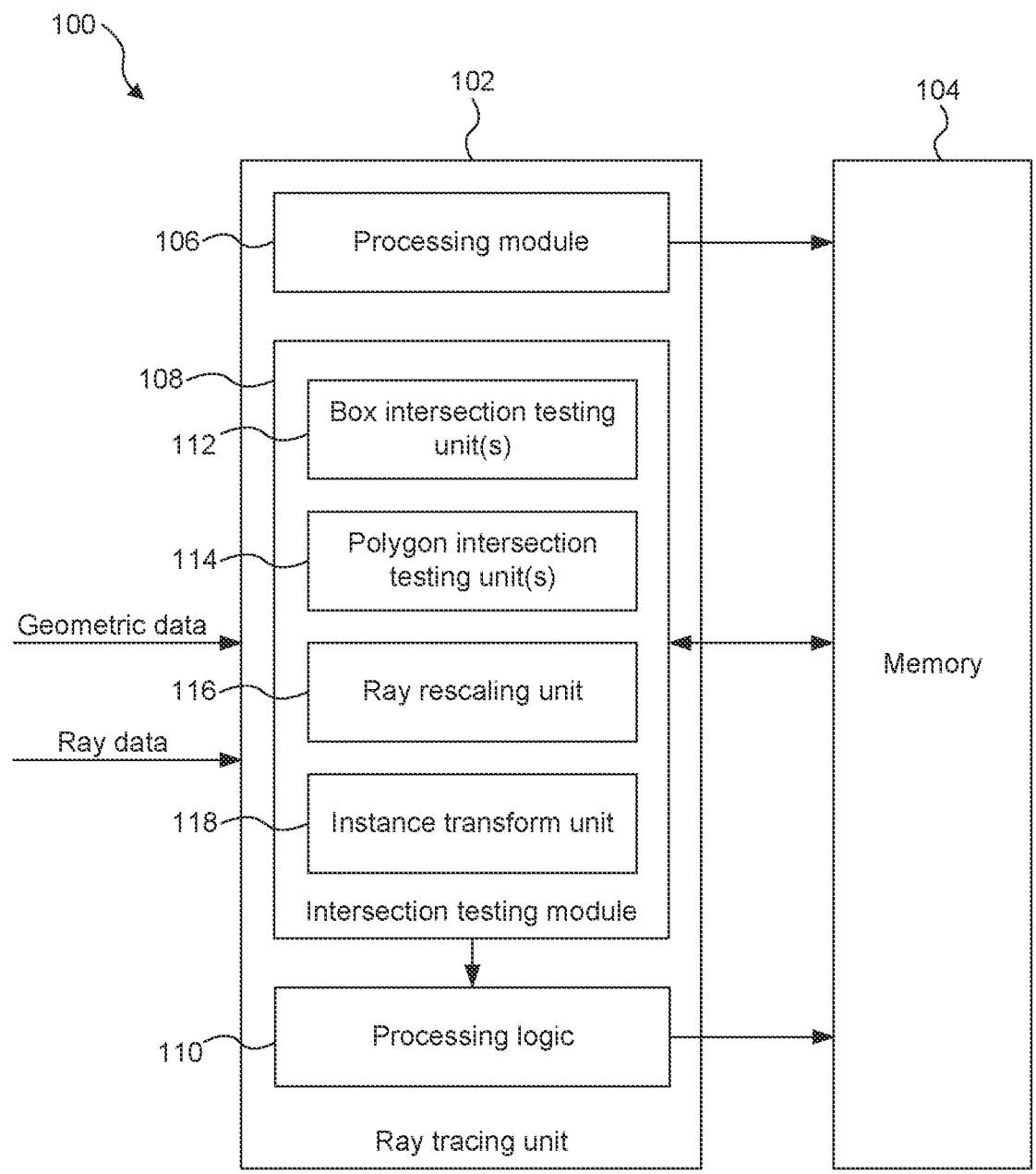
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Even when an acceleration structure is used, the amount of work involved in performing intersection testing in a ray tracing system is still very large. For example, ray tracing may be used for rendering an image of a 3D scene, where the image may have of the order of a million pixels. The pixel colour values are derived from some distribution of samples, associated with points in the image plane (typically, there is a one-to-one correspondence between pixel and sample location, but regions of an image may have a higher or lower sample density or may otherwise be independent of the arrangement of pixels). In the context of ray tracing, the samples are themselves associated with a distribution (in the statistical sense) of primary rays parameterised by the neighbourhood of each sample location. In the simplest example, a single primary ray is traced for each sample and used to determine its result. In other examples, multiple rays may be generated in accordance with the distribution (e.g. stochastic sampling) and the result derived from some accumulation or combination of the individual primary rays. When it is determined that a ray intersects with an object in the scene, a shader can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives (e.g. polygons, such as triangles). Furthermore, the images being rendered may represent frames of a sequence of frames which are to be rendered in real-time, e.g. for a display to a user in real-time. For example, the user may be playing a game wherein the rendered images represent a users view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time would be to have one or more supercomputers to perform all of the processing. This could be considered to be a 'brute force' approach. However, as well as an aim to have high performance (to perform ray tracing to render scenes to be output in real-time), there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. Depending on how this trade-off is implemented, examples described herein may allow the performance to be increased without a significant increase to the power consumption and area (compared to the prior art described above in the background section). Alternatively, in a different implementation of the trade-off, examples described herein may allow the power consumption and/or size of the ray tracing system to be decreased without significantly decreasing the performance of the ray tracing system (compared to the prior art described above in the background section). Different implementations can be designed to target different points in the trade-off between performance, power consumption and silicon area.

As described above, since objects are often represented as sets of convex polygons (non-convex polygons can be described in terms of unions of convex polygons), testing rays for intersection with convex polygons (e.g. triangles) is an extremely frequent operation in a ray tracing system. Therefore, any optimizations that can be made to the way in which the intersection tests are performed can be very useful for optimizing the ray tracing system in terms of reducing the latency, power consumption and size of the ray tracing system.

Furthermore, since such objects typically describe connected surfaces whereby neighbouring polygons have one or more shared vertices or edges, it is important that gaps do not spuriously appear as ray intersections sweep over the object interior, producing noticeable structural defects (which may be referred to as "rendering artefacts" in the rendered image). These may manifest due to rounding error or otherwise approximation in the intersection testing of each polygon whereby implicit perturbation of common vertices and/or edges may render neighbouring polygons disconnected when expressed in terms of their individual intersection results. An implementation that prevents any such disconnection from occurring may be referred to as "watertight".

While it is possible to mitigate the appearance of gaps by fattening the boundary of each convex polygon to some extent in order to provide some error tolerance, it is also desirable for an implementation to exhibit some form of non-redundant watertight behaviour i.e. for it to minimise the number of reported intersections that occur between a single ray and a single object. It is therefore preferable for an implementation to provide consistent results across individual polygon intersection tests, especially those with common vertices and/or edges, without modification of the polygon boundaries. However, it is usually not feasible to implement fully accurate tests in the general case so we are left with having to ensure that whatever errors are introduced are compatible with the aim of ensuring non-redundant watertightness. If we limit ourselves to cases in which an edge is only considered common if it is bounded by a pair of common vertices (so that "T-junctions" are not present) then it is possible to achieve this by decomposing each intersection test into a projection of the polygon vertices onto a plane (not containing the ray), followed by an accurate intersection test in the plane. This series of operations consolidates all of the error into per-vertex contributions, ensuring that results are consistent across connected triangles since common vertices remain common after transformation (thereby preserving the local topology) and the subsequent intersection tests are exact.

In the context of the above operations, an implementation may then be referred to as "non-redundantly watertight" if and only if a single positive intersection result is reported for any set of (exact) common vertex or edge intersections in the plane. To put this another way, intersection testing of rays with convex polygons is "watertight" if it is ensured that a ray that intersects a point on a shared edge of multiple polygons or a shared vertex of a closed fan is determined to intersect at least one of the polygons which share the edge or vertex. Furthermore, intersection testing of rays with convex polygons is "non-redundantly watertight" if it is ensured that a ray that intersects a point on a shared edge of multiple convex polygons or a shared vertex of a closed fan is determined to intersect a single one of the polygons which share the edge or vertex (i.e. the ray is determined to intersect one and only one of the polygons which share the edge or vertex).

Examples described herein further qualify this watertightness property by stipulating that common edges and vertices belong to polygons with consistent orientation, either with respect to each other (distinguishing outward and inward facing polygons i.e. in accordance with their winding order) or with respect to the perspective of the ray (distinguishing front facing and back facing polygons). In fact, there are several (non-mutually exclusive) scenarios (or any combination thereof) where the properties of "watertight" and/or "non-redundantly watertight" may or may not apply: (i) shared vertices not of a closed fan (e.g., boundary vertices of a mesh); (ii) non-manifold geometry, i.e., edges shared by three or more polygons; (iii) shared edges or shared vertices of a closed fan with polygons specified with inconsistent winding orders (i.e., the endpoints of any shared edge are given in the same order); (iv) shared edges or shared vertices of a closed fan with polygons, specified with consistent winding orders (i.e. the endpoints of any shared edge are given in the opposite order), with more than one orientation (i.e., clockwise and anticlockwise) from the viewpoint of the ray (e.g., silhouette edges or vertices); (v) non-simple geometry, i.e., intersections between polygons not at shared edges or shared vertices (e.g. interior intersections, T-junctions); and (vi) redundant geometry, i.e., intersections of shared edges or shared vertices of a closed fan shared by degenerate polygons. In case (vi), it is desirable for the properties of "watertight" or "non-redundantly watertight" to hold, but only when the degenerate polygons are omitted.

In the examples described herein the vertices of the convex polygons are projected onto a pair of axes orthogonal to the ray direction, wherein the origin of the pair of axes corresponds with the ray origin. In this way, the intersection testing process for testing whether a ray intersects a convex polygon in a 3D scene is reduced to a 2D problem which, as described above, enables us to ensure watertight intersection. The pair of axes are not parallel with each other. The ray is located at the origin of the pair of axes. The direction vector of the ray has a magnitude of zero along both of the axes in the pair of axes. Therefore, the ray is determined to intersect a polygon only if the polygon covers the origin of the pair of axes, where the ray may or may not intersect a polygon at its boundary. Different examples for ensuring watertightness of the intersection testing when the ray intersects a point on an edge of a polygon are described herein.

In examples described herein the pair of axes represent two basis vectors of a ray coordinate system. The particular ray coordinate systems described herein are particularly beneficial for use in performing intersection testing in a ray tracing system, although in other examples the pair of axes might not be part of the particular ray coordinate systems described herein.

For example, in the ray coordinate systems described herein, some of the components of the basis vectors, when expressed in the space-coordinate system, are zero. Furthermore, the ray may be rescaled such that the largest component(s) of the ray direction vector have unit magnitude. The choice of the ray coordinate system and the rescaling of the ray in examples described herein may make two thirds of the tests mathematically cheaper due to scale values being either 1.0 or 0.0. This can be achieved by performing a small amount of pre-calculation that is constant for the ray, so the cost of performing this pre-calculation can be ameliorated because it is performed once for a ray and then can be used in many intersection tests involving that ray. For example, where the ray direction vector D has components $D_x$, $D_y$ and $D_z$, values of $$\frac{D_x}{D_z} \text{ and } \frac{D_y}{D_z}$$

(or values of $$\frac{D_x}{|D_z|} \text{ and } \frac{D_y}{|D_z|})$$

for a ray may be pre-computed and may be stored. As described in more detail below, the axes can be swapped (e.g. permuted) to ensure that $D_z$ is the major component of the ray direction vector, i.e. $|D_z| \geq |D_x|$ and $|D_z| \geq |D_y|$. Since any valid ray direction vector has a non-zero magnitude this means that $|D_z|>0$. As another example, values of $$\frac{D_z}{D_x} \text{ and } \frac{D_z}{D_y}$$

(or values of $$\frac{|D_z|}{D_x} \text{ and } \frac{|D_z|}{D_y}\Big)$$

for a ray may be pre-computed and may be stored, with $D_x$ and $D_y$ nonzero, or by using the concept of signed infinity, e.g. as defined in the IEEE floating point format, if $D_x$ or $D_y$ is zero. In some examples, values of zero can be replaced with non-zero values that are small enough to behave like zero in the operations described herein, and/or values of infinity can be replaced with finite values that are large enough to behave like infinity in the operations described herein, and these examples avoid having to treat some zeros and infinities as special cases, and also avoid at least some undefined results which can result from multiplying or dividing by zero or infinity. It is noted that the values of $$\frac{D_z}{D_x} \text{ and } \frac{D_z}{D_y}$$

(or values of $$\frac{|D_z|}{D_x} \text{ and } \frac{|D_z|}{D_y}\Big)$$

have a modulus greater than or equal to 1. As another example, a value of $$\frac{1}{D_z}$$

for a ray may be pre-computed and may be stored. After these values have been pre-computed they can be used for performing intersection testing on the ray. The pre-computed values can be used for multiple intersection tests, which may be performed in parallel. In some examples, the pre-computed values are stored so that they can be read, rather than calculated for use in performing intersection testing on the ray. Furthermore, rescaling the ray so that the largest component(s) of the ray direction vector have unit magnitude and/or the choice of the ray coordinate system so that one or more of the components of the basis vectors are zero makes the processing of the rays simpler to implement. Reducing the number of tests that need to be performed in order to determine whether a ray intersects a convex polygon, and/or simplifying the processing of the rays for determining whether a ray intersects a convex polygon, can reduce the latency, size and/or power consumption of an intersection testing module in a ray tracing system.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more box intersection testing units 112, one or more polygon intersection testing units 114, a ray rescaling unit 116 and an instance transform unit 118. It is noted that there may be more than one ray rescaling unit and/or more than one instance transform unit. In operation the ray tracing unit 102 receives geometric data defining objects within the 3D scene. The ray tracing unit 102 also receives ray data defining rays that are to be tested for intersection. The rays may be primary rays or secondary rays. The processing module 106 is configured to generate an acceleration structure based on the geometric data, and to send the acceleration structure to the memory 104 for storage therein. After the acceleration structure has been stored in the memory 104, the intersection testing module 108 can retrieve nodes (e.g. comprising data defining axis-aligned boxes corresponding to the nodes) of the acceleration structure from the memory 104 to perform intersection testing of rays against the retrieved nodes. To avoid reading in the whole acceleration structure at a time, the intersection testing module 108 retrieves a subset of the boxes from one level of the acceleration structure from memory 104 at each stage, based on the results of previous intersection tests. The box intersection testing unit(s) 112 perform intersection tests to determine whether or not a ray intersects each of the bounding boxes corresponding to nodes of the acceleration structure (where a miss can cull vast swathes of the hierarchical acceleration structure). If it is determined that a leaf node is intersected then the polygon intersection testing unit(s) 114 perform one or more polygon intersection tests to determine which object(s) (if any) the ray intersects. In this example, the convex polygons are triangles, although it is noted that in other examples, the convex polygons could be other shapes such as squares, rectangles, pentagons, hexagons, etc., so long as they are planar. The results of the intersection tests indicate which object in the scene a ray intersects, and the results may also indicate a position on the object at which the ray intersects the object (e.g. Barycentric coordinates), may also indicate a distance along the ray that the intersection occurs, and may also indicate the perceived orientation of the object from the ray's point of view (e.g., clockwise/anticlockwise or front/back facing). In some instances, the intersection determination may be based on whether the distance along the ray that the intersection occurs is between the minimum and maximum clipping distances for the ray ($t_{min}$ and $t_{max}$). In some instances, the intersection determination may be based on the perceived orientation of the object (e.g., for back-face culling). The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

In the examples described herein the ray tracing system uses an acceleration structure in order to reduce the number of intersection tests that need to be performed for a ray against convex polygons. However, it is noted that some other examples might not use an acceleration structure, and may simply tests rays against the convex polygons without first attempting to reduce the number of intersection tests that need to be performed using an acceleration structure.

Generally, when performing intersection testing of a ray with a convex polygon, the ray is defined in terms of components in a space-coordinate system in which the convex polygon is defined. However, in examples described herein, a ray-coordinate system is derived relative to the ray itself, and the convex polygon can be mapped onto the ray coordinate system. The term "space-coordinate system" is used herein to refer to the coordinate system in which the convex polygon is defined. The "space-coordinate system" may be a world space-coordinate system or an instance space-coordinate system. In most of the examples described herein the space-coordinate system is a three-dimensional coordinate system, and a convex polygon is a region of three-dimensional space contained entirely within a plane, bounded by n≥3 line segments, such that all interior angles are less than or equal to 180°. A strictly convex polygon is a convex polygon such that all interior angles are strictly less than 180°.

The term "ray-coordinate system" is used herein to refer to a coordinate system that is specific to a ray, and which has its origin at the origin of the ray. It is noted that in the examples described in detail herein the origin of the ray-coordinate system is the origin of the ray, but in other examples, any point along the ray's line could be used as the origin of the ray-coordinate system, with a suitable adjustment to the minimum and maximum clipping distances for the ray ($t_{min}$ and $t_{max}$). The ray-coordinate system has three basis vectors. A first of the basis vectors is aligned with the ray direction. A second and third of the basis vectors are both orthogonal to the first basis vector, and are not parallel with each other. In examples described herein the second and third basis vectors of the ray-coordinate system are not, in general, orthogonal to each other, although in some examples it is possible that they are orthogonal to each other. Furthermore, in examples described herein, the second and third basis vectors of the ray-coordinate system have a 0 as one component when expressed in the space-coordinate system. In some examples, the second and third of the basis vectors of the ray-coordinate system have a value of ±1 (i.e. a magnitude of 1) for one component when expressed in the space-coordinate system.

In examples described herein, the ray-coordinate system is used by the intersection testing module 108 to perform intersection testing to determine whether a ray intersects a convex polygon, wherein the ray and the convex polygon are defined in a 3D space using a space-coordinate system. A result of performing the intersection testing for the ray is output from the intersection testing module 108 for use by the ray tracing system, e.g. for use in determining which shader program(s) is(are) executed for the ray by the processing logic 110.

The vertices defining the convex polygon are translated for use in performing the intersection testing using the ray-coordinate system by subtracting the ray origin from the positions of the vertices defining the convex polygon. Subtracting the ray origin from the positions of the vertices defining the convex polygon means that the position of the polygon is then defined relative to the origin of the ray. By shifting the vertices by the ray origin first, all relative error in downstream calculations is centred around the ray origin. Assuming that the same is true for the box tester, this makes guaranteeing conservatism (i.e., no false negatives) easier.

Figure 2:
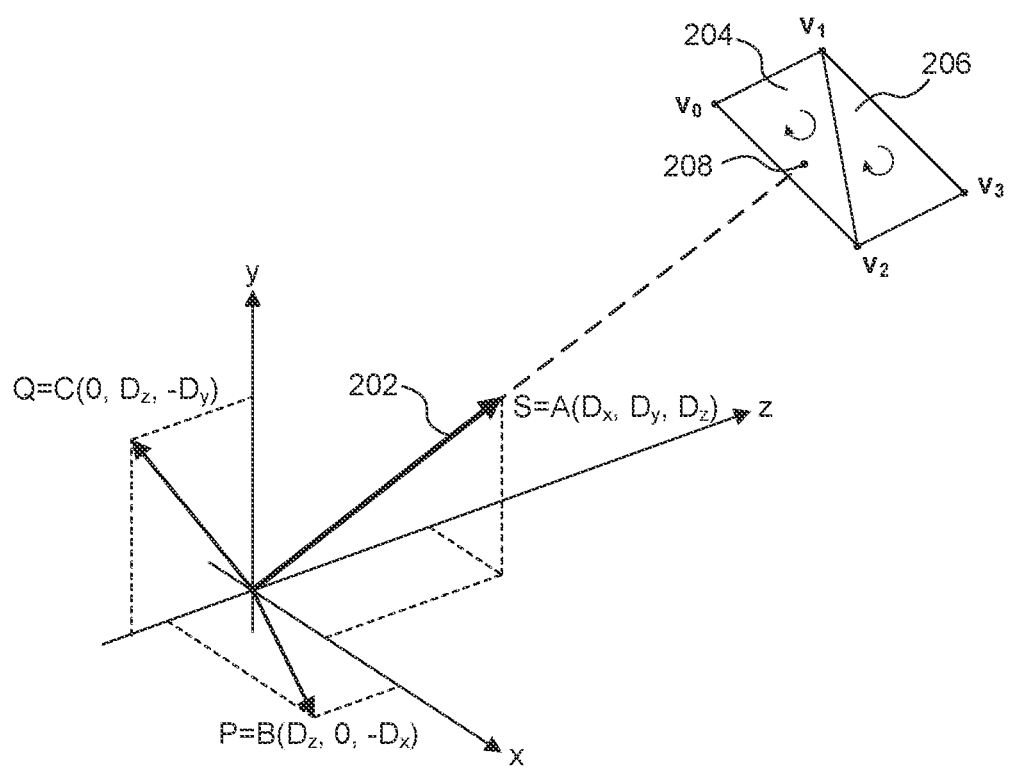
FIG. 2 shows a ray and two polygons, the basis vectors of a space-coordinate system, and the basis vectors of a ray-coordinate system.

FIG. 2 illustrates a ray 202 and two convex polygons 204 and 206. The two polygons are triangles and they share an edge such that they form a quad. The orientations of the two polygons are indicated as clockwise, as viewed and from the ray's perspective, in FIG. 2. Polygon 204 is defined by the ordered set of vertices ($v_0$, $v_1$, $v_2$), and polygon 206 is defined by the ordered set of vertices ($v_1$, $v_3$, $v_2$). The edge between vertices $v_1$ and $v_2$ is shared by polygons 204 and 206. As $v_1$ and $v_2$ are defined in the opposite order in polygons 204 and 206, and therefore the edge has opposite direction in one from the other, the two polygons are said to be specified with consistent winding. As described above, the ray 202, r(t), can be represented as r(t)=O+Dt, where O is a vector representing the origin of the ray and D is the direction vector of the ray, where O=($O_x$,$O_y$,$O_z$) and D=($D_x$,$D_y$,$D_z$). The x, y and z basis vectors of the space-coordinate system are shown in FIG. 2. As described above, the space-coordinate system could be a world space coordinate system of a scene being rendered, or the space-coordinate system could be the instance space-coordinate system of an instanced set of geometry within a scene being rendered. The origin of the ray-coordinate system that is used in the intersection testing is the origin of the ray. The positions of the vertices defining the polygons 204 and 206 are translated by subtracting the ray origin from the positions of the vertices. In the example shown in FIG. 2, the ray 202 intersects the polygon 204 at an intersection point 208.

Furthermore, in some examples described herein, the x, y and z components of the ray and the vertices defining the polygons are selectively permuted, such that $|D_z|≥|D_x|$ and $|D_z|≥|D_y|$, before performing intersection testing (noting that in these examples we must also have $|D_z|≥0$ for valid ray directions). The selective permutation of the axes is performed such that $D_z$ will be the major component of the ray direction.

FIG. 2 shows the ray 202 and polygons 204 and 206 in relation to the basis vectors after the translation and the selective permutation of the axes of the ray and polygons have been performed, such that the origin of the ray is at the origin of the coordinate system, and such that $|D_z|≥|D_x|$ and $|D_z|≥|D_y|$. This ensures that $D_z$ is non-zero because a valid ray cannot have $D_x$=$D_y$=$D_z$=0.

The basis vectors of the ray-coordinate system are represented as P, Q and S in FIG. 2. The first basis vector, S, of the ray-coordinate system is set to be along the direction of the ray, $S=A(D_x,D_y,D_z)$, where A is a scalar value. In some examples, $$A = \frac{1}{D_z},$$

such that $$S = \left(\frac{D_x}{D_z}, \frac{D_y}{D_z}, 1\right).$$

As an example (which may be referred to as a "first example" below), the second and third basis vectors, P and Q, may be defined to be $$P = \left(1, 0, -\frac{D_x}{D_z}\right) \text{ and } Q = \left(0, 1, -\frac{D_y}{D_z}\right).$$

more generally, and as shown in the example in FIG. 2, $P=B(D_z,0,-D_x)$ and $Q=C(0,D_z,-D_y)$, where B and C are any non-zero scalar values. To give some other examples, B could be $$\pm 1, \pm \frac{1}{D_z}, \pm \frac{1}{|D_z|}, \pm \frac{1}{D_x}, \pm \frac{1}{|D_x|}, \pm \text{sgn}(D_z),$$

or ±sgn($D_x$) or any product of these non-zero scalar values e.g.

$$\frac{1}{D_x D_z}$$

and C could be $$\pm 1, \pm \frac{1}{D_z}, \pm \frac{1}{|D_z|}, \pm \frac{1}{D_y} \text{ or } \pm \frac{1}{|D_y|}, \pm\text{sgn}(D_z),$$

or ±sgn($D_y$) or any product of these non-zero scalar values e.g.

$$\frac{1}{D_y D_z}.$$

It is noted that, for a non-zero value α, sgn(α)=+1 if α is positive, and sgn(α)=−1 if α is negative. If α=0 then sgn(α) may be +1 or −1 depending on the sign bit of the floating point representation of α. It is noted that standard floating point representations allow both +0 and −0 to be represented separately, and that unsigned 0 is usually identified with +0. In other words, if the adopted number system distinguishes between −0 and +0 (as is the case for the IEEE floating point system) then, as an example, sgn(+0)=+1 and sgn(−0)=−1, otherwise sgn(0)=1. A set of common values for A might be the union of the sets of common values for B and C. It is noted that S is orthogonal to P and to Q, which can be seen in that P.S=Q.S=0. However, depending on the values of $D_x$ and $D_y$, P and Q are not necessarily orthogonal to each other. For example, unless $D_x$ or $D_y$ is zero then P and Q will not be orthogonal to each other. As described above, P and Q are not parallel to each other, e.g. P and Q are at least far enough from being parallel to each other to not cause issues due to loss in rounding, otherwise the system might degenerate into a 1D scenario. It is noted that $D_z$ cannot be zero because of the selective permutation of the axes such that $D_z$ is the major component of the ray direction and because a valid ray direction vector must have a non-zero magnitude in order to define a line. Therefore, of the possible components of ray basis vector P and Q, the values of $$\frac{D_x}{D_z} \text{ and } \frac{D_y}{D_z}$$

are always well-defined and have a magnitude in the range from zero to one inclusive, and the values of $$\frac{D_z}{D_x} \text{ and } \frac{D_z}{D_y}$$

have a magnitude in the range from one to positive infinity (inclusive).

The choice of the scalar values A, B and C can affect the handedness of the system. In FIG. 2, the world (or instance) space axes form a left-handed system. If we order the ray-space axes as (X', Y', Z')=(P, Q, S), then they form a system of the same handedness (this will be the case if and only if the major axis is positive). Each scalar value (from the scalar values A, B and C) that is negative flips the handedness of the system, e.g. from left-handed to right-handed. If an even number of the scalar values A, B and C are negative, then they cancel out and we return to a left-handed system.

A sign of the mapping from the space-coordinate system to the ray-coordinate system may affect the perceived primitive orientation (given a fixed primitive winding). For example, a negative sign of the mapping may reverse primitive orientation and a positive sign of the mapping may preserve primitive orientation. As an example, the sign of the mapping may be given as:

sgn($D_z$) XOR sgn($A$) XOR sgn($B$) XOR sgn($C$) XOR sgn(σ)     (1)

wherein sgn(σ) indicates whether the permutation reverses the mapping sign.

The individual terms are XORed together as reversing the system handedness twice results in the original handedness. For example, if A=1/|$D_z$|, B=sgn($D_z$)/$D_x$, C=sgn($D_z$)/$D_y$, then expression (1) becomes sgn($D_x$) XOR sgn($D_y$) XOR sgn($D_z$) XOR sgn(σ).

The value of sgn($D_z$) comes from the sign of the determinant of a change-of-basis matrix (i.e. the three ray-coordinate axes as rows or columns with A=B=C=1 and the major component already permuted to the final row or column), which gives the signed volume of a transformed unit cube, equal to $D_z(D_x^2+D_y^2+D_z^2)=D_z\|D\|^2$. Being the major component, the magnitude of $D_z$ is at least $$\frac{1}{\sqrt{3}}\|D\|,$$

hence the magnitude of the determinant is at least $$\frac{1}{\sqrt{3}}\|D\|^3.$$

After normalising this result by the product of the basis vector magnitudes, this gives a measure of how far the matrix is from singular, i.e. how far the ray-coordinate system is from degenerate, and hence also how far from parallel the orthogonal axes are. It is beneficial for D to be of such magnitude that these expressions do not underflow or overflow, to avoid potential precision issues when transforming vertices into the ray-coordinate system.

In a higher n-dimensional construction, this determinant generalises to $D_z^{(n-2)}\|D\|^2$, both demonstrating that the construction works for all n>1 and that Dz only affects sign when n is odd.

The values of sgn(A), sgn(B) and sgn(C) come from rescaling the above ray-coordinate system bases. The value of the sign of the permutation sigma, σ, comes from the way the ray components are reordered (i.e. "permuted" by sigma, σ) to put the major component into a specific position (e.g. the final/z coordinate). By doing so, we leave two choices for which positions the minor coordinates go in. One of these choices corresponds to rotating all the coordinates, the other corresponds to transposing two of the coordinates. For example, to simplify muxing, the permutation involves a transposition when Y is the major component and the permutation involves a rotation otherwise. For example, if X is the major component of the ray direction vector then the permutation of the axes is the rotation (x,y,z)–>(y,z,x); if Y is the major component of the ray direction vector then the permutation of the axes is the transposition (x,y,z)–>(x,z,y); and if Z is the major component of the ray direction vector then the permutation of the axes is the identity (x,y,z)–>(x, y,z). This example provides for simple multiplexing because there are only two inputs for the first two components. Transposing two of the coordinates results in a sign change to the determinant as it is equivalent to swapping two rows in the change-of-basis matrix.

In another example (not shown in the Figures, and which is referred to as a "second example" below), the second and third basis vectors, P and Q, are defined to be $$P = \left(-1, 0, +\frac{D_x}{D_z}\right) \text{ and } Q = \left(0, -1, +\frac{D_y}{D_z}\right).$$

In this example (not shown in FIG. 2), $$B = C = -\frac{1}{D_z}.$$

Generally, these two examples can be described as the second basis vector, P, being defined to be $$P = \left(1, 0, -\frac{D_x}{D_z}\right) \text{ or}$$
$$P = \left(-1, 0, +\frac{D_x}{D_z}\right),$$

i.e. either $$P = \left(\pm 1, 0, \mp\frac{D_x}{D_z}\right),$$

and the third basis vector, Q, being defined to be $$Q = \left(0, \pm 1, \mp\frac{D_y}{D_z}\right),$$

i.e. either $$Q = \left(0, 1, -\frac{D_y}{D_z}\right) \text{ or } Q = \left(0, -1, +\frac{D_y}{D_z}\right).$$

In another example (not shown in the Figures, and which is referred to as a "third example" below), $$B = \pm\frac{1}{|D_z|} \text{ and } C = \pm\frac{1}{|D_z|}.$$

For example, the second basis vector, P, may be defined to be $$P = \left(\pm\text{sgn}(D_z), 0, \mp\text{sgn}(D_z)\frac{D_x}{D_z}\right),$$

i.e. either $$P = \left(+\text{sgn}(D_z), 0, -\text{sgn}(D_z)\frac{D_x}{D_z}\right) \text{ or}$$
$$P = \left(-\text{sgn}(D_z), 0, +\text{sgn}(D_z)\frac{D_x}{D_z}\right),$$

and the third basis vector, Q, may be defined to be $$Q = \left(0, \pm\text{sgn}(D_z), \mp\text{sgn}(D_z)\frac{D_y}{D_z}\right),$$

i.e. either $$Q = \left(0, +\text{sgn}(D_z), -\text{sgn}(D_z)\frac{D_y}{D_z}\right) \text{ or}$$
$$Q = \left(0, -\text{sgn}(D_z), +\text{sgn}(D_z)\frac{D_y}{D_z}\right).$$

It is noted that $$\text{sgn}(D_i)D_i = |D_i|, \text{sgn}(D_i)\frac{1}{D_i} = \frac{1}{|D_i|}, \frac{D_i}{\text{sgn}(D_i)} = |D_i|,$$

and $$\frac{1}{\text{sgn}(D_i)D_i} = \frac{1}{|D_i|}.$$

In another example (not shown in the Figures, and which is referred to as a "fourth example" below), B=±1 and C=±1. For example, the second basis vector, P, may be defined to be P=(±$D_z$,0,∓$D_x$), i.e. either P=(+$D_z$,0,−$D_x$) or P=(−$D_z$,0,+$D_x$), and the third basis vector, Q, may be defined to be Q=(0,±$D_z$,∓$D_y$), i.e. either Q=(0,+$D_z$,−$D_y$) or Q=(0,−$D_z$,+$D_y$).

In another example (not shown in the Figures, and which is referred to as a "fifth example" below), $$B = \pm\frac{1}{|D_x|} \text{ and } C = \pm\frac{1}{|D_y|}.$$

For example, the second basis vector, P, may be defined to be $$P = \left(\pm\text{sgn}(D_x)\frac{D_z}{D_x}, 0, \mp\text{sgn}(D_x)\right),$$

i.e. either $P = \left(+\text{sgn}(D_x)\frac{D_z}{D_x}, 0, -\text{sgn}(D_x)\right)$ or $P = \left(-\text{sgn}(D_x)\frac{D_z}{D_x}, 0, +\text{sgn}(D_x)\right),$ and the third basis vector, Q, may be defined to be $$Q = \left(0, \pm\text{sgn}(D_y)\frac{D_z}{D_y}, \mp\text{sgn}(D_y)\right),$$

i.e. either $$Q = \left(0, +\mathrm{sgn}(D_y)\frac{D_z}{D_y}, -\mathrm{sgn}(D_y)\right)$$
or
$$Q = \left(0, -\mathrm{sgn}(D_y)\frac{D_z}{D_y}, +\mathrm{sgn}(D_y)\right).$$

In other examples (not shown in the Figures, and which are referred to as "sixth examples" below), $$B = \pm \frac{1}{D_x} \text{ and } C = \pm \frac{1}{D_y}.$$

Therefore, the second basis vector, P, may be defined to be $$P = \left(\pm \frac{D_z}{D_x}, 0, \mp 1\right),$$

i.e. either $$P = \left(+\frac{D_z}{D_x}, 0, -1\right) \text{ or } P = \left(-\frac{D_z}{D_x}, 0, +1\right),$$

and the third basis vector, Q, may be defined to be $$Q = \left(0, \pm \frac{D_z}{D_y}, \mp 1\right),$$

i.e. either $$Q = \left(0, +\frac{D_z}{D_y}, -1\right) \text{ or } Q = \left(0, -\frac{D_z}{D_y}, +1\right).$$

Since $D_z$ is the major component of the ray direction vector, it is possible that $D_x$ or $D_y$ may be zero. Therefore, in these examples, care needs to be taken when handling the values of $$\pm \frac{D_z}{D_x} \text{ and } \pm \frac{D_z}{D_y}.$$

In one approach, me values of $D_x$ or $D_y$ may be perturbed by some small amount so that they are never exactly zero. For example, values of zero can be replaced with non-zero values that are small enough to behave like zero in the operations described herein.

In other examples (not shown in the Figures, and which are referred to as "seventh examples" below), $$B = \pm \frac{1}{D_x D_z} \text{ and } C = \pm \frac{1}{D_y D_z}.$$

Therefore, the second basis vector, P, may be defined to be $$P = \left(\pm \frac{1}{D_x}, 0, \mp \frac{1}{D_z}\right),$$

i.e. either $$P = \left(+\frac{1}{D_x}, 0, -\frac{1}{D_z}\right) \text{ or } P = \left(-\frac{1}{D_x}, 0, +\frac{1}{D_z}\right),$$

and the third basis vector, Q, may be defined to be $$Q = \left(0, \pm \frac{1}{D_y}, \mp \frac{1}{D_z}\right),$$

i.e. either $$Q = \left(0, +\frac{1}{D_y}, -\frac{1}{D_z}\right) \text{ or } Q = \left(0, -\frac{1}{D_y}, +\frac{1}{D_z}\right).$$

Since $D_z$ is the major component of the ray direction vector, it is possible that $D_x$ or $D_y$ may be zero. Therefore, in these examples, care needs to be taken when handling the values of $$\pm \frac{1}{D_x} \text{ and } \pm \frac{1}{D_y}.$$

As described above, in one approach, the values of $D_x$ or $D_y$ may be perturbed by some small amount so that they are never exactly zero. For example, values of zero can be replaced with non-zero values that are small enough to behave like zero in the operations described herein.

The example basis vectors given in the second, third, fourth and fifth examples described above all have consistent handedness, whereas the handedness of the basis vectors given in the sixth and seventh examples described above may either have consistent or opposite handedness, depending on the signs of $D_x$ and $D_y$.

In another example (not shown in the Figures), B=±sgn($D_z$) and C=±sgn($D_z$). For example, the second basis vector, P, may be defined to be P=(±|$D_z$|,0,±sgn($D_z$)$D_x$), i.e. either P=(+|$D_z$|,0,−sgn($D_z$)$D_x$) or P=(−|$D_z$|,0,+sgn($D_z$)$D_x$), and the third basis vector, Q, may be defined to be Q=(0,±|$D_z$|,±sgn($D_z$)$D_y$), i.e. either Q=(0,+|$D_z$|,−sgn($D_z$)$D_y$) or Q=(0,−|$D_z$|,+sgn($D_z$)$D_y$).

In another example (not shown in the Figures), B=±sgn($D_x$) and C=±sgn($D_y$). For example, the second basis vector, P, may be defined to be P=(±sgn($D_x$)$D_z$,0,∓|$D_x$|), i.e. either P=(+sgn($D_x$)$D_z$,0,−|$D_x$|) or P=(−sgn($D_x$)$D_z$,0,+|$D_x$|), and the third basis vector, Q, may be defined to be Q=(0,±sgn($D_y$)$D_z$,∓|$D_y$|), i.e. either Q=(0,+sgn($D_y$)$D_z$,−|$D_y$|) or Q=(0,−sgn($D_y$)$D_z$,+|$D_y$|).

In all of these examples: (i) S is orthogonal to P and to Q, (ii) P and Q are not parallel with each other, and (iii) P and Q have a zero as one component when expressed in the space-coordinate system. Furthermore, in some of these examples, P and Q have a value of ±1 as one component when expressed in the space-coordinate system. Conditions (i) and (ii) together imply that P, Q and S are always linearly independent. This implies that they are also spanning, and so do form a basis. That they form a non-degenerate basis is also demonstrated by the determinant never being zero for a valid (i.e. nonzero) ray direction.

Some sort of error will be introduced into the projected quantities (e.g. through floating point evaluation) and the choice of basis vectors is relevant to how this will affect the overall error of the intersection calculation. Given a general basis as defined above, the components (p, q, s) of a projected vertex are given by the following matrix multiplications $$\begin{pmatrix} p \\ q \\ s \end{pmatrix} = \begin{pmatrix} B & 0 & 0 \\ 0 & C & 0 \\ 0 & 0 & A \end{pmatrix} \begin{pmatrix} D_z & 0 & -D_x \\ 0 & D_z & -D_y \\ D_x & D_y & D_z \end{pmatrix} \begin{pmatrix} v_x \\ v_y \\ v_z \end{pmatrix},$$

where $(v_x, v_y, v_z)$ are the vertex components in world or instance space after the ray origin has been subtracted and perhaps after the axes have been permuted and mirrored such that $D_z \geq D_x$, $D_z \geq D_y$ and $D_z \geq 0$. The inverse mapping, which expresses these vertex components in terms of their projected counterparts is given by $$\begin{pmatrix} v_x \\ v_y \\ v_z \end{pmatrix} = \frac{1}{D^2} \cdot \frac{1}{D_z} \cdot \begin{pmatrix} D^2 - D_x^2 & -D_x D_y & D_x D_z \\ -D_x D_y & D^2 - D_y^2 & D_y D_z \\ -D_x D_z & -D_y D_z & D_z^2 \end{pmatrix} \begin{pmatrix} \frac{1}{B} & 0 & 0 \\ 0 & \frac{1}{C} & 0 \\ 0 & 0 & \frac{1}{A} \end{pmatrix} \begin{pmatrix} p \\ q \\ s \end{pmatrix},$$

where $D^2 = D_x^2 + D_y^2 + D_z^2$ is the square length of the ray. The above expression is useful because it illustrates how errors in the calculated projected components map to errors in the original vertex locations, thereby giving an impression of the error behaviour in a ray-independent fashion (recall that a multitude of distinct rays may be tested against a given primitive), in the sense that a direct comparison may be made between perturbed vertex locations as implied by one ray projection versus another (assuming a shared ray origin).

Suppose, for example, that we compute p and q as p' and q' with relative error $\varepsilon_p$ and $\varepsilon_q$ (realistic for an accurate floating point implementation) such that $$\begin{pmatrix} p' \\ q' \\ s \end{pmatrix} - \begin{pmatrix} p \\ q \\ s \end{pmatrix} = \begin{pmatrix} \varepsilon_p & 0 & 0 \\ 0 & \varepsilon_q & 0 \\ 0 & 0 & 0 \end{pmatrix} \begin{pmatrix} p \\ q \\ s \end{pmatrix}.$$

Note that, since s is not explicitly computed in this example, it may be described, as above, with zero effective error. Now, using the earlier expression for the inverse mapping, we may express this error in terms of $(v'_x, v'_y, v'_z)$, the implied offset vertex, with $$\begin{pmatrix} v'_x \\ v'_y \\ v'_z \end{pmatrix} - \begin{pmatrix} v_x \\ v_y \\ v_z \end{pmatrix} =$$

$$\frac{1}{D^2} \cdot \frac{1}{D_z} \cdot \begin{pmatrix} D^2 - D_x^2 & -D_x D_y & D_x D_z \\ -D_x D_y & D^2 - D_y^2 & D_y D_z \\ -D_x D_z & -D_y D_z & D_z^2 \end{pmatrix} \begin{pmatrix} \frac{1}{B} & 0 & 0 \\ 0 & \frac{1}{C} & 0 \\ 0 & 0 & \frac{1}{A} \end{pmatrix} \left[ \begin{pmatrix} p' \\ q' \\ s \end{pmatrix} - \begin{pmatrix} p \\ q \\ s \end{pmatrix} \right] =$$

$$\frac{1}{D^2} \cdot \frac{1}{D_z} \cdot \begin{pmatrix} D^2 - D_x^2 & -D_x D_y & D_x D_z \\ -D_x D_y & D^2 - D_y^2 & D_y D_z \\ -D_x D_z & -D_y D_z & D_z^2 \end{pmatrix} \begin{pmatrix} \varepsilon_p & 0 & 0 \\ 0 & \varepsilon_q & 0 \\ 0 & 0 & 0 \end{pmatrix} \begin{pmatrix} p \\ q \\ s \end{pmatrix}.$$

If we substitute our original projection expression for (p, q, s), this simplifies to $$\begin{pmatrix} v'_x \\ v'_y \\ v'_z \end{pmatrix} - \begin{pmatrix} v_x \\ v_y \\ v_z \end{pmatrix} = \frac{1}{D^2} \cdot \frac{1}{D_z} \cdot$$

$$\begin{pmatrix} D^2 - D_x^2 & -D_x D_y & D_x D_z \\ -D_x D_y & D^2 - D_y^2 & D_y D_z \\ -D_x D_z & -D_y D_z & D_z^2 \end{pmatrix} \begin{pmatrix} \varepsilon_p & 0 & 0 \\ 0 & \varepsilon_q & 0 \\ 0 & 0 & 0 \end{pmatrix} \begin{pmatrix} D_z & 0 & -D_x \\ 0 & D_z & -D_y \\ D_x & D_y & D_z \end{pmatrix} \begin{pmatrix} v_x \\ v_y \\ v_z \end{pmatrix} =$$

$$\frac{1}{D^2} \left( v_x - \frac{D_x}{D_z} v_z \right) \begin{pmatrix} D^2 - D_x^2 \\ -D_x D_y \\ -D_x D_z \end{pmatrix} \varepsilon_p + \frac{1}{D^2} \left( v_y - \frac{D_y}{D_z} v_z \right) \begin{pmatrix} -D_x D_y \\ D^2 - D_y^2 \\ -D_y D_z \end{pmatrix} \varepsilon_q.$$

The first important thing to observe (in this example in which the projected coordinates are computed with relative error) is that the implied vertex error does not depend on the choice of values for A, B or C (assuming values of zero are correctly handled, as described elsewhere). This allows us to decide these quantities on their relative merits, without having to consider their impact on the error analysis.

Next, we can understand bounds on the error by writing the total square relative error $\varepsilon^2$ as $$\varepsilon^2 = \frac{1}{v^2} \left[ (v'_x - v_x)^2 + (v'_y - v_y)^2 + (v'_z - v_z)^2 \right]$$

$$= \frac{1}{v^2} \left( v_x - \frac{D_x}{D_z} v_z \right)^2 \varepsilon_p^2 + \frac{1}{v^2} \left( v_y - \frac{D_y}{D_z} v_z \right)^2 \varepsilon_q^2 - \frac{1}{v^2} \left[ \frac{D_x}{D} \left( v_x - \frac{D_x}{D_z} v_z \right) \varepsilon_p + \frac{D_y}{D} \left( v_y - \frac{D_y}{D_z} v_z \right) \varepsilon_q \right]^2$$

where $v^2 = v_x^2 + v_y^2 + v_z^2$ is the square length of the vertex relative to the ray origin, for a vertex not at the ray origin. Now we can see why it is important that $D_z$ is the major axis; the above equation involves $D_x/D_z$ and $D_y/D_z$ terms that may become unbounded for finite $\varepsilon_x$ and $\varepsilon_y$, the errors on the computed projected components, as $D_z$ tends to zero.

Take for example the case where $v_z \neq 0$, $\varepsilon_p \neq 0$, $\varepsilon_q = 0$, $D_x = D_y$ and $D_z/D_x \to 0$. We have $$\varepsilon^2 = \frac{1}{v^2}\left(1 - \frac{D_x^2}{D^2}\right)\left(v_x - \frac{D_x}{D_z}v_z\right)^2 \varepsilon_p^2$$

$$= \frac{1}{v^2}\left(\frac{D_x^2 + D_z^2}{2D_x^2 + D_z^2}\right)\left(v_x - \frac{D_x}{D_z}v_z\right)^2 \varepsilon_p^2 \sim \frac{1}{2v^2}\left(\frac{D_x}{D_z}v_z\right)^2 \varepsilon_p^2 \to \infty$$

where in the first line we have used the substitution $\varepsilon_y = 0$, in the second line we have used $D_x = D_y$ and in the third line we have used $D_z/D_x \to 0$ and the fact that $v_z \neq 0$. So we see that information about the vertex component $v_x$ (and $v_y$) gets washed out in the projection as $D_z/D_x \to 0$ as should be intuitively clear with reference to the matrix expression for $(p, q, s)$. Of course, if $D_z$ is the major axis, the magnitude of $D_z/D_x$ (and $D_z/D_y$) is bounded below by one so that the above pathology doesn't arise (and it is easy to construct an upper bound on the total error in terms of the error bounds on the projected components).

A "reciprocal basis" is one where in the basis vectors, $P = B(D_z, 0, -D_x)$ and $Q = C(0, D_z, -D_y)$, B is a function of $$\frac{1}{D_x}$$

and C is a function or $$\frac{1}{D_y}.$$

In other words, B is a simplified fraction with $D_x$ in its denominator, and C is a simplified fraction with $D_y$ in its denominator. For example, a reciprocal basis may have $$B = \frac{1}{D_x} \text{ and } C = \frac{1}{D_y},$$

such that $$P = \left(\frac{D_z}{D_x}, 0, -1\right) \text{ and } Q = \left(0, \frac{D_z}{D_y}, -1\right).$$

As another example, a reciprocal basis may have $$B = \frac{1}{D_x D_z} \text{ and } C = \frac{1}{D_y D_z},$$

such that $$P = \left(\frac{1}{D_x}, 0, -\frac{1}{D_z}\right) \text{ and } Q = \left(0, \frac{1}{D_y}, -\frac{1}{D_z}\right).$$

One advantage of using a reciprocal basis is that each reciprocal may be evaluated to some accuracy (usually less accurate than comparable floating point operations) and then those evaluated values may be treated as if they were exact, in essence perturbing the direction of the ray direction for the sake of improving the accuracy of all intersection testers (improving consistency across the board). Another advantage of using a reciprocal basis is that it provides more flexibility in how the intersection distance, if required, is calculated. In particular, if a point of intersection (relative to the ray basis coordinate system) $(p_x, p_y, p_z)$ is determined, for example via barycentric interpolation, then the intersection parameter t may be alternatively computed as $$\frac{1}{D_x}p_x, \frac{1}{D_y}p_y \text{ or } \frac{1}{D_z}p_z.$$

This may provide superior error characteristics if, for example, the component is selected corresponding to the axis for which a given convex polygon's components have the smallest range. This is in contrast with a non-reciprocal basis for which it is less cost effective to perform a calculation involving the reciprocals $$\frac{1}{D_x} \text{ and } \frac{1}{D_y}$$

without additional per ray storage. Pre-computing these additional terms would also potentially sacrifice some of the consistency in the definition of the ray since the computed reciprocals could not in general be treated as exact. Since the reciprocal basis projection operation also involves products of vertex components of the form $$\frac{1}{D_x}v_x, \frac{1}{D_y}v_y \text{ and } \frac{1}{D_z}v_z,$$

these intermediate products may be retained so that the intersection parameter t is obtained directly from barycentric interpolation without the need for any further scaling (described in more detail later in the document).

Table 1 below shows eight examples (denoted A to H) of different ray formats and basis vectors (up to sign) which may be used in different examples. The phrase "up to sign" here means that P and Q can be scaled by any unit value, i.e. restricted to the set $\{-1, +1\}$. Table 1 also shows the number of multiply and reciprocal operations that would be performed per ray for the different ray formats, the number of multiply operations that would be performed per vertex for the projection into 2D ray space with its corresponding basis, and the reciprocal and multiply operations that would be performed per primitive for the intersection distance calculation.

TABLE 1

Example ray formats and basis vectors

| # | Ray Format | Implicit Basis vectors | Ray Muls (per Ray) | Ray Recips (per Ray) | Muls (per Vertex) | Distance Recips (per Prim.) | Distance Muls (per Prim.) |
|---|---|---|---|---|---|---|---|
| A | $(D_x, D_y, D_z)$ | $P = (D_z, 0, -D_x)$ | 0 | 0 | 4 | 1 | 1 |
| B | $\left(D_x, D_y, \frac{1}{D_z}\right)$ | $Q = (0, D_z, -D_y)$ | 0 | 1 | 4 | 0 | 1 |
| C | $\left(\frac{1}{D_x}, \frac{1}{D_y}, D_z\right)$ | $P = \left(\frac{1}{D_x}, 0, -\frac{1}{D_z}\right)$ | 0 | 2 | 3 | 1 | 0 |
| D | $\left(\frac{1}{D_x}, \frac{1}{D_y}, \frac{1}{D_z}\right)$ | $Q = \left(0, \frac{1}{D_y}, -\frac{1}{D_z}\right)$ | 0 | 3 | 3 | 0 | 0 |
| E | $\left(\frac{D_x}{D_z}, \frac{D_y}{D_z}, D_z\right)$ | $P = \left(1, 0, -\frac{D_x}{D_z}\right)$ | 2 | 1 | 2 | 1 | 1 |
| F | $\left(\frac{D_x}{D_z}, \frac{D_y}{D_z}, \frac{1}{D_z}\right)$ | $Q = \left(0, 1, -\frac{D_y}{D_z}\right)$ | 2 | 1 | 2 | 0 | 1 |
| G | $\left(\frac{D_z}{D_x}, \frac{D_z}{D_y}, D_z\right)$ | $P = \left(\frac{D_z}{D_x}, 0, -1\right)$ | 2 | 2 | 2 | 1 | 1 |
| H | $\left(\frac{D_z}{D_x}, \frac{D_z}{D_y}, \frac{1}{D_z}\right)$ | $Q = \left(0, \frac{D_z}{D_y}, -1\right)$ | 2 | 3 | 2 | 0 | 1 |

The different options for the ray formats and basis vectors can be compared with each other based on the total cost of all the floating point operations (FLOPs) from both the ray format encoding, the basis projection and the distance calculation. When the pre-processing of a ray into a given format (e.g. one of the options shown as A to H in Table 1) is decoupled from the polygon intersection testing and performed once per ray, and given that a single ray is tested against multiple vertices, then offloading FLOP costs from the basis projection onto the ray format encoding to minimise the former tends to be beneficial. When a single ray is tested against multiple primitives, then offloading FLOP costs from the distance calculation onto the ray format encoding to minimise the former is also beneficial.

Options B, D, F and H are generally all improvements over A, C, E and G respectively, as they shift the reciprocal from the (per primitive) distance calculation to the (per ray) ray format encoding.

Option B (and option A) is the default ray format/basis which is the most intuitive way to perform the intersection testing but is not the most efficient in terms of the number of floating point operations that need to be performed. Option F (and option E) reduces the number of multiply operations that are performed per vertex in the basis projection by two relative to option B (and option A).

Options C, D, G and H use reciprocal bases. Option D (and option C) reduces the number of multiply operations that are performed per vertex in the basis projection by one, and reduces the number of multiply operations that are performed per primitive in the distance calculation by one, relative to option B (and option A).

Option H (and option G) reduces the number of multiply operations that are performed per vertex in the basis projection by two relative to option B (and option A).

Using the ray-coordinate system with basis vectors as described in the examples above can simplify some of the processing involved in intersection testing. In particular, if a basis vector has a 0 as a component value then a multiply and/or add operation (e.g. as used for performing a dot product or a cross product) involving that basis vector will not include a multiply and/or an add operation for the component which is 0, thereby reducing the number and/or complexity of operations that need to be performed. Similarly, if a basis vector has ±1 as a component value then a multiply and/or add operation (e.g. as used for performing a dot product or a cross product) involving that basis vector will not include a multiply operation for the component which is ±1, thereby reducing the number and/or complexity of operations that need to be performed. Reducing the number of operations that are performed will tend to reduce the latency and power consumption of the intersection testing module 108 and, additionally, reducing the complexity of operations that are performed will tend to increase the accuracy. Furthermore, when the intersection testing module 108 is implemented in fixed function circuitry then reducing the number and/or complexity of operations that are performed will tend to reduce the size (i.e. the silicon area) of the intersection testing module 108. For example, the fixed function circuitry may comprise one or more multiply-and-add components (e.g. a fused singly rounded multiply-add unit) for performing multiplications and additions using the second and third basis vectors of the ray-coordinate system. In a singly rounded floating point implementation (i.e. rounding is applied to the exact final result to ensure a representable value is output), this is more accurate and typically smaller in area than a sum of products, multiply rounded (both products and sum). Its area may even be comparable to a less accurate multiply rounded implementation, which is less likely to be the case for more complex operations. Floating point add and multiply operations (unlike the real numbers they approximate) are not associative. Reducing the operations, which reduces the possible orderings, thus may have other benefits in terms of consistency of results.

In the main examples described herein the ray data for the rays has n=3 coefficients. However, in other examples, the ray data could have more than three coefficients. The construction of the ray coordinate system described can be applied to any dimension n≥2. For example, n basis vectors of the ray coordinate system can be defined where a first of the basis vectors of the ray coordinate system is aligned with the ray direction, and there are (n−1) other basis vectors which are orthogonal to the first basis vector. If n>2 then no pairing of the (n−1) other basis vectors are parallel. Furthermore, the (n−1) other basis vectors have zeros for (n−2) components when expressed in the space-coordinate system. The n basis vectors of the ray coordinate system form a basis of n-dimensional space (they are linearly independent and hence spanning). For example, in a four dimensional space, the ray direction vector may be D=($D_w,D_x,D_y,D_z$), and the four basis vectors of the ray coordinate system may be: S=A($D_w,D_x,D_y,D_z$), P=B($D_z,0,0,-D_w$) and Q=C(0,$D_z$,0,−$D_z$), R=D(0,0,$D_z$,−$D_y$), where in this example, the selective permutation of the axes ensures that $D_z$ is the major component of the ray direction vector, i.e. $|D_z|\geq|D_w|$, $|D_z|\geq|D_x|$ and $|D_z|\geq|D_y|$. In this example, A, B, C and D are nonzero scalars, and they may be chosen to make one of the coefficients unital, e.g. as described above in relation to the three dimensional examples. In this example, the four dimensions may correspond to three spatial dimensions and one temporal dimension. In the 4D case, an expression for the sign of the determinant (similar to expression (1) given above for the 3D case) may be given as:

$$\text{sgn}(A) \text{ XOR sgn}(B) \text{ XOR sgn}(C) \text{ XOR sgn}(D) \text{ XOR sgn}(\sigma) \quad (2)$$

As an example, the permutation sigma may reverse the mapping sign if the major component of the ray direction vector is the W or the Y axis, but not if the major component of the ray direction vector is the X or the Z axis. In particular, in this example, permuting the components so that the major component is in the final position may involve a four cycle for a major axis of W and a transposition for a major axis of Y, in both cases flipping the sign. The sign of $D_z$ does not factor in expression (2) because n is even (i.e. n=4).

Returning to the 3D case, in some examples, the ray and the convex polygon are transformed from the space-coordinate system into the ray-coordinate system, wherein the intersection testing is performed in the ray-coordinate system. Testing in the ray-coordinate system could be performed by determining if the ray intersects with the convex polygon defined by its vertices as defined in the ray-coordinate system. However, in some other examples, a full transformation of the ray and the convex polygon into the ray-coordinate system does not need to be performed. In these other examples, the polygons can be projected onto a pair of axes corresponding to the second and third basis vectors of the ray coordinate system, but components of the polygons along the ray direction (i.e. in the direction of the first basis vector of the ray coordinate system) might not be determined. It is noted that defining the ray in the ray-coordinate system is trivial because its origin is at the origin of the ray-coordinate system and its direction is parallel to the S axis, such that its component values along the P and Q axes of the ray-coordinate system are zero.

In the examples described above, the axes are selectively permuted to ensure that $D_z$ is the major component of the ray direction vector. Furthermore, the axes may be selectively reversed (or "reflected") to ensure that all of the components of the ray direction vector are non-negative, i.e. $D_z>0$, $D_x\geq0$ and $D_y\geq0$. The selective reversing of the axes causes the ray direction vector to point into the octant of the space-coordinate system which has positive values for x, y and z. Since $D_z$ is the major component of the ray direction vector this means that $$\frac{D_x}{D_z} \text{ and } \frac{D_y}{D_z}$$

are in a range from 0 to 1 and it means that $$\frac{D_z}{D_x} \text{ and } \frac{D_z}{D_y}$$

are in an interval from 1 to positive infinity. After the selective permutation and selective reversing of the axes, $D_z\geq D_x\geq 0$ and $D_z\geq D_y\geq 0$.

Returning to the sign of the change of basis, forcing the signs of $D_x$, $D_y$ and $D_z$ to be nonnegative means that any appearance of them in the determinant, sgn(A), sgn(B) or sgn(C) is forced to 1, simplifying the post sign modification. However, as the vector coordinates must be reversed/reflected to match the reversal/reflection of the ray coordinates, the sign must be post-modified by sgn(Dx), sgn(Dy) and sgn(Dz). So for the particular choices of A, B and C given in the example above, this results in the same sign modification expression.

A mapping indication of the sign of the change-of-basis mapping can be stored, wherein the mapping indication indicates whether the mapping from the space-coordinate system to the ray-coordinate system affects the perceived polygon orientation. The mapping indication can be used during intersection testing of the ray with a polygon to ensure the correct orientation (perceived by the ray in the original space-coordinate system) is output.

Figure 3:
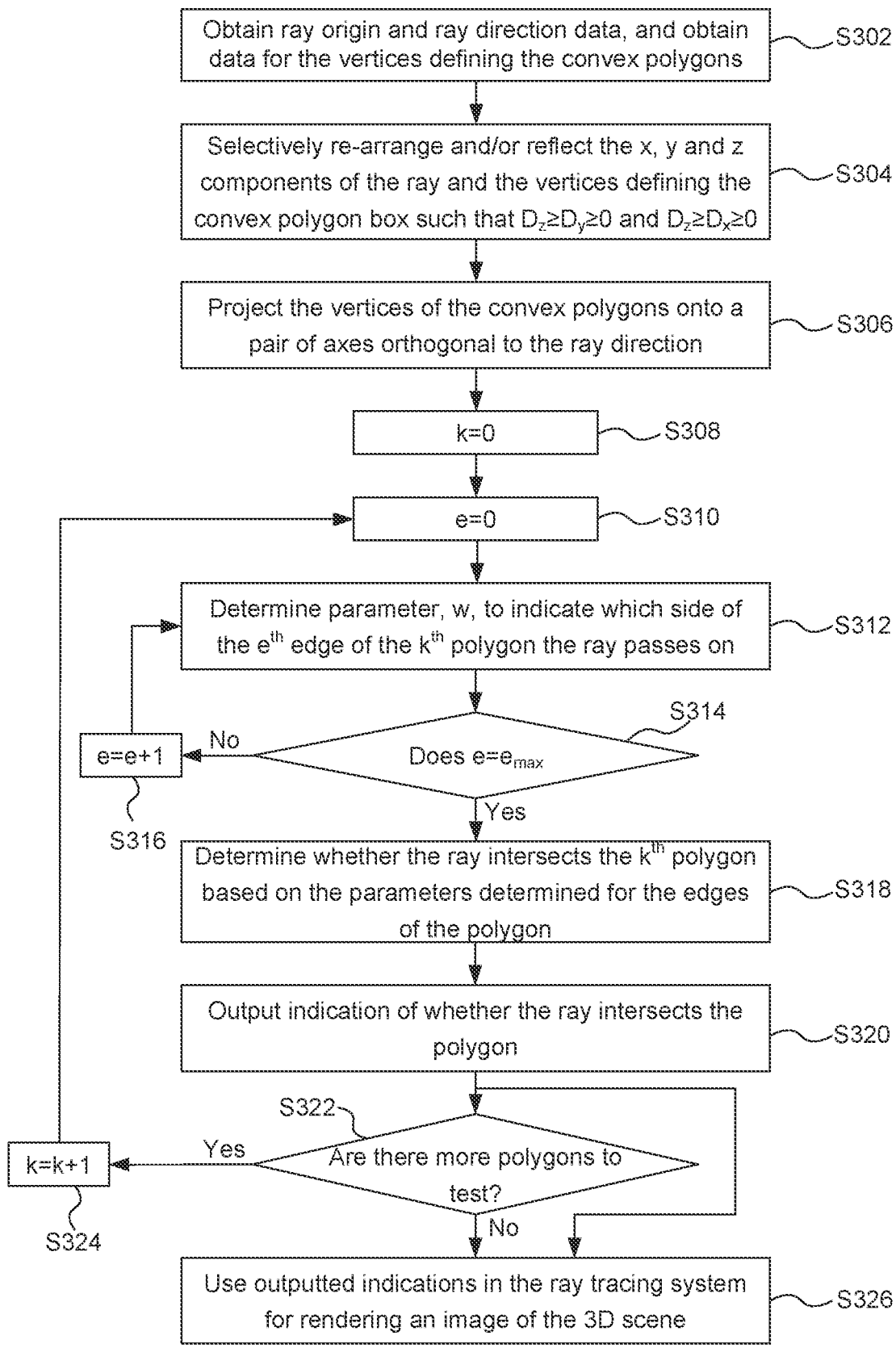
FIG. 3 is a flow chart for a method of performing intersection testing for a ray with respect to a plurality of convex polygons according to examples described herein.

FIG. 3 is a flow chart for a method of performing intersection testing for a ray with respect to a plurality of convex polygons (e.g. triangles), performed by the polygon intersection testing unit(s) 114 of the intersection testing module 108. Prior to the intersection testing of the ray with respect to the polygons performed by the polygon intersection testing unit(s) 114, the ray may be tested by the box intersection testing unit(s) for intersection, with boxes representing nodes of an acceleration structure, wherein the ray is scheduled for intersection with a polygon if the ray is determined to intersect a leaf node of the acceleration structure which references the polygon.

In step S302 data defining the ray 202 and data for the vertices defining the convex polygons 204 and 206 are obtained at the intersection testing module 108. In particular, data defining the components of the ray origin and the ray direction in the space-coordinate system are obtained. The data defining the ray origin may be the three components of the ray origin position in the space-coordinate system, $O_x$, $O_y$ and $O_z$. In the example shown in FIG. 3, the data defining the ray direction comprises the three components of the ray direction in the space-coordinate system, $D_x$, $D_y$ and $D_z$. Alternatively, as described above, some different values defining the ray direction may have been pre-computed and stored in a store, such that in step S302 the pre-computed values may be read. For example, three values may be read to define the ray direction data, and these three values may be $$\frac{D_x}{D_z}, \frac{D_y}{D_z} \text{ and } \frac{1}{D_z}.$$

In other examples, afferent pre-computed values may be read to define the ray direction, e.g. values of $$\frac{D_z}{D_x}, \frac{D_z}{D_y}$$

and $D_z$ may be read. As another example, values of $$\frac{D_z}{D_x}, \frac{D_z}{D_y} \text{ and } \frac{1}{D_z}$$

may be read. As another example, values of $$\frac{1}{D_x}, \frac{1}{D_y} \text{ and } \frac{1}{D_z}$$

may be read. In other examples, other values may be pre-computed and read which can be used to define the ray direction. The roles of these three values are distinct, and they are not always all needed. A first and key purpose of a triangle tester is an intersection determination. This uses the first two values, e.g. either $$\frac{D_x}{D_z} \text{ and } \frac{D_y}{D_z} \text{ or } \frac{D_z}{D_x} \text{ and } \frac{D_z}{D_y}$$

or similar, possibly with some signs depending on the choice of B and C. These are used to generate P and Q against which the primitive vertices are projected. The barycentric coordinates of an intersection point can be derived from the intersection determination without additional input. A second purpose of a triangle tester is an orientation determination (e.g. for back-face culling). This additionally uses the sign of the third value $$\text{sgn}\left(\frac{1}{D_z}\right) = \text{sgn}(D_z)$$

to ensure correct results, as per the determinant form. A third and final purpose of a triangle tester is an intersection distance calculation. This additionally uses the magnitude of the third value, i.e. either $$\frac{1}{|D_z|}$$

or $|D_z|$, to rescale the distance value correctly. If the third purpose is not needed (e.g. when the ray has infinite range or $t_{min}$ and $t_{max}$ have been pre-scaled accordingly), then $$\frac{1}{|D_z|}$$

or $|D_z|$ may not be required as input. If the second purpose is not needed (e.g. when no distinction is made between hitting either side of the primitive), then $\text{sgn}(D_z)$ may not be required. Alternatively, an intersection distance calculation may use any of $$\frac{1}{D_x}, \frac{1}{D_y} \text{ or } \frac{1}{D_z}$$

in conjunction with the corresponding component of the intersection point to determine the intersection distance.

In the example described with reference to FIG. 3, data defining the x, y and z components of the positions of the vertices defining the convex polygons 204 and 206 is read in step S302.

In step S304 the x, y and z components of the data defining the ray and the vertices defining the convex polygons are selectively permuted and/or reversed by the intersection testing module 108 (e.g. by the ray rescaling unit 116), such that $D_z \geq D_x \geq 0$ and $D_z \geq D_y \geq 0$. The permutation of the axes may be thought of as rearranging the axes. In particular, a permutation of the axes comprises either a rotation of three axes, a transposition of two axes or the identity (i.e. not changing the axes). It is noted that a permutation involving a transposition of two axes will alter the handedness of the coordinate system, whereas a permutation that does not involve a transposition of two axes will not alter the handedness of the coordinate system. The permutation of the axes is performed so that the major component of the ray direction is $D_z$ (i.e. ensuring that $|D_z| \geq |D_x|$ and $|D_z| \geq |D_y|$). For example, if the original z component of the ray direction vector has a larger magnitude than the original x and y components of the ray direction vector then no permutation is used (which may be thought of as the permutation using the identity operation); if the original x component of the ray direction vector has a larger magnitude than the original y and z components of the ray direction vector then the permutation may comprise a rotation of the three axes such that the x components become the z components, the z components become the y components, and the y components become the x components; and if the original y component of the ray direction vector has a larger magnitude than the original x and z components of the ray direction vector then the permutation comprises a transposition of the y and z axes such that the y components become the z components, and the z components become the y components (and the x components stay as the x components). It would be possible to just perform the selective permutation in step S304 (i.e. not perform the selective reversing), but in the method described with reference to FIG. 3, the selective reversing of zero, one or more of the axes is performed so that the ray direction is into the octant with positive x, y and z. The "reversing" of the axes, may be referred to as "reflecting", "inverting" or "negating", and may involve changing the sign of all of the component values in the dimension along the axis in question. The data defining the ray comprises the ray origin and the ray direction, and the data defining the convex polygon comprises three or more vertex positions. It is noted that reversing an odd number of the axes reverses the perceived orientation of the polygons.

In step S306, the intersection testing module 108 projects the vertices of the convex polygons onto a pair of axes orthogonal to the ray direction, wherein the origin of the pair of axes corresponds with the ray origin. This projection of the vertices of the convex polygons onto a pair of axes orthogonal to the ray direction may comprise transforming the vertices of the convex polygons into the ray coordinate system described above. As described above, the ray-coordinate system has an origin at the ray origin, so step S306 may involve subtracting the respective components of the ray origin ($O_x$, $O_y$ and $O_z$) from respective components of the data defining the positions of the vertices defining the polygons, to thereby determine components of the positions of the vertices defining the polygons relative to the ray origin. As described above, the ray-coordinate system has three basis vectors, wherein a first of the basis vectors is aligned with the ray direction; and wherein a second and a third of the basis vectors are respectively aligned with said pair of axes orthogonal to the ray direction, wherein the second and third basis vectors: (i) are not parallel with each other, and (ii) have a 0 as one component when expressed in the space-coordinate system. As mentioned above, in some examples, the second and third basis vectors may have ±1 as one component when expressed in the space-coordinate system.

The projection can take the form of a dot product. The projection of a 3D vertex $v=(v_x, v_y, v_z)$ to a 2D ray-space coordinate (p, q), with 3D basis vectors $P=(P_x, P_y, P_z)$ and $Q=(Q_x, Q_y, Q_z)$ is as follows:

$$v \to p = P \cdot v = P_x v_x + P_y v_y + P_z v_z$$

$$v \to q = Q \cdot v = Q_x v_x + Q_y v_y + Q_z v_z$$

With the examples of the basis described herein, $P_y=0$ and $Q_x=0$, such that:

$$p = P_x v_x + P_z v_z$$

$$q = Q_y v_y + Q_z v_z$$

This may be implemented by separate multiplications and an addition, or alternatively as a (singly rounded) fused DP2 (2D dot product), which in this latter case would ensure that the computed components have finite relative error with the properties discussed earlier.

Furthermore, with some of the examples of the basis described herein $P_x$ or $P_z$ may be equal to ±1 and $Q_y$ or $Q_z$ may be equal to ±1, respectively, such that either:

$$p = \pm v_x + P_z v_z$$

$$q = \pm v_y + Q_z v_z$$

Or:

$$p = P_x v_x \pm v_z$$

$$q = Q_y v_y \pm v_z$$

Either of these may be implemented by a separate multiplication and addition, or alternatively as a (singly rounded) FMA (fused multiply add), which in this latter case would ensure that the computed components have finite relative error with the properties discussed earlier.

As mentioned above, a mapping indication is stored to indicate whether mapping from the space-coordinate system to the ray-coordinate system (i.e. steps S304 and S306) has altered the perceived orientation of the polygons. If the perceived orientation of the polygons has changed then this is taken into account in the intersection process, e.g. in step S318, in order to ensure that the mapping from the space-coordinate system to the ray-coordinate system in steps S304 and S306 does not prevent the intersection testing module from correctly determining whether a ray intersects a polygon.

Figure 6:
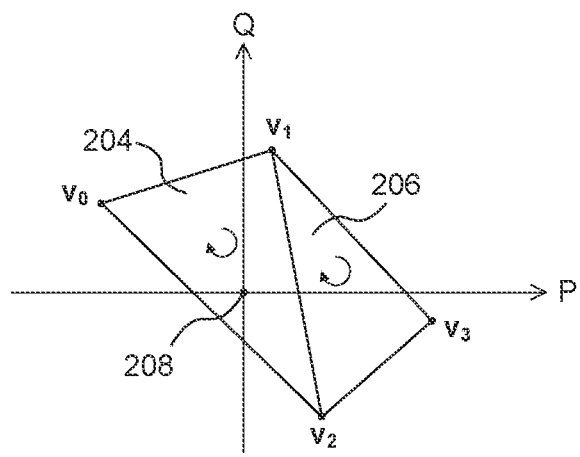
FIG. 6 shows a ray intersecting a polygon.

FIG. 6 illustrates the two polygons 204 and 206 shown in FIG. 2 when they have been projected onto the pair of axes aligned with the basis vectors P and Q (i.e. the second and third basis vectors of the ray coordinate system). In this projection, the ray is at the origin and directed into the page, i.e. the components of the ray direction vector along the P and Q axes are zero. Therefore, the intersection position 208 representing the intersection of the ray with the polygon 204 is at the origin in FIG. 6. Figure six indicates that the orientations of the two polygons 204 and 206 both appear as clockwise in FIG. 2, as determined by the winding order of the vertices in the ordered sets of vertices defining the polygons. In FIG. 6, the ray coordinate system basis vectors P and Q are shown at a right angle to each other even though they may not be orthogonal in the space coordinate system. However, it is clear that this visualisation does not affect the intersection determination for a convex polygon (i.e., whether it covers the origin or not).

In step S308 a parameter, k, is set to zero. The parameter, k, is used to indicate a particular convex polygon.

In step S310 a parameter, e, is set to zero. The parameter, e, is used to indicate a particular edge of a convex polygon. It is noted that the polygon's winding order (i.e., the order of its vertices) specifies a direction for each of its edges, such that every edge given below is implicitly a directed edge. In the example in which the polygons are triangles then the maximum value ($e_{max}$) for the parameter, e, is 2. In other words the parameter, e, can take values of 0, 1 or 2 to indicate the three edges of a triangle. In the example in which the polygons have n edges then the maximum value ($e_{max}$) for the parameter, e, is n−1. Each edge of a convex polygon is defined by two of the projected vertices as an ordered pair, indicating the direction of the edge. For example polygon 204 shown in FIG. 6 has a first edge defined by the projected vertices $v_0$ and $v_1$, i.e., directed from $v_0$ to $v_1$, a second edge defined by the projected vertices $v_1$ and $v_2$, i.e., directed from $v_1$ to $v_2$, and a third edge defined by the projected vertices $v_2$ and $v_0$, i.e., directed from $v_2$ to $v_0$. Similarly, polygon 206 shown in FIG. 6 has a first edge defined by the projected vertices $v_1$ and $v_3$, i.e., directed from $v_1$ to $v_3$, a second edge defined by the projected vertices $v_3$ and $v_2$, i.e., directed from $v_3$ to $v_2$, and a third edge defined by the projected vertices $v_2$ and $v_1$, i.e., directed from $v_2$ to $v_1$. The edge between projected vertices $v_1$ and $v_2$ is shared between polygons 204 and 206, albeit in opposite directions indicating that polygon 204 and 206 are specified with consistent winding orders. In some examples, the method can iterate over each unique edge just the once, rather than iterating over n edges for each convex polygon separately, to take advantage of the sharing of some edges.

In step S312 the polygon testing unit(s) 114 of the intersection testing module 108 determines a parameter, w, indicative of which side of the $e^{th}$ edge of the $k^{th}$ polygon the ray passes on. For example, w may be a signed parameter which is determined using a function (which is referred to herein as a "2D cross product"), $f(v_i, v_j)$, of the positions of the two projected vertices defining the $e^{th}$ edge of the $k^{th}$ polygon. The 2D cross product, $f(v_i, v_j)$, of the positions of two projected vertices, $v_i$ and $v_j$, defining an edge, is defined as $f(v_i, v_j) = p_i q_j − q_i p_j$, where $p_i$ and $q_i$ are components of the projected vertex $v_i$ along the respective axes of the pair of axes, and where $p_j$ and $q_j$ are components of the projected vertex $v_j$ along the respective axes of the pair of axes. In other examples, other functions of the positions of the two projected vertices defining the edge may be used to determine the parameter w. For example, the function may return the result of a comparison of $p_iq_j$ and $q_ip_j$, which would avoid performing a subtraction operation, but would not provide a magnitude for use in determining barycentric coordinates. The sign of w for the $e^{th}$ edge of the $k^{th}$ polygon indicates whether the ray passes on the left or the right of that edge, from the edge's perspective (directed from $v_i$ to $v_j$). Passing on the "left" side of the edge corresponds to an anticlockwise rotation from the first endpoint to the second endpoint relative to the origin. Passing on the "right" side of the edge corresponds to a clockwise rotation from the first endpoint to the second endpoint relative to the origin. With the form of the "2D cross product" given above as $f=(v_i,v_j)=p_iq_j-p_ip_j$, and with a first axis pointing rightwards and a second axis pointing upwards, left/anticlockwise corresponds to a positive result of f and right/clockwise corresponds to a negative result of f. In the IEEE floating point specification, a negative value has a sign bit of 1, whereas a positive value has a sign bit of 0. Assuming a left-handed system (as per FIG. 2), and aligning the first axis P and second axis Q with right and up respectively in projected space, means the third axis S (the ray direction) points into the page, giving the corrected perceived orientation. In a right-handed system the third axis S points out of the page, giving the wrong perceived orientation. To summarise we have the following correspondences: for a left-handed system: (i) left side↔anticlockwise↔positive↔0 for the sign bit of f; and (ii) right side↔clockwise↔negative↔1 for the sign bit of f. For a right-handed system: (i) left side→anticlockwise→negative→1 for the sign bit of f; and (ii) right side→clockwise→positive→0 for the sign bit of f. In some examples, "anticlockwise" is encoded as a 1, and "clockwise" is encoded as a 0. Therefore, in a right-handed system the sign bit of w gives the correct flag state; where as in a left-handed system the sign bit of w gives the opposite flag state, so the orientation result is post-inverted. To achieve this, a winding flag may be supplied to the user, to set when a left-handed space coordinate system is required, to indicate that all edges should be treated as pointing in the opposite direction.

The parameter w is determined using the 2D cross product in different ways in different implementations. Two examples are described in detail below with reference to FIGS. 4 and 5 respectively. For example, the two projected vertices $v_i$ and $v_j$, defining an edge, may be provided to the 2D cross product, $f(v_i,v_j)$, in the order given by the directed edge, which is inherited from the ordered set of vertices defining the convex polygon (i.e., its winding order). For example, the 2D cross product for the shared edge of polygons 204 and 206 will be given as $f(v_1,v_2)=p_1q_2-q_1p_2$ for the edge of the polygon 204, and will be given as $f(v_2,v_1)=p_2q_1-q_2p_1$ for the edge of the polygon 206.

The function $f(v_i,v_j)=p_iq_j-q_ip_j$, referred to herein as a "2D cross product", is a 2D analogy to the 3D triple product: it calculates the signed area of a parallelogram defined by a first edge between the origin and $(p_0, q_0)$ and a second edge between the origin and $(p_1, q_1)$. This is equivalent to generating the determinant of the matrix with rows $(p_i, q_i)$ for i=0,1. It is also equivalent to considering the endpoints as complex numbers, taking the complex conjugate of the first endpoint, multiplying this with the second endpoint and looking at the imaginary component. Considering all cases geometrically, the sine of the angle between the two endpoints and the origin (i.e. intersection point) is found, scaled by the distances of the two endpoints from the origin. Sine is an odd function, so we have a signed function, i.e. we get a positive result if we rotate anticlockwise from the first endpoint to the second endpoint, and a negative result if we rotate clockwise from the first endpoint to the second endpoint (with standard axes).

After parameter w is determined using the 2D cross product for the $e^{th}$ edge of the $k^{th}$ polygon in step S312, then in step S314 the polygon testing unit(s) 114 of the intersection testing module 108 determines whether $e=e_{max}$. In other words, it determines whether the w parameter has been determined for all of the edges of the $k^{th}$ polygon. If not, then the method passes to step S316 in which the parameter, e, is incremented, and then the method passes back to step S312 so that the parameter w can be determined for the next edge of the $k^{th}$ polygon. If it is determined in step S314 that the w parameter has been determined for all of the edges of the $k^{th}$ polygon (i.e. if $e=e_{max}$) then the method passes to step S318.

In step S318 the polygon intersection testing unit(s) 114 of the intersection testing module 108 determines whether the ray intersects the $k^{th}$ polygon based on the w parameters determined for the edges of that polygon. For example, the determination as to whether the ray intersects the $k^{th}$ polygon may be based on the signs of the w parameters determined for the edges of the $k^{th}$ polygon. In an example, if the w parameters determined for the edges of the $k^{th}$ polygon all have the same sign then it is determined that the ray intersects the $k^{th}$ polygon; whereas if it is not the case that the w parameters determined for the edges of the $k^{th}$ polygon all have the same sign then it is determined that the ray does not intersect the convex polygon. In this way, step S318 comprises using the parameters determined for the edges of the convex polygon to determine whether the ray passes on the inside of the edges of the convex polygon, wherein it is determined that the ray intersects the convex polygon if it is determined that the ray passes on the inside of all of the edges of the convex polygon, and wherein it is determined that the ray does not intersect the convex polygon if it is determined that the ray passes on the outside of one or more of the edges of the convex polygon.

In some examples, as soon as an edge test indicates that the ray passes on the outside of an edge of a polygon, then a determination can be made that the ray does not intersect the polygon, without necessarily performing the edge tests for all of the edges of the polygon. For example, step S314 could be modified to also identify, after we have processed at least 2 edges, if we have one or more determined w parameters that are strictly positive and one or more w parameters that are strictly negative for edges of a polygon, and in that case the polygon may be marked as a "miss" without determining w parameters for any remaining edges of the polygon.

Furthermore, for an intersection to be determined, as well as all n signs of w matching, the signs of w might need to match some predetermined value (e.g., when back-face culling), and if they do not match the predetermined value then the polygon can be discarded. For example, if culling is enabled for clockwise/anticlockwise primitives or front/back-facing primitives (e.g., back-face culling), then as soon as a single edge test result is determined then it might be possible to discard the primitive. For example, if anticlockwise primitives are being culled then any primitive with an intersection point on the left of an edge can be discarded, likewise if clockwise primitives are being culled then any primitive with an intersection point on the right of an edge can be discarded. Furthermore, many edges may be shared (perhaps with reversed directions) within a single batch of convex polygons, and in this situation each unique edge may be tested once and the results for a shared edge can be duplicated (perhaps with reversed sign) across both polygons sharing the edge.

In some examples, the presence of one or more w parameters with zero magnitude may be treated as a special case. For example, if the w parameters for all of the edges of the polygon have non-zero magnitude, it may be determined that the ray intersects the $k^{th}$ polygon only if all edges have matching signs for their w parameters (similar to as described above), but if, one or more w parameters have zero magnitude then an intersection is determined only if all of the zero magnitude w parameters (for edges of nonzero projected length) have a particular sign (e.g. a positive sign, or in other examples, a negative sign) and if all remaining edges with nonzero w parameters have mutually consistent sign. In these examples, the signs of the one or more w parameters which have zero magnitude do not necessarily have to match the signs of the one or more w parameters which have non-zero magnitude to determine that the ray intersects the polygon. In this way, the determination of whether the ray intersects the convex polygon (in step S318) comprises: (i) determining that the signed parameter, w, for any edge of the convex polygon which has zero magnitude has a particular sign (e.g. positive in some examples, and negative in other examples), and (ii) determining that the signed parameters, w, for edges of the convex polygon which have non-zero magnitude have signs that are consistent with each other (albeit not necessarily consistent with the signs of the w parameters which have zero magnitude). Furthermore, in some examples, it may be determined that the ray does not intersect the $k^{th}$ polygon if all edges generate w parameters with zero magnitude, indicating degeneracy. In other words, in order to omit degenerate polygons, if the 2D cross products for all of the edges of the convex polygon have a magnitude of zero then it can be determined that the ray does not intersect the convex polygon. If culling is enabled, primitives may be discarded based on the sign of the edges with nonzero w parameters, as described in the previous paragraph. Furthermore, as described and in addition to the previous paragraph, it is not necessary to determine all n w parameters once any pair of edges with nonzero w parameters is determined to have conflicting signs or, in some examples, once a w parameter is determined to have zero magnitude. In this latter case, it may be determined that intersection does not occur if the w parameter (for an edge of nonzero projected length) does not have the necessary sign. Alternatively, for a nondegenerate strictly convex polygon, it may be determined that intersection does occur if precisely two w parameters (for edges of nonzero projected length) both have the necessary sign (guaranteeing sign consistency of the remaining edges with nonzero w parameters), since the magnitudes of at most two w parameters (for edges of nonzero projected length) may be zero (one zero w parameter indicates edge intersection and two zero w parameters indicate vertex intersection). In the "sign-equality test", a pair of equal signs of zero parameters (for edges of nonzero projected length) likewise determines an intersection, but this property often may not be exploited as edges with zero w parameters are generally not distinguished in this intersection test. This latter case assumes culling has not been enabled, as this may require checking the sign of one of the edges with nonzero w parameters.

In some examples, the signed parameter, w, for an edge equals the 2D cross product for the edge. In other examples, the signed parameter, w, equals the 2D cross product multiplied by a positive constant (e.g., ½). In other examples, the signed parameter, w, equals the 2D cross product multiplied by a negative constant (e.g., −1), but in this case all orientation determinations are reversed. In the example shown in FIG. 6, the 2D cross product for the first edge of polygon 204 defined by vertices $v_0$ and $v_1$ is given by $f(v_0,v_1)=p_0q_1-q_0p_1$, and it will be appreciated by considering FIG. 6 that this is a negative nonzero value. For a polygon with a clockwise orientation as viewed given its winding (as indicated in FIG. 6) a negative nonzero value for the 2D cross product for an edge indicates that the ray may pass on the inside of the convex polygon, as the ray passes on the right of the edge, from the (directed) edge's perspective, whereas a positive non-zero value for the 2D cross product for an edge indicates that the ray does pass on the outside of the convex polygon, as the ray passes on the left of the edge, from the (directed) edge's perspective. Conversely, for a polygon with an anticlockwise orientation as viewed (not shown in FIG. 6) a negative non-zero value for the 2D cross product for an edge indicates that the ray does pass on the outside of the convex polygon, as the ray passes on the right of the edge, from the (directed) edge's perspective, whereas a positive non-zero value for the 2D cross product for an edge indicates that the ray may pass on the inside of the convex polygon, as the ray passes on the left of the edge, from the (directed) edge's perspective. For a polygon of either orientation as viewed, a zero value for the 2D cross product for an edge indicates that ray intersects exactly with the edge, i.e. with the boundary of the convex polygon. The 2D cross product for the second edge of polygon 204 defined by vertices $v_1$ and $v_2$ is given by $f(v_1,v_2)=p_1q_2-q_1p_2$, and it will be appreciated by considering FIG. 6 that this is a negative value, thereby indicating that the ray may pass on the inside of the convex polygon, as the ray passes on the right of the second edge. The 2D cross product for the third edge of polygon 204 defined by vertices $v_2$ and $v_0$ is given by $f(v_2,v_0)=p_2q_0-q_2p_0$, and it will be appreciated by considering FIG. 6 that this is a negative value, thereby indicating that the ray may pass on the inside of the convex polygon, as the ray passes on the right of the third edge. Having checked all three edges of the convex polygon 204 the w parameters, which are based on the 2D cross products, have the same sign (in particular they are all negative, indicating a clockwise orientation as viewed), so the ray is determined to pass on the inside of and intersect the polygon 204. It can be seen that the intersection point 208 is within the polygon 204.

The 2D cross product for the first edge of polygon 206 defined by vertices $v_1$ and $v_3$ is given by $f(v_1,v_3)=p_1q_3-q_1p_3$, and it will be appreciated by considering FIG. 6 that this is a negative value. Polygon 206 has a clockwise orientation as viewed given its winding, so the ray may pass on the inside of the convex polygon, as the ray passes on the right of the first edge of polygon 206 defined by vertices $v_1$ and $v_3$. The 2D cross product for the second edge of polygon 206 defined by vertices $v_3$ and $v_2$ is given by $f(v_3,v_2)=p_3q_2-q_3p_2$, and it will be appreciated by considering FIG. 6 that this is a negative value, thereby indicating that the ray may pass on the inside of the convex polygon, as the ray passes on the right of the second edge. The 2D cross product for the third edge of polygon 206 defined by vertices $v_2$ and $v_1$ is given by $f(v_2,v_1)=p_2q_1-q_2p_1$, and it will be appreciated by considering FIG. 6 that this is a positive value, thereby indicating that the ray does pass on the outside of the convex polygon, as the ray passes on the left of the third edge. Therefore, it is not the case that the w parameters, which are based on the 2D cross products, for all the edges of polygon 206 have the same sign. In particular, the w parameters, which are based on the 2D cross products, for the first and second edges of polygon 206 are negative, whilst the w parameter, which is based on the 2D cross product, for the third edge of polygon 206 is positive. Therefore, the ray is determined to not intersect the polygon 206, nor can a consistent orientation be established. It can be seen that the intersection point 208 is outside the polygon 206. It is noted that for a valid convex polygon, it is not possible for the ray to pass on the outside of all the edges of the polygon (e.g. for a polygon with a clockwise orientation as viewed, it is not possible for the ray to pass on the left of all of the edges of the polygon), so if the w parameters, which are based on the 2D cross products, for all the edges of the polygon have the same sign then this indicates that the ray passes on the inside of all the edges, such that the ray is determined to intersect the polygon (e.g. if the w parameters for all the edges of a polygon with a clockwise orientation have the same sign then this indicates that the ray passes on the right of all the edges). It is also noted that for a valid convex polygon and an anticlockwise orientation as viewed, it is not possible for the ray to pass on the right of all the edges of the polygon, so if the w parameters, which are based on the 2D cross products, have the same sign for all edges of the polygon then this indicates that the ray passes on the left of all the edges, such that the ray is determined to intersect the polygon. Hence it can be deduced that, for a convex polygon of unknown orientation, if the w parameters have the same sign for all edges of the polygon then its orientation as viewed is indicated by any one of its edge signs.

Following step S318 the method passes to step S320 in which the polygon testing unit(s) 114 of the intersection testing module 108 outputs an indication of the result of the determination of whether the ray intersects the $k^{th}$ polygon. This indication could be a binary indication (e.g. a one-bit flag) to indicate either a 'hit' or a 'miss' of the ray in respect of the polygon. In other examples, the indications could have different forms. Alongside an indication of whether intersection occurs, there may be additional output attributes, e.g., barycentric coordinates, orientation (clockwise/anticlockwise or front/back facing), and/or an intersection distance.

In step S322 the polygon testing unit(s) 114 of the intersection testing module 108 determines whether there are more polygons to test. If so, then the method passes to step S324 in which the parameter, k, is incremented, and then the method passes back to step S310 so that steps S310 to S320 can be performed for the next polygon in order to determine whether the ray intersects the next polygon. When there are no more polygons to test, the method passes to step S326. Step S326 can be performed before, after or during step S322, i.e. step S326 can be performed following step S320 irrespective of whether there are more polygons to test.

In step S326, the outputted indication is used in the ray tracing system 100 (e.g. by the processing logic 110) for rendering an image of a 3D scene. For example, as well as the indication that the ray intersects a polygon, in step S320 the polygon intersection testing unit(s) 114 of the intersection testing module 108 can output an intersection distance (i.e. a distance between the ray origin and the point at which the ray intersects the polygon), and an indication of the position on the polygon at which the ray intersects it (e.g. defined in barycentric coordinates), and this information can be output to the processing logic 110. In step S326 all the intersection tester output attributes, alongside other external attributes, e.g., scene data (e.g., light source(s), cube map), instance data, primitive/polygon ID, vertex data (e.g., positions, normal, texture coordinates), texture address(es), secondary ray data, etc., are processed to determine a colour value and/or generate additional secondary rays for future traversal.

If barycentric coordinates are output in step S320, the magnitudes of the w parameters for the different edges of a polygon that the ray is determined to intersect may be used for determining the barycentric coordinates. For example, where the polygon is a triangular polygon having vertices $v_0$, $v_1$ and $v_2$, for an intersection of a ray at an intersection point v with, the w values give twice the signed area of the sub-triangles formed by vertices $(v, v_0, v_1)$, $(v, v_1, v_2)$ and $(v, v_2, v_0)$, up to uniform nonzero rescaling from the ray-space projection. The barycentric coordinates (which may be referred to as "areal coordinates") are found by normalising these three w weights (i.e., summing them and dividing through by the total), so that they sum to 1. In particular, normalising the three w weights factors out all uniform scaling. As described above, all non-zero weights have the same sign for an intersection, so their magnitudes (rather than their signed values) can be normalised which reduces the complexity in the floating point operations, because it is simpler to add together three values which are known to be nonnegative than to add three values whose signs are unknown. The resulting barycentric coordinates $\alpha$, $\beta$ and $\gamma$, corresponding to the edges $(v_1, v_2)$, $(v_2, v_0)$ and $(v_0, v_1)$ respectively, define a point of intersection of the ray with the convex polygon $t=O+\alpha v_0+\beta v_1+\gamma v_2$. Finally, note that since the barycentrics, by definition, sum to one, only two of the three values need to be output (although, as described above, all three weights must be computed to perform the normalisation).

If intersection distances are output in step S320, these may be calculated in terms of ray lengths rather than actual Euclidean distances. For example, the length of the ray may be divided through by $\sqrt{D_x^2+D_y^2+D_z^2}$, and the intersection distance can be determined in terms of ray-lengths from the ray origin. In other words, a value $\tau$ is computed, where $t=O+D\tau$ is the point of intersection of the ray with the convex polygon. This value may be determined using the barycentric coordinates according to the intersection equation $D\tau=\alpha v_0+\beta v_1+\gamma v_2$. In some examples, the projected coordinates $s_0$, $s_1$ and $_2$ (where generically $s=A(D_x v_x+D_y v_y+D_z v_z)$) may be used to determine $\tau$, according to the equation $A(D_x^2+D_y^2+D_z^2)\tau=\alpha s_0+\beta s_1+\gamma s_2$ (obtained by multiplying both sides of the intersection equation by the projection matrix). The barycentric interpolated coordinates are then divided by $A(D_x^2+D_y^2+D_z^2)$ to obtain $\tau$. For example, for a rescaled ray with $$A = \frac{1}{D_z}$$

and for which values of $$\frac{D_x}{D_z}, \frac{D_y}{D_z} \text{ and } \frac{1}{D_z}$$

have been pre-computed and stored, the square rescaled ray length $$D'^2 = \left(\left(\frac{D_x}{D_z}\right)^2 + \left(\frac{D_y}{D_z}\right)^2 + 1\right)$$

may be calculated and then τ may be determined as $$\tau = \frac{1}{D_z} \cdot \frac{1}{D'^2}(\alpha s_0 + \beta s_1 + \gamma s_2).$$

Here we see that the $$\frac{1}{D_z}$$

is required to prevent the intersection distance being overcounted by a factor of $D_z$ and motivates the storage of this quantity in the ray format. Note that this extra scaling factor is not required if we do not rescale the ray along the direction of the ray (with A=1) but may use additional storage if we wish to retain the benefits of ray rescaling in the remaining projection operations (e.g. so that we may encode both $$\frac{D_x}{D_z}, \frac{D_y}{D_z}$$

as well as $D_x$, $D_y$ and $D_z$). Also note that in one example $$A = \frac{1}{\left(D_x^2 + D_y^2 + D_z^2\right)},$$

which it precomputed avoids the need to rescale the barycentric interpolated convex polygon coordinates but this too would require additional storage. In other examples, one component of the intersection equation is used to determine τ, so that equivalently $D_x\tau=\alpha v_{0x}+\beta v_{1x}+\gamma v_{2x}$, $D_y\tau=\alpha v_{0y}+\beta v_{1y}+\gamma v_{2y}$ and $D_z\tau=\alpha v_{0z}+\beta v_{1z}+\gamma v_{2z}$. In examples where $$\frac{1}{D_z} \text{ or } \frac{1}{|D_z|}$$

has been pre-computed and stored, it is often most efficient to select the last of these three options so that the intersection distance can be calculated by multiplying the barycentric interpolated vertex z components by the pre-computed reciprocal. If a reciprocal basis is employed (for which $$\frac{1}{D_x}, \frac{1}{D_y}$$

as well as $$\frac{1}{D_z}$$

or some scaling thereof may be pre-computed and stored) then the projection operations involve terms of $$\frac{v_x}{D_x}, \frac{v_y}{D_y} \text{ and } \frac{v_z}{D_z}$$

(which may be thought of as mapping the coordinates to "t" space) or possibly, as in rescaled examples, terms involving $$D_z \frac{v_x}{D_x}, D_z \frac{v_y}{D_y}$$

and $v_z$ (rescaled t space). Since we may write $$\tau = \alpha \frac{v_{0x}}{D_x} + \beta \frac{v_{1x}}{D_x} + \gamma \frac{v_{2x}}{D_x}$$
$$= \alpha \frac{v_{0y}}{D_y} + \beta \frac{v_{1y}}{D_y} + \gamma \frac{v_{2y}}{D_y}$$
$$= \alpha \frac{v_{0z}}{D_z} + \beta \frac{v_{1z}}{D_z} + \gamma \frac{v_{2z}}{D_z},$$

it is possible to determine the intersection distance without any further calculation beyond barycentric interpolation of the scaled values (that feature in the projection calculation) unless the ray has been rescaled, in which case a factor of $$\frac{1}{D_z}$$

is needed as in the general non-reciprocal rescaled basis case. Alternatively, if for example it is not convenient to generate scaled vertex components (in t space) then the barycentric interpolated result may be scaled by the appropriate one of $$\frac{1}{D_x}, \frac{1}{D_y} \text{ and } \frac{1}{D_z}$$

(which may again involve a further scaling by $$\frac{1}{D_z} \text{ if } \frac{D_z}{D_x}, \frac{D_z}{D_y} \text{ and } \frac{1}{D_z}$$

have been pre-computed and stored). Whichever the case, both scaled and unscaled reciprocal bases provide the flexibility to select which axis should be used for interpolation, which as mentioned earlier, allows an axis to be chosen that has the most attractive error properties for a given convex polygon (e.g. by selecting the axis with the minimum range of values across the convex polygon).

In the example shown in FIG. 3, the data defining the ray and the data for the vertices defining the polygon is read in step S302, and then in step S304 the x, y and z components of the ray and the vertices defining the polygon are selectively permuted and/or reversed so that $D_z \geq D_x \geq 0$ and $D_z \geq D_y \geq 0$. However, the ordering of parts of these two steps (steps S302 and S304) may be different in different examples. For example, the selective permutation and/or reversing of the x, y and z components of the ray may be performed before the data is obtained. It can be useful to perform this selective permutation and/or reversing of the x, y and z components of the ray data before the data is read in, so that we know that $D_z \geq D_x \geq 0$ and $D_z \geq D_y \geq 0$ before the data is read in. This allows some pre-computation of the ray data to be performed and the pre-computed data can be stored in a store (e.g. a memory on the ray tracing unit 102)

before it is read into the intersection testing module 108. This means that the processing involved in this pre-computation can be performed once for a ray and used multiple times if the ray is involved in multiple intersection tests. As described above the pre-computed ray direction data that is read by the intersection testing module could comprise values of $$\frac{D_x}{D_z}, \frac{D_y}{D_z}$$

and $D_z$ or $$\frac{1}{D_z},$$

values of $$\frac{D_z}{D_x}, \frac{D_z}{D_y}$$

and $D_z$ or $$\frac{1}{D_z},$$

or values of $$\frac{1}{D_x}, \frac{1}{D_y}$$

and $D_z$ or $$\frac{1}{D_z}$$

to give just some examples, and in other examples, other values may be pre-computed and read in order to define the ray direction. Alongside the pre-computed ray data, an indication of the major axis (e.g., a 2-bit enumeration), indicating the permutation, as well as the original signs of the ray direction components, indicating the reversal, is stored so that the same pre-computation can be applied to the polygon vertices when the ray is to be tested against them (and to post-modify the orientation determination if appropriate). The (only) overhead here is an extra 2 bits for indicating the major axis, but this (negligible) amount of additional storage is outweighed by avoiding finding the major component of the ray direction every time a polygon is tested against the ray.

As described above, an issue can arise in the intersection testing process if the ray intersects a point on an edge of a polygon. For example, if the ray intersects a point on a shared edge, or if the ray intersects a shared vertex of a closed fan, which is shared by multiple polygons, then, in order for the intersection testing process to be "watertight", the polygon intersection testing unit(s) 114 should, in most cases, determine that the ray intersects at least one of the polygons. In order for the intersection testing process to be "non-redundantly watertight", the polygon intersection testing unit(s) 114 should, in most cases, determine that the ray intersects one and only one of the polygons. There are some exceptions to these definitions of what is meant by "watertight" and "non redundantly watertight" intersection testing, as described in detail above. If the intersection testing process is not watertight then rendering errors may be introduced into the rendered images, such as cracks in geometry, which is not desirable. One way to achieve a "watertight" intersection test is to project onto a ray-dependent plane (e.g., given by ray-space basis vectors P and Q), followed by exact determination of whether the polygon, including its boundary, cover the origin (e.g., by establishing whether the origin is inside of, or strictly on, each edge). This is not a "non-redundantly watertight" intersection test as it results in all polygons overlapping, such that all shared edges are hit two (or more) times and all shared vertices of closed fans are hit once for each polygon in the closed fan. The examples outlined below are configured to remove this redundancy.

In some examples described herein a plane vertex ordering scheme is used to ensure that the intersection tests are "non-redundantly watertight". The "plane vertex ordering scheme" may be referred to herein simply as a "vertex ordering scheme". The plane vertex ordering scheme defines a universal ordering of the 2D projected vertices which is independent of the winding order of the vertices (i.e., inherited from the ordered sets of vertices defining the convex polygons). The ordering of the projected vertices according to the plane vertex ordering scheme is a total strict ordering. This implies that, for two distinct projected vertices a and b, we either have a<b or a>b. Note that there is no "natural" total strict ordering of the plane (i.e., consistent with arithmetic operations of the complex numbers) as there is for the line (i.e., consistent with the arithmetic operations of the real numbers). The ordering of the projected vertices according to the plane vertex ordering scheme defines a direction of each edge, independent of the direction inherited from the winding order(s) of the polygon(s) which include the edge. The winding order defines a cyclic ordering of vertices, i.e., a binary relationship in and only in the following circumstances: $v_i v_{(i+1 (mod\ n))}$ for n=0, ..., n−1. Note that this is not a proper ordering as it does not meet all the axioms of a partial ordering, e.g., transitivity, and so is also not a total ordering like the projection-dependent ordering scheme, but is defined on the edges of the polygon and is used to determine their direction. Additionally, being a cyclic ordering, its binary relations are preserved by rotations of the convex polygon, and are reversed by reflections of the convex polygon. In examples described herein, and during intersection determination, an edge of a convex polygon may be considered part of the polygon's boundary precisely when the direction of the edge given by the plane vertex ordering scheme coincides with the direction of the edge given by the winding order of the polygon.

In an example plane vertex ordering scheme, the universal direction of a projected edge is from its vertex with smallest p component to its vertex with largest p component, unless the projected vertices of the edge have equal p components, in which case the direction of a projected edge is from its vertex with smallest q component to its vertex with largest q component. To state this more mathematically, a 2D edge has two vertices ($v_i$ (with components $p_i$ and $q_i$) and $v_j$ (with components $p_j$ and $q_j$)), and, under the plane vertex ordering scheme, the edge is directed from $\min(v_i,v_j)$ to $\max(v_i,v_j)$, wherein the vertices are ordered such that $v_i < v_j$ if $p_i < p_j$ or if ($p_i = p_j$ and $q_i < q_j$), otherwise $v_i > v_j$. To put this another way, a first projected vertex $v_i$ with components, $p_i$ and $q_i$, along the respective axes of the pair of axes (P and Q), is before a second projected vertex $v_j$ with components, $p_j$ and $q_j$, along the respective axes of the pair of axes, if $p_i<p_j$ or if ($p_i=p_j$ and $q_i<q_j$); whereas a first projected vertex $v_i$ with components, $p_i$ and $q_i$, along the respective axes of the pair of axes, is after a second projected vertex $v_j$ with components, $p_j$ and $q_j$, along the respective axes of the pair of axes, if $p_i>p_j$ or if ($p_i=p_j$ and $q_i>q_j$). Note that any nondegenerate projected convex polygon (i.e., with a nonzero projected area) will have at least three edges with nonequal endpoints. Hence, we either have $v_i<v_j$ or $v_j<v_i$ for all such edges, according to the plane vertex ordering scheme, and hence a well-defined direction for all such edges. In the specific example of a nondegenerate projected triangle polygon we will have all three edges with nonequal endpoints, according the plane vertex ordering scheme, and hence all three edges with a well-defined direction.

When two projected vertices do have the same p and q components then this means that either the edge is degenerate (i.e., equal components along the axis parallel with the ray direction), or that the edge is nondegenerate (i.e. with different components along the axis parallel with the ray direction vector) and the ray is looking along the edge of the convex polygon, i.e., its direction is perpendicular to the normal of the (planar) polygon (up to the accuracy of the projection). For a convex polygon to be nondegenerate (in unprojected space and therefore also in projected space), the former case must not occur for three or more edges of the convex polygon. The latter case means the polygon appears as a line with respect to the ray, with zero projected area, and therefore a convex polygon with such an edge is always degenerate (in projected space). Such degenerate (projected) polygons may freely be missed by the ray. It is acceptable for the rules of "watertight" or "non-redundantly watertight" intersection testers not to apply to such degenerate polygons, so long as they do apply when those polygons are omitted.

The plane vertex ordering scheme has eight alternative characterisations giving eight alternative pairs (for clockwise and anticlockwise orientations) of edge tie-break behaviours. For convex polygons with a clockwise orientation the examples described herein exhibit a "Left-Top Rule", whereas for convex polygons with an anticlockwise orientation the examples described herein exhibit a "Right-Bottom Rule". Other examples exhibit different tie-break behaviour pairs. For convex polygons of a clockwise/anticlockwise orientation, the eight alternative tie-break behaviour pairs exhibited are:

$v_i<v_i$ if $p_i<p_i$ or if ($p_i=p_i$ and $q_j<q_j$) (as described in the main examples herein)→"Left-Top/Right-Bottom Rule" (i)

$v_i<v_i$ if $p_i<p_i$ or if ($p_i=p_i$ and $q_i>q_j$)→"Right-Top/Left-Bottom Rule" (ii)

$v_i<v_i$ if $p_i>p_i$ or if ($p_i=p_i$ and $q_j<q_j$)→"Left-Bottom/Right-Top Rule" (iii)

$v_i<v_i$ if $p_i>p_i$ or if ($p_i=p_i$ and $q_i>q_j$)→"Right-Bottom/Left-Top Rule" (iv)

$v_i<v_i$ if $q_j<q_i$ or if ($q_j=q_j$ and $p_i<p_j$)→"Top-Left/Bottom-Right Rule" (v)

$v_i<v_i$ if $q_i>q_j$ OR if ($q_j=q_j$ AND $p_i<p_j$)→"Top-Right/Bottom-Left Rule" (vi)

$v_i<v_i$ if $q_i<q_i$ OR if ($q_j=q_j$ AND $p_i>p_j$)→"Bottom-Left/Top-Right Rule" (vii)

$v_i<v_i$ if $q_i>q_j$ OR if ($q_j=q_j$ AND $p_i>p_j$)→"Bottom-Right/Top-Left Rule" (viii)

The above terms indicate which edges are considered part of the boundary of a convex polygon in intersection determination. The first/second tie-break behaviours correspond to when the convex polygon has an apparent clockwise/anticlockwise orientation viewed in projected 2D space. As the edge tie-break behaviour depends on the winding/orientation of the convex polygon, we call it a "winding/orientation dependent" watertightness scheme. Note that the tie-break behaviour reverses for polygons having the opposite orientation, e.g., "Left-Top Rule" and "Right-Bottom Rule". For example, the term "Left-Top Rule" indicates that all edges bounding the convex polygon from above, or bounding the convex polygon from the left but precisely vertical, are considered part of the boundary of the polygon, and therefore are intersected. As the projection is ray dependent, these edge tie-break behaviours apply to a single ray only, and may change from ray to ray, e.g., when there is a change of perceived orientation and/or major axis.

Figure 7A:
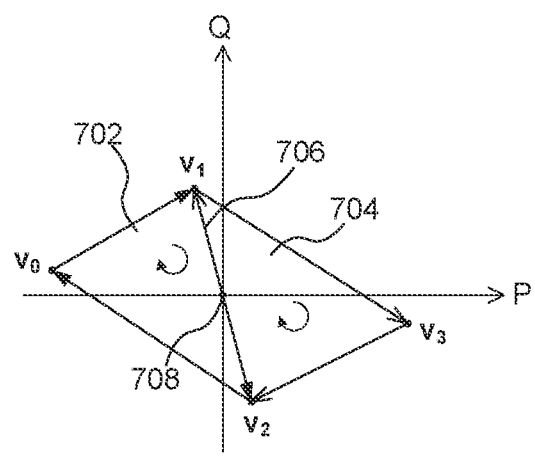
FIG. 7a shows a ray intersecting a point on an edge that is shared between two polygons, with indications of winding orders of the two polygons.
Figure 7B:
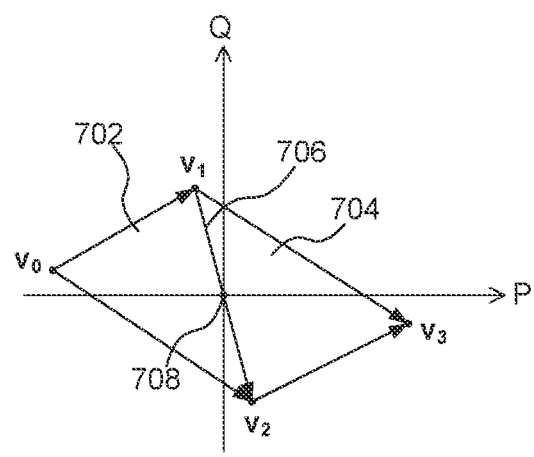
FIG. 7b shows the same situation as that in FIG. 7a in which a ray intersects a point on an edge that is shared between two polygons, and FIG. 7b indicates directions of the edges of the two polygons according to a vertex ordering scheme.

The way the edge tests are performed in examples described herein means that "non-redundant watertightness" can be considered to equate to anticommutativity on the result of the 2D cross product, with the problem case being (signed) zero, corresponding to a polygon boundary intersection. In other words, the watertightness problems can occur when a ray lands on an edge or a vertex (where f=±0). In this situation we want to return only one hit. FIGS. 7a and 7b show a ray intersecting a point 708 on an edge 706 that is shared between two polygons 702 and 704. FIG. 7a indicates the orientations of the two polygons from the ray's perspective: both polygons 702 and 704 appear clockwise as viewed, which is inherited from their winding order. FIG. 7a indicates the direction of the edges of polygon 702, according to the ordering of the vertices in the ordered set of vertices defining the polygon 702, with closed filled arrow heads. FIG. 7a indicates the direction of the edges of polygon 704, according to the ordering of the vertices in the ordered set of vertices defining the polygon 704, with open arrow heads. FIG. 7b indicates directions of the edges of the two polygons according to the plane vertex ordering scheme mentioned above, some of which differ from the directions of the edges given by the winding order in FIG. 7a. In this example the polygons sharing the edge have consistent edge winding, i.e. with the two convex polygons 702 and 704 sharing the edge 706 with endpoints $\{v_1, v_2\}$, they are ordered ($v_1$, $v_2$) in one polygon (e.g. polygon 702) but are reversely ordered ($v_2$, $v_1$) in the contiguous neighbouring polygon (e.g. polygon 704), inherited from the respective (consistent) winding orders of the vertices in the ordered sets of vertices defining the polygons. The examples described herein target manifold edges, i.e. situations in which two and only two polygons meet at a shared edge, permitting consistent winding of edges. Note that for a closed manifold mesh (i.e. all edges are shared and manifold) consistent edge winding is achievable only on orientable surfaces. For a shared silhouette edge, and assuming consistent edge winding, the perceived orientation of the polygons changes across the silhouette edge (but not the winding of the polygons), such that one of the polygons is front-facing and the other of the polygons is back-facing. Implicit edges formed by the intersection of two polygons in their interiors, i.e. not at a shared edge or shared vertex on the polygons' boundaries (namely self-intersecting "non-simple" meshes), is excluded from the application of "non-redundant watertightness" and is not required to return a single hit only to achieve "non-redundant watertightness".

In the examples shown in FIGS. 7a and 7b in which the ray is determined to intersect a point on an edge of a polygon then the w parameter is determined based upon whether the ordering, defined by the vertex ordering scheme (i.e. the "plane vertex ordering scheme"), of the projected vertices defining the edge matches the ordering of the vertices in the ordered set of vertices defining the convex polygon (e.g. inherited from the winding order of the convex polygon). In particular, if which the ray is determined to intersect a point on an edge of a polygon then the sign of the w parameter for the edge of the polygon is determined based upon whether the edge direction inherited from the plane ordering of the projected vertices defining the edge, defined by the plane vertex ordering scheme, matches the edge direction inherited from the winding order of the vertices in the ordered set of vertices defining the convex polygon. As mentioned above, the ray is determined to intersect a point on an edge if the 2D cross product of the projected positions of the two vertices defining the edge has a magnitude of (plus or minus) zero. If the ray intersects an edge (e.g. the edge 706 which is shared by polygons 702 and 704) then the plane direction of the edge is determined according to the plane vertex ordering scheme, and this direction may be referred to as the "universal plane direction of the edge" (e.g. as seen in FIG. 7b). It is then determined whether the edge has a matching winding direction inherited from the winding order of the polygon. If the polygons have consistent winding orders (e.g. as seen by FIG. 7a where both polygons 702 and 704 have an apparent clockwise orientation as viewed) then the edge will have a different winding direction for each of the two polygons: one of the two polygons sharing the edge will have a winding direction matching the universal plane direction of the edge, whereas the other polygon will have a winding direction not matching the universal plane direction of the edge. The polygon intersection testing unit(s) 114 determines that the ray intersects with the polygon whose edge has a matching winding direction, and that the ray does not intersect with the polygon whose edge does not have a matching winding direction.

For example, as shown in FIG. 7b, the vertex $v_1$ is before the vertex $v_2$ according to the plane vertex ordering scheme because $p_1<p_2$, so the direction of the edge 706 according to the vertex ordering scheme is from $v_1$ to $v_2$. The winding direction of this edge in polygon 702 (which appears as a clockwise orientation as viewed), inherited from the winding ordering of the vertices $v_1$ and $v_2$ in the ordered set of vertices ($v_0$, $v_1$, $v_2$) defining the polygon 702, matches the plane ordering of the projected vertices $v_1$ and $v_2$ according to the plane vertex ordering scheme. Therefore, the ray is determined to intersect polygon 702 in the example shown in FIGS. 7a and 7b. In contrast, the winding direction of this edge in polygon 704 (which also appears as a clockwise orientation as viewed), inherited from the winding order of the vertices $v_2$ and $v_1$ in the ordered set of vertices ($v_1$, $v_3$, $v_2$) defining the polygon 704, does not match the plane ordering of the projected vertices $v_1$ and $v_2$ according to the plane vertex ordering scheme. Therefore, the ray is determined to not intersect polygon 704 in the example shown in FIGS. 7a and 7b. In summary, when the ray intersects the shared edge 706, it is determined to intersect one and only one of the polygons, 702, and thus "non-redundant watertightness" is ensured in this example.

Figure 4:
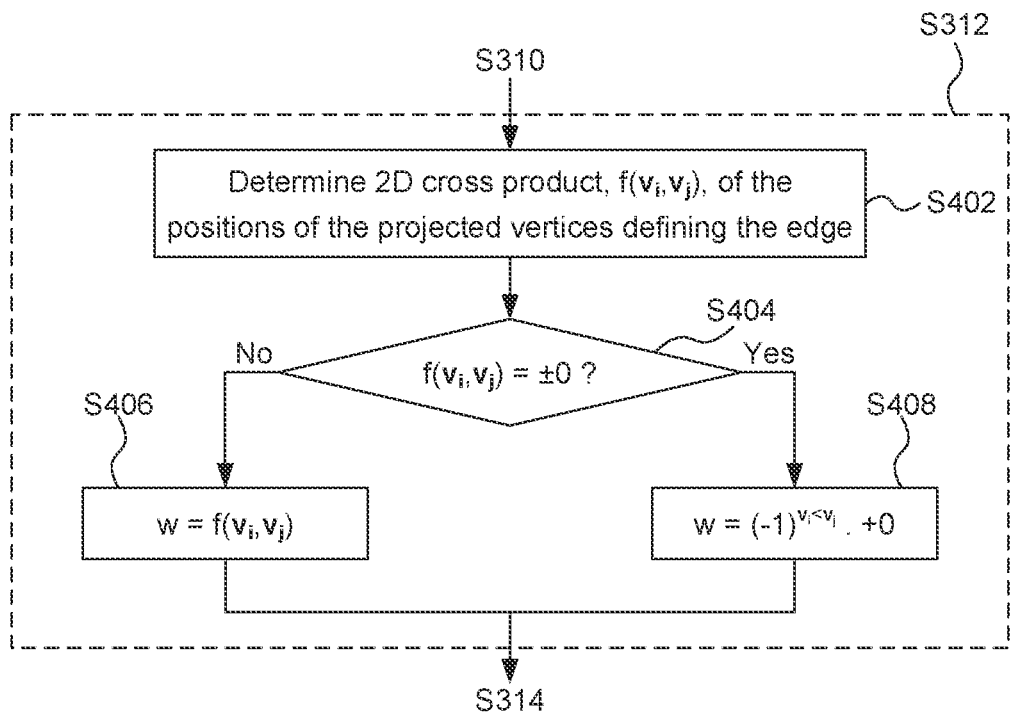
Figure 5:
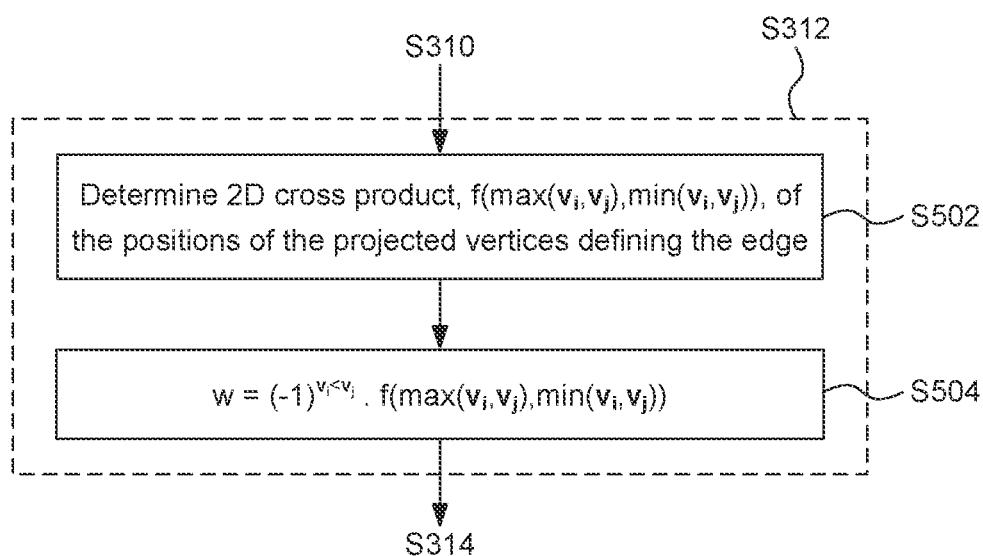

FIGS. 4 and 5 illustrate two examples for performing step S312 of determining the w parameter to indicate which side of the $e^{th}$ edge of the $k^{th}$ polygon the ray passes on. In the first example (which may be referred to as an "edge direction on-edge check" method), shown in FIG. 4, step S312 comprises step S402 in which the polygon intersection testing unit(s) 114 of the intersection testing module 108 determine a 2D cross product $f(v_i,v_j)=p_iq_j-q_ip_j$, for the $e^{th}$ edge which is defined by projected vertices $v_i$ and $v_j$, given in their order in the ordered set of vertices defining the $k^{th}$ polygon.

In step S404 the polygon intersection testing unit(s) 114 determines whether $f(v_i,v_j)=\pm0$. If it is determined that $f(v_i,v_j)\neq\pm0$, then this indicates that the ray does not intersect a point on the $e^{th}$ edge, and then in step S406 the parameter, w, is set to equal to the 2D cross product, i.e. $w=f(v_i,v_j)$. In this way, the sign of the w parameter for the $e^{th}$ edge is determined to be the same as the sign of $f(v_i, v_j)$ if the ray is not determined to intersect a point on the edge. Then the method passes to step S314.

However, if, in step S404, it is determined that $f(v_i,v_j)=\pm0$, then this indicates that the ray does intersect a point on the $e^{th}$ edge, and then in step S408 the parameter, w, is set based on the plane ordering of the projected vertices defining the edge according to the plane vertex ordering scheme. In particular, the parameter is determined as $w=(-1)^{v_i<v_j}\cdot(+0)$. In other words, the magnitude of the w parameter is set to zero, and the sign of the w parameter is determined to be the sign of $(-1)^{v_i<v_j}$, where $v_i<v_j=1$ if the projected vertex $v_i$ is before the projected vertex $v_j$ according to the plane vertex ordering scheme, and where $v_i<v_j=0$ if the projected vertex $v_j$ is before the projected vertex $v_i$ according to the plane vertex ordering scheme (note that either sign may be assigned for a degenerate projected polygon where $v_i=v_j$ since the watertightness criterion need not apply). An alternative equivalent expression for w is given by $w=(-1)^{v_j<v_i}\cdot(-0)$. Alternative, but inequivalent, expressions for w are given by $w=(-1)^{v_j<v_i}\cdot(+0)$ and $w=(-1)^{v_i<v_j}\cdot(-0)$, which exhibit reverse behaviour. Then the method passes to step S314.

For the example method shown in FIG. 4 to be reliable, e.g. to guarantee at least "watertight" behaviour for shared edges and shared vertices of closed fans, the particular implementation of the 2D cross product function f must be sign accurate when $f(v_i,v_j)\neq\pm0$. In particular, the 2D cross product function f is anticommutative, so sgn $(f(v_i, v_j))=!sgn (f(v_j, v_i))$, for all $f(v_i, v_j)\neq\pm0$, and any sign accurate implementation must share this derived property. Furthermore, this property indicates that the sign of the implementation of f can be calculated only once for one polygon of a shared edge, and then the negated result can be used for the other polygon of the shared edge (assuming consistent winding). It is reasonable to expect an implementation of f to be sign accurate for $f\neq\pm0$, as it is equivalent to correctly determining whether $p_iq_j<q_ip_j$ (negative) or $p_iq_j>q_ip_j$ (positive) for all $p_iq_j\neq q_ip_j$. Also, for the "edge direction on-edge check" method, the kernel of the implementation of the 2D cross product f must match the kernel of the 2D cross product f, i.e., the sets of input values (restricted to representable floating points) mapped to $\pm0$ by each function must match. This can be achieved by using an implementation of f with fully expanded intermediates and one instance of RAZ (round away from zero) rounding on the result, or by using an extended range output. Other than at zero, the magnitude of w plays no part in guaranteeing "watertightness" or "non-redundant watertightness" for the example method shown in FIG. 4. However, if the implementation of f shares the full anticommutativity property of f, i.e., that $f(v_i,v_j)=-(f(v_j,v_i))$, for all $f(v_i,v_j)\neq\pm0$, then the result (both sign and magnitude) of the implementation of f can be calculated only once for one polygon of a shared edge, and then the negated result can be used for the other polygon of the shared edge (assuming consistent winding).

It is noted that the IEEE single precision floating point format allocates an encoding for both positive and negative zero (all zeros starting with a zero or one respectively). An implementation of the 2D cross product function f may generate −0 in place of +0, but this will be implementation specific. In hardware, the precision of intermediate values may be expanded (be it implicitly or explicitly) to accommodate a larger range of values. It is clear that $p_i q_j - q_i p_j$ can generate values outside the range of 8 bits of exponent and 23 bits of mantissa, given four 32-bit floats as input. Given this, some rounding is performed if the result is to be output in 32 bits. If one of the two closest representable values to nonzero result w is 0, then w may always be rounded to +0 (generally considered to represent the traditional unsigned 0) or may sometimes (or always) be rounded to −0. In other examples, the sign of w may be used to determine the rounding: If one of the two closest representable values to nonzero w is 0 and w is positive, then w may usually be rounded to +0, and other times to −0. If one of the two closest representable value to nonzero w is 0 and w is negative, then w may usually be rounded to −0, and other times to +0. If, in all such circumstances, the sign of nonzero w matches the sign of 0 it is rounded to, then this is known as "sign accurate rounding". Alternatively, where a nonzero w would be rounded to +0, it may instead be rounded to the minimal representable positive floating point value (e.g., when rounding away from zero), and where a nonzero w would be rounded to −0, it may instead be rounded to the maximal representable negative floating point value (e.g., when rounding away from zero). If w is exactly 0 then one would normally expect it to be encoded as +0, but may sometimes (or always) be encoded as −0. The method described with reference to FIG. 4, i.e., "edge direction on-edge check", does not require the 2D cross product function f to be consistent in the signs of exactly zero results, instead it overrides the sign in step S408.

In the example shown in FIGS. 7a and 7b, $v_1 < v_2$ according to the plane vertex ordering scheme. In polygon 702 the edge 706 is defined by the ordered vertices $v_1$ and $v_2$, i.e. $v_i = v_1$ and $v_j = v_2$, so w is given a negative sign for the edge 706 in polygon 702. This is because in this case, $w = (-1)^{v_1 < v_2} \cdot (+0) = (-1)^1 \cdot (+0) = -0$. However, in polygon 704 the edge 706 is defined by the ordered vertices $v_2$ and $v_1$, i.e. $v_i = v_2$ and $v_j = v_1$, so w is given a positive sign for the edge 706 in polygon 704. This is because in this case, $w = (-1)^{v_2 < v_1} \cdot (+0) = (-1)^0 \cdot (+0) = +0$.

In the second example (which may be referred to as a "full edge sorting" method), shown in FIG. 5, step S312 comprises step S502 in which the polygon intersection testing unit(s) 114 of the intersection testing module 108 determines an implementation of the 2D cross product with sorted input vertices $f(\max(v_i, v_j), \min(v_i, v_j))$ for the $e^{th}$ edge, defined by projected vertices $v_i$ and $v_j$ defining the $k^{th}$ polygon. The two projected vertices, $v_i$ and $v_j$ defining the edge, are provided to the implementation of the 2D cross product function f in an order defined by the plane vertex ordering scheme. In particular, if the projected vertex $v_i$ is before the projected vertex $v_j$ (i.e. if $v_i < v_j$) according to the plane vertex ordering scheme then $\max(v_i, v_j) = v_j$ and $\min(v_i, v_j) = v_i$; whereas if the projected vertex $v_i$ is after the projected vertex $v_j$ (i.e. if $v_i > v_j$) according to the plane vertex ordering scheme then $\max(v_i, v_j) = v_i$ and $\min(v_i, v_j) = v_j$. By ordering input vertices, by the plane ordering scheme, the 2D cross product f is only defined on half of the four-dimensional domain, possibly providing area savings to any implementation taking advantage of this property. Furthermore, by sorting input vertices, it is evident that the result of this expression can be calculated only once per shared edge and then may be duplicated across all polygons sharing that edge.

In step S504 the w parameter is determined as $w = (-1)^{v_i < v_j} \cdot f(\max(v_i, v_j), \min(v_i, v_j))$. More generally, the sign of the signed parameter w for the edge is determined to be the same as the sign of $(-1)^{v_i < v_j} \cdot f(\max(v_i, v_j), \min(v_i, v_j))$, as the magnitude of w plays no part in "watertightness" or "non-redundantly watertightness" determination. An alternative expression for w, which reverses the sign on the kernel of f but fixes the sign off the kernel of f, is given by $w = (-1)^{v_j < v_i} \cdot f(\min(v_i, v_j), \max(v_i, v_j))$. An alternative expression for w, which reverses the sign both on and off the kernel of f, is given by $w = (-1)^{v_j < v_i} \cdot f(\max(v_i, v_j), \min(v_i, v_j))$. An alternative expression for w, which fixes the sign on the kernel of f but reverses the sign off the kernel of f, is given by $w = (-1)^{v_i < v_j} \cdot f(\min(v_i, v_j), \max(v_i, v_j))$. Then the method passes to step S314.

A binary function f is anti-commutative if swapping the order of the vertices reverses the sign of f. The "full edge sorting" method shown in FIG. 5 lifts the restriction that the implementation of the 2D cross product function f be anti-commutative, whilst still ensuring that the w parameter is anti-commutative, and hence the result of this expression may be calculated only once for one polygon of a shared edge, and then the negated result may be used for the other polygon of the shared edge (assuming consistent winding). Also, the implementation of f need only be sign accurate on the domain $v_i > v_j$ and, further still, need not match the kernel of f, lifting additional restrictions over the "Edge check on-edge method". Although the implementation of f need not match the kernel of f, it must be consistent in sign, i.e. all positive or all negative, for values that f maps to zero.

In the example shown in FIGS. 7a and 7b, $v_1 < v_2$ according to the plane vertex ordering scheme, such that $\max(v_1, v_2) = v_2$ and $\min(v_1, v_2) = v_1$. Therefore, $f(\max(v_1, v_2), \min(v_1, v_2)) = f(v_2, v_1)$. In polygon 702 the edge 706 is defined by the ordered vertices $v_1$ and $v_2$, i.e. $v_i = v_1$ and $v_j = v_2$, so $w = (-1)^1 \cdot f(v_2, v_1) = -f(v_2, v_1)$ for the edge 706 in polygon 702. However, in polygon 704 the edge 706 is defined by the ordered vertices $v_2$ and $v_1$, i.e. $v_i = v_2$ and $v_j = v_1$, so $w = (-1)^0 \cdot f(v_2, v_1) = +f(v_2, v_1)$ for the edge 706 in polygon 702. It can therefore be seen that the sign of the w parameter for edge 706 is different for polygons 702 and 704, such that the ray will be determined to intersect one (and only one) of the polygons 702 and 704, namely 702, thereby ensuring "non redundant watertightness" when the ray intersects the shared edge 706.

Figure 8A:
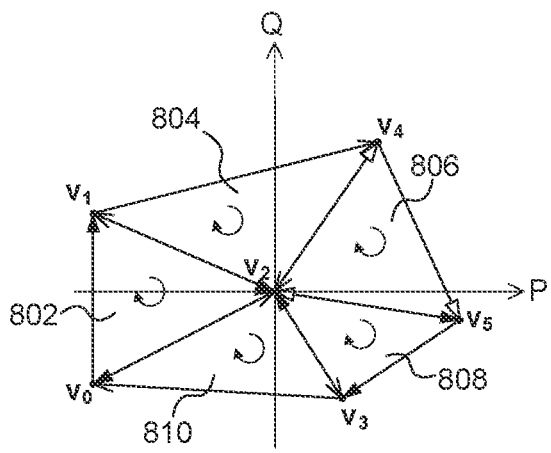
FIG. 8a shows a ray intersecting a vertex that is shared between five polygons forming a closed fan, with indications of winding orders of the five polygons.
Figure 8B:
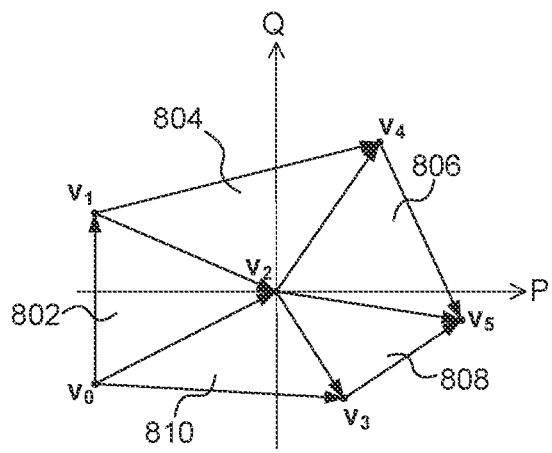
FIG. 8b shows the same situation as that in FIG. 8a in which a ray intersects a vertex that is shared between five polygons forming a closed fan, and FIG. 8b indicates directions of the edges of the five polygons according to a vertex ordering scheme.

Ensuring "non-redundant watertightness" is a particular issue when at least one vertex is a shared vertex which is used to define two or more convex polygons, e.g. in a closed fan. Methods described herein ensure "non-redundant watertightness" in the intersection testing when, for two or more (e.g. exactly two) convex polygons, the ray is determined to intersect a point on an edge of one of those convex polygons: In the example shown in FIGS. 7a and 7b the ray intersects a point somewhere along the interior of an edge shared by two polygons. In the example shown in FIGS. 8a and 8b the ray intersects a point on the end of an edge, in this case a vertex shared by multiple (e.g. five) polygons forming a closed fan. In particular, FIGS. 8a and 8b show a ray intersecting a vertex $v_2$ that is shared between five polygons 802, 804, 806, 808 and 810. FIG. 8a indicates the winding orders of the five polygons, demonstrated by their clockwise orientation as viewed. FIG. 8a indicates the direction of the edges of polygon 802, according to the ordering of the vertices in the ordered set of vertices defining the polygon

802, with closed filled arrow heads. FIG. 8a indicates the direction of the edges of polygon 804, according to the ordering of the vertices in the ordered set of vertices defining the polygon 804, with open arrow heads. FIG. 8a indicates the direction of the edges of polygon 806, according to the ordering of the vertices in the ordered set of vertices defining the polygon 806, with closed unfilled arrow heads. FIG. 8a indicates the direction of the edges of polygon 808, according to the ordering of the vertices in the ordered set of vertices defining the polygon 808, with closed filled arrow heads. FIG. 8a indicates the direction of the edges of polygon 810, according to the ordering of the vertices in the ordered set of vertices defining the polygon 810, with open arrow heads. FIG. 8b indicates directions of the edges of the five polygons according to the plane vertex ordering scheme mentioned above. When determining which convex polygon is hit by a ray intersecting exactly with a shared vertex of a closed fan, the polygon intersection testing unit(s) 114 of the intersection testing module 108 determines which of the polygons has two edges, both with the shared vertex as an endpoint, whose plane directions (according to the plane vertex ordering scheme) both match their winding directions (according to the winding order given by the ordered sets of vertices defining the polygon). There will be one (and only one) such polygon provided that the polygons have consistent winding, form a (simple, manifold) closed fan, and are not part of a silhouette. Indeed, a vertex shared by such a closed fan of (non-overlapping) convex polygons is bounded (in the plane) by the endpoints of the edges meeting at the shared vertex. Hence, given that the polygons have consistent winding, there will exist one and only one polygon of the closed fan that has three ordered vertices according to its winding order, including the shared vertex as the middle vertex, whose ordering matches the ordering of the plane ordering scheme. In terms of the plane ordering exhibiting a Left-Top/Right-Bottom tie-break behaviour pair, the polygon directly below the shared vertex (or below and to the right in the case of a precisely vertical edge), e.g. 810, is intersected in the clockwise case, and the polygon directly above the shared vertex (or above and to the left in the case of a precisely vertical edge), e.g. 804, is intersected in the anticlockwise case. In FIGS. 8a and 8b, polygon 810 has matching directions for its two edges which involve the shared vertex, $v_2$. This is not the case for any of the polygons 802, 804, 806 and 808. So, it is determined that the ray intersects with polygon 810 and does not intersect with any of the polygons 802, 804, 806 or 808.

For example, in the example "edge direction on-edge check" method described above with reference to FIG. 4, for the polygon 810 the w parameter for the edge defined by projected vertices $v_0$ and $v_2$ will be determined, in step S408, to be $w=(-1)^1 \cdot (+0)$, which has a negative sign; and the w parameter for the edge defined by projected vertices $v_2$ and $v_3$ will be determined, in step S408, to be $w=(-1)^1 \cdot (+0)$, which has a negative sign. The w parameter for the edge defined by projected vertices $v_3$ and $v_0$ will be determined, in step S406, to be $w=f(v_3,v_0)=p_3 q_0 - q_3 p_0$, which will be a negative value (as can be seen by considering the winding direction of the edge $v_3$ and $v_0$, giving rise to a clockwise circulation relative to the origin, in FIG. 8a). In accordance with the vertex ordering scheme, since we have identified a pair of intersected edges (zero magnitude w), both of which have negative sign (i.e. such that the plane order matches the winding order), it is determined that the ray intersects the polygon 810, and that since the remaining nonzero w parameter is negative, the polygon 810 has a clockwise orientation as viewed. In other examples, in contrast with the vertex ordering scheme, it may alternatively be determined that, since the w parameters for all the edges of polygon 810 are negative, it is determined that the ray intersects the polygon 810, and hence also that it has a clockwise orientation as viewed.

It is noted that none of the other polygons 802 to 808 will have w parameters determined such that a pair of intersected edges both have negative sign (and zero magnitude) or, as an immediate corollary, that all edges have the same sign. For example, for polygon 802, the w parameter for the edge defined by projected vertices $v_1$ and $v_2$ will be determined, in step S408, to be $w=(-1)^1 \cdot (+0)$, which has a negative sign; whereas the w parameter for the edge defined by projected vertices $v_2$ and $v_0$ will be determined, in step S408, to be $w=(-1)^0 \cdot (+0)$, which has a positive sign, which is neither negative nor the same sign as the w parameter for the edge defined by the projected vertices $v_1$ and $v^2$. For brevity, we will not describe all of the calculations for polygons 804 to 808 here because it should now be apparent that they will not determine w parameters with either both negative signs for each intersected edge or having the same signs for all of their edges. Therefore the ray will not be determined to intersect with any of polygons 802, 804, 806 or 808.

It is noted that the vertex ordering scheme and the alternative check for sign consistency on all edges produce equivalent results for polygons that have a clockwise orientation as viewed. That is to say, intersected clockwise polygons generate negative w parameters so positive intersection results are both negative on intersected edges as well as all remaining edges. Anticlockwise polygons, however, generate positive w parameters, such that positive intersection results, in the case of the vertex ordering scheme, retain negative sign on intersected edges, but positive sign on remaining edges, whereas the sign-equality test requires that both intersected edges and remaining edges all have positive sign. With reference to FIG. 8, if all triangles are specified in the reverse winding order such that they have anticlockwise orientation as viewed, the sign of every w parameter is reversed. This implies that, in polygon 804, the w parameter for the edge defined by the projected vertices $v_1$ and $v_2$ will be determined, in step S408, to be $w=(-1)^1 \cdot (+0)$, which has a negative sign, and that the w parameter for the edge defined by the projected vertices $v_2$ and $v_4$ will also be determined to be $w=(-1)^1 \cdot (+0)$. The w parameter for the edge defined by the projected vertices $v_4$ and $v_1$ will be determined, in step S406 to be $w=p_4 q_1 - q_4 p_1$, which will be a positive value (as the winding is anticlockwise). If the vertex ordering scheme is used, it will be determined that polygon 804 is the (only) intersected polygon (since all intersected edges have negative sign), whereas if sign-equality is used, it will be determined that polygon 804 is not intersected. As all w parameter signs are inverted, it will instead be determined that polygon 810 is again intersected (as inversion doesn't affect equality), independent of orientation. We therefore refer to the sign-equality test (without further qualification) as a winding-independent scheme and the vertex ordering scheme as a winding-dependent scheme.

In the second example "full edge sorting" method described above with reference to FIG. 5, for the polygon 802 the w parameter for the edge defined by projected vertices $v_1$ and $v_2$ will be determined, in step S504, to be $w=-f(v_2,v_1)=\mp\alpha_{21}$, the w parameter for the edge defined by projected vertices $v_2$ and $v_0$ will be determined, in step S504, to be $w=+f(v_2,v_0)=\pm\alpha_{20}$, and the w parameter for the edge defined by projected vertices $v_0$ and $v_1$ will be determined, in step S504, to be $w=-f(v_1,v_0)=-(+\alpha_{10})=-\alpha_{10}$. Similarly, for the polygon 804, the w parameter for the edge defined by projected vertices $v_2$ and $v_1$ will be determined, in step S504, to be $w=+f(v_2,v_1)=\pm\alpha_{21}$, the w parameter for the edge defined by projected vertices $v_4$ and $v_2$ will be determined, in step S504, to be $w=+f(v_4,v_2)=\pm\alpha_{42}$, and the w parameter for the edge defined by projected vertices $v_1$ and $v_4$ will be determined, in step S504, to be $w=-f(v_4,v_1)=-(+\alpha_{41})=-\alpha_{41}$. For the polygon 806 the w parameter for the edge defined by projected vertices $v_2$ and $v_4$ will be determined, in step S504, to be $w=-f(v_4,v_2)=\mp\alpha_{42}$, the w parameter for the edge defined by projected vertices $v_5$ and $v_2$ will be determined, in step S504, to be $w=+f(v_5,v_2)=+\alpha_{52}$, and the w parameter for the edge defined by projected vertices $v_4$ and $v_5$ will be determined, in step S504, to be $w=-f(v_5,v_4)=-(+\alpha_{54})=-\alpha_{54}=-(+a54)=-a54.$). For the polygon 808 the w parameter for the edge defined by projected vertices $v_2$ and $v_5$ will be determined, in step S504, to be $w=-f(v_5,v_2)=\mp\alpha_{52}$, the w parameter for the edge defined by projected vertices $v_3$ and $v_2$ will be determined, in step S504, to be $w=+f(v_3,v_2)=\pm\alpha_{32}$, and the w parameter for the edge defined by projected vertices $v_5$ and $v_3$ will be determined, in step S504, to be $w=+f(v_5,v_3)=+(-\alpha_{53})=-\alpha_{53}$. For the polygon 810 the w parameter for the edge defined by projected vertices $v_2$ and $v_3$ will be determined, in step S504, to be $w=-f(v_3,v_2)=\mp\alpha_{32}$, the w parameter for the edge defined by projected vertices $v_0$ and $v_2$ will be determined, in step S504, to be $w=-f(v_2,v_0)=\mp\alpha_{20}$, and the w parameter for the edge defined by projected vertices $v_3$ and $v_0$ will be determined, in step S504, to be $w=+f(v_3,v_0)=+(-\alpha_{30})=-\alpha_{30}$. In the above examples $\alpha_{21}$, $\alpha_{20}$, $\alpha_{10}$, $\alpha_{42}$, $\alpha_{41}$, $\alpha_{52}$, $\alpha_{54}$, $\alpha_{32}$, $\alpha_{53}$ and $\alpha_{30}$ are all nonnegative values and, as all pairs of inputs to the implementation of the 2D cross product are in the kernel of f, the sign indicators $\pm$ and $\mp$ are consistent, i.e. they return either signs + and − respectively in all instances, or signs − and + respectively in all instances. In this way, either polygon 810 is the one (and only one) polygon that is determined to be intersected by the ray for respective signs + and −, or polygon 804 is the one (and only one) polygon that is determined to be intersected by the ray for respective signs − and +, yielding three negative values for w in either case (also indicating a clockwise orientation as viewed).

Figure 9:
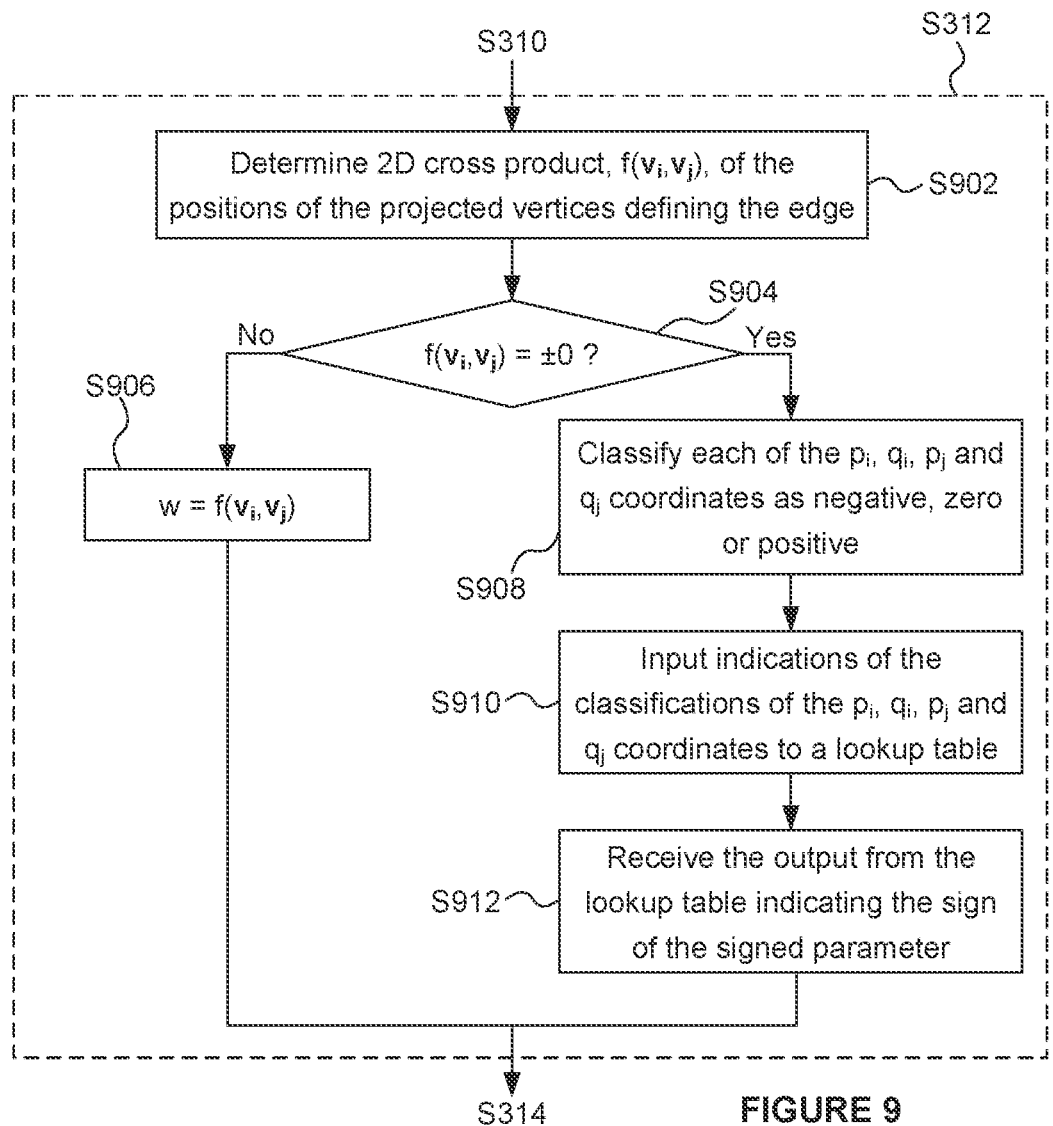

Another example method for determining the w parameter for the $e^{th}$ edge of the $k^{th}$ polygon in step S312 (which may be referred to as a "endpoint sign/zero on-edge check" method) is described with reference to the flow chart shown in FIG. 9. Steps S902, S904 and S906 shown in FIG. 9 are the same as the steps S402, S404 and S406 shown in FIG. 4. For the "endpoint sign/zero on-edge check", polygons submitted to the intersection testing unit(s) 114 are assumed to be strictly convex polygons.

Therefore, in step S902 the polygon intersection testing unit(s) 114 of the intersection testing module 108 determine an implementation of the 2D cross product $f(v_i,v_j)=p_iq_j-q_ip_j$, for the $e^{th}$ edge which is defined by projected vertices $v_i$ and $v_j$, ordered according to the winding order of the vertices in the ordered set of vertices defining the $k^{th}$ polygon. In step S904 the polygon intersection testing unit(s) 114 determine whether $f(v_i,v_j)=\pm0$. If it is determined that $f(v_i,v_j)\neq\pm0$, then this indicates that the ray should not intersect a point on the $e^{th}$ edge, and then in step S906 the parameter, w, is set to equal to the 2D cross product, i.e. $w=f(v_i,v_j)$. In this way, the sign of the w parameter for the $e^{th}$ edge is determined to be the same as the sign of $f(v_i,v_j)$ if it is determined that the ray should not intersect a point on the edge. Then the method passes to step S314. For the scheme described with reference to FIG. 9, we make new assumptions on the implementation of the "2D cross product" f: (i) we assume that it is sign accurate off the kernel of f, e.g. if it shares the anticommutative property of the "2D cross product" f, and (ii) we assume that we have one of the following two types of implementation: any approximation where the kernel of the implementation of the "2D cross product" equals the kernel of f (e.g. by rounding away from zero or using an extended range output), denoted a "round away from zero" (RAZ) type, or any approximation where the kernel of the implementation of the "2D cross product" is a strict superset of the kernel of f (e.g. where there is some instance of rounding underflow to zero), denoted a "round towards zero" (RTZ) type. In particular, it is assumed that if f outputs zero then any implementation approximating it will also output zero, which is not a difficult requirement.

However, if, in step S904, it is determined that $f(v_i,v_j)=\pm0$, then this indicates that the ray might intersect a point on the $e^{th}$ edge, and then in steps S908 to S912 the sign of the parameter, w, is determined using a module which comprises a lookup table (LUT) and/or a logic array. In examples described herein the module comprising the lookup table and/or logic array is implemented on the intersection testing module 108 as a block of pre-configured logic in fixed-function hardware (e.g. as part of the polygon testing unit(s) 114). The functionality of the lookup table and/or logic array described herein can be considered to apply generally to the "module" comprising the lookup table and/or the logic array. The lookup table and/or logic array is configured to take, as its inputs, indications which classify each of the $p_i$, $q_i$, $p_j$ and $q_j$ coordinates as a trichotomy of negative, (plus or minus) zero or positive (e.g., as a "trit"), and to output, for valid combinations of classifications of the $p_i$, $q_i$, $p_j$ and $q_j$ coordinates, an indication of the sign of the signed parameter, w (e.g., as a bit). The lookup table or logic array may also be configured to take an indication of the sign of f and the boolean state of an "underflow flag" as two other input bits.

The lookup table and/or logic array models a function with input trits $p_i$, $q_i$, $p_j$ and $q_j$ (possibly as well as input bit sgn(f) and the boolean state of an underflow flag) to provide an output bit indicating the sign of w. There are $2^{81}$ (or $2^{324}$) such functions. This can be achieved in a first way by a look-up table, e.g. explicitly listing 81 (or 324) bit values and using the inputs as a look-up index/reference value. This would use at least 10 (or 40) bytes of raw storage in a data store (e.g. hardcoded in software or a register in hardware). It is noted that, the lookup table is reduced to a quarter of its size without the addition of the other two inputs. Alternatively, this can be achieved in a second way by a "logic array", e.g. a configuration of logical operations in software or logical gates in hardware, performing the desired mapping. The symmetry of the problem, along with a small number of "don't care" outputs, allows the number of logic gates to be reduced. Some hybrid of the two implementations (lookup table and logic array implementations) may also be possible, e.g. a reduced size LUT using some pre- or post-processing logic to leverage the symmetry of the problem. Either implementations may afford power or area gains over the other, depending on the specific architecture, where the first way (LUT implementation) may be more suitable to software, and the second (logic array implementation) may be more suitable to hardware in general.

In step S908 the polygon testing unit(s) 114 classify each of the $p_i$, $q_i$, $p_j$ and $q_j$ coordinates for the vertices $v_i$ and $v_j$ defining the $e^{th}$ edge as: (i) negative, (ii) (plus or minus) zero, or (iii) positive. It is noted that in order to be classified as negative or positive, a coordinate is non-zero. In other words, for the purposes of this classification of the coordinates, (plus or minus) zero is considered to be non-negative and non-positive. Where the coordinates are in a floating point format, and if denormals have been excluded or flushed, the exponent of a coordinate can be checked (e.g. all zeros) to determine whether the coordinate is zero (regardless of the sign bit), and if the coordinate is not zero, the sign bit of the coordinate can be checked to determine whether it is negative or positive. These are very simple tests to perform, e.g. in fixed function hardware. If denormal numbers are supported then the significand may be checked (e.g. all zeros), as well as the exponent, to determine whether a coordinate is zero.

In step S910 indications of the classifications of the coordinates are input to the lookup table or logic array. For example, the indications of the classifications can be considered to be used as indices or reference values to lookup a piece of data (i.e. the sign of w) from the lookup table or to determine the sign of w using the logic array.

In step S912 the polygon testing unit(s) 114 receives the output from the lookup table or logic array which indicates the sign of the w parameter for the edge. The method then passes to step S314 and continues as described above.

The use of the lookup table or logic array makes the determination of the sign of the w parameter extremely fast to implement, so steps S908 to S912 can be performed with very low latency and very low power consumption. A small amount of pre-configured logic can be used to implement the lookup table or logic array so a small amount of silicon area may be used to implement the lookup table or logic array in hardware, but this area will be very small because the operations performed by the lookup table or logic array are simple to implement in hardware.

Furthermore, the lookup table or logic array is configured such that if the order of the two projected vertices defining an edge is reversed then the indication of the sign of the signed parameter that is outputted from the lookup table or logic array is reversed. This ensures that the intersection testing is "non-redundantly watertight" for non-silhouette shared edges of polygons with consistent winding orders. In examples described herein, this functionality is hardcoded into the lookup table or logic array.

As described above, the ray is determined to intersect a point on an edge if the implementation of the 2D cross product $f(v_i, v_j) = p_i q_j - q_i p_j$ of the positions of two projected vertices defining the edge has a magnitude of zero.

For "endpoint sign/zero on-edge check", when $f(v_i, v_j) = p_i q_j - q_i p_j = \pm 0$, and in order to determine a tie-break behaviour for "non-redundant watertightness", the method considers what the 2D cross product would be if the positions of the two projected vertices defining the edge were perturbed by $\varepsilon = (\varepsilon_p, \varepsilon_q)$, as illustrated in FIG. 10. This perturbation indicates that the position of the first of the projected vertices $v_i$ defining the edge would have coordinates $(p_i + \varepsilon_p)$ and $(q_i + \varepsilon_q)$ along the respective axes (P and Q) of the pair of axes of the coordinate system of a ray, and that the position of the second of the projected vertices $v_j$ defining the edge would have coordinates $(p_j + \varepsilon_p)$ and $(q_j + \varepsilon_q)$ along the respective axes (P and Q) of the pair of axes of the ray coordinate system. The perturbation being considered would be tiny, but it would be big enough (i.e., by being considered nonzero), and at such a steep angle no representable edge could share, to move the vertices of an edge passing through the origin so that the edge would no longer pass through the origin (such that the ray would no longer intersect the edge). Also, the perturbation being considered would be tiny enough (i.e., by being considered smaller than any representable vector) not to move the vertices of an edge not passing through the origin so that the edge would then pass through the origin (such that the ray would intersect the edge). Hence, with this consideration, it would not be possible for a ray to exactly intersect an edge (including its endpoints). Therefore, a tie-break behaviour is established for both shared edges, where the interior of one (and only one) of the two polygons sharing the edge would then cover the origin, and for shared vertices, where, assuming a closed fan, the interior of one (and only one) of the multitude of polygons sharing the vertex would then cover the origin. For the above assumptions to hold, the hypothetical value $\varepsilon_q$ would be considered larger than zero but smaller than any positive real value, and the hypothetical value $\varepsilon_p$ would be considered larger than zero but smaller than any positive rational expression involving real numbers and $\varepsilon_q$.

The "endpoint sgn zero-check" method has eight alternative characterisations giving eight alternative edge tie-break behaviours. The examples described herein exhibit a "Right-Top Rule". Other examples exhibit different tie-break behaviour pairs. The eight alternative tie-break behaviour pairs exhibited are:

$0 < \varepsilon_p \ll \varepsilon_q$ (as described in detail in the main example herein)→"Right-Top Rule" (i)

$\varepsilon_p < 0 < |\varepsilon_p| \ll \varepsilon_q$→"Left-Top Rule" (ii)

$\varepsilon_q < 0 < \varepsilon_p \ll |\varepsilon_q|$→"Right-Bottom Rule" (iii)

$\varepsilon_q \ll \varepsilon_p < 0$→"Left-Bottom Rule" (iv)

$0 < \varepsilon_q \ll \varepsilon_p$→"Top-Right Rule" (v)

$\varepsilon_q < 0 < \varepsilon_p$→"Top-Left Rule" (vi)

$\varepsilon_p < 0 < \varepsilon_q \ll |\varepsilon_p|$→"Bottom-Right Rule" (vii)

$\varepsilon_p \ll \varepsilon_q < 0$→"Bottom-Left Rule" (viii)

The above terms indicate which edges are considered part of the boundary of a convex polygon in intersection determination, regardless of the apparent orientation of the convex polygon viewed in projected 2D space. As the edge tie-break behaviour does not depend on the winding/orientation of the convex polygon, we call it a "winding/orientation independent" watertightness scheme. For example, the term "Left-Top Rule" indicates that all edges bounding the convex polygon from above, or bounding the convex polygon from the left but precisely vertical, are considered part of the boundary of the polygon, and therefore are intersected. As the projection is ray dependent, these edge tie-break behaviours apply to a single ray only, and may change from ray to ray, e.g., when there is a change of perceived orientation and/or major axis.

With this perturbation, the 2D cross product function becomes:

$$f(v_i, v_j) = (p_i + \varepsilon_p)(q_j + \varepsilon_q) - (q_i + \varepsilon_q)(p_j + \varepsilon_p) = p_i q_j - q_i p_j + p_i \varepsilon_q + \varepsilon_p q_j - q_i \varepsilon_p - \varepsilon_q p_j \quad (1)$$

The lookup table is configured to output, for all valid combinations of classifications of the $p_i$, $q_i$, $p_j$ and $q_j$ coordinates, an indication of the sign of the signed parameter w. In some examples, e.g., for a RAZ implementation type, the lookup table or logic array is configured to output: (i) for some valid combinations of classifications of the $p_i$, $q_i$, $p_j$ and $q_j$ coordinates, the sign of the signed parameter w as the sign, or opposite of the sign, of $p_i$, $q_i$, $p_j$ or $q_j$, and (ii) for some invalid combinations of classifications of the $p_i$, $q_i$, $p_j$ and $q_j$ coordinates, the sign of the signed parameter w as any value. In some other examples, e.g., for an RTZ implementation type, the lookup table or logic array is configured to further output: (iii) for some valid combinations of the classification of the $p_i$, $q_i$, $p_j$ and $q_j$ coordinates, the sign of the signed parameter w as the sign, or opposite of the sign, of the product of two of $p_i$, $q_i$, $p_j$ or $q_j$, and (iv) for one or more other valid combinations of classifications of the $p_i$, $q_i$, $p_j$ and $q_j$ coordinates, the sign of the signed parameter w, as the sign of the implementation of the 2D cross product f. In addition, in some other examples, e.g., for an RTZ implementation type, an "underflow flag" is used to determine which of (i), (ii), (iii) or (iv) is configured to be the output.

For example, the polygon intersection testing unit(s) 114 may operate according to a "round-away-from-zero" (RAZ) implementation type when determining the 2D cross product function for use in determining the w parameters, ensuring the kernel of the implementation of the 2D cross product matches the kernel of f. When a RAZ implementation type is used then the lookup table may be configured to output, for all valid combinations of classifications of the $p_i$, $q_i$, $p_j$ and $q_j$ coordinates for which f can be determined to be zero, an indication of the sign of the signed parameter, w. In particular, when a RAZ rounding mode is used then it is determined in step S904 that $f(v_i,v_j)=p_iq_j-q_ip_j=\pm 0$ if and only if the value of the 2D cross product truly is zero, and not because a non-zero value of the 2D cross product has been approximated as zero by the implementation. Therefore, in this case, equation (1) becomes:

$$f(v_i,v_j)=p_i\varepsilon_q+\varepsilon_pq_j-q_i\varepsilon_p-\varepsilon_qp_j \qquad (2)$$

FIGS. 11a to 11l illustrate possible situations in which a ray intersects an edge of a strictly convex polygon in a RAZ type, and also illustrate what the lookup table or logic array is configured to output as the sign of the w parameter for the different situations, as derived from the form of equation (2).

FIGS. 11a to 11l illustrate the positions of the P and Q axes and (unperturbed) edges which intersect with the origin of the P and Q axes. Each edge is illustrated by a line connecting the vertices $v_i$ to $v_j$ which define the edge, with the arrowheads pointing in the direction from $v_i$ to $v_j$, inherited from the winding order of a strictly convex polygon including that edge. The actual vertices $v_i$ and $v_j$ are not labelled in FIGS. 11a to 11l. FIGS. 11a to 11l also show the exaggerated position of the origin 1102 relative to the edges if the edges were perturbed by $\varepsilon=(\varepsilon_p,\varepsilon_q)$, i.e. the origin is shifted by the opposite perturbation $-\varepsilon=(-\varepsilon_p,-\varepsilon_q)$ and it can be seen that if the perturbation was applied then the edges would no longer intersect the origin 1102.

In FIG. 11a neither of the coordinates of the first vertex $v_i$ are zero, i.e. $p_i\neq 0$ and $q_i\neq 0$, but the second projected vertex $v_j$ is at the origin, i.e. $p_j=q_j=0$. FIG. 11a shows four types of edges which fall into this category for the four possible combinations of signs of $p_i$ and $q_i$. In this example, equation (2) becomes $f(v_i,v_j)=p_i\varepsilon_q-q_i\varepsilon_p$, so since $0<\varepsilon_p<<\varepsilon_q$, the sign of f will be the sign of $p_i$. As such, the sign of the w parameter is set in this example to be equal to the sign of $p_i$. The dual case, i.e. the reverse case, to the situation shown in FIG. 11a is shown in FIG. 11i, for which the sign of the w parameter is set to be the opposite of the sign of $p_j$. The dual case demonstrates the anticommutative property of the tie-break behaviour as switching the order of the input projected vertices, e.g. swapping every instance of i with j in the subscripts of p and q, negates the sign of the result.

In FIG. 11b the first vertex $v_i$ is on the Q axis but not at the origin, i.e. $p_i=0$ and $q_i\neq 0$, and the second projected vertex $v_j$ is at the origin, i.e. $p_j=q_j=0$. FIG. 11b shows two types of edges which fall into this category, for the two possible signs of $q_i$. In this example, equation (2) becomes $f(v_i,v_j)=-q_i\varepsilon_p$, so the sign of f will be the opposite of the sign of $q_i$. As such, the sign of the w parameter is set in this example to be the opposite of the sign of $q_i$. The dual case, i.e. the reverse case, to the situation shown in FIG. 11b is shown in FIG. 11f, for which the sign of the w parameter is set to be the sign of $q_j$.

In FIG. 11c both vertices $v_i$ and $v_j$ are on the Q axis but not at the origin, i.e. $p_i=0$, $q_i\neq 0$, $p_j=0$ and $q_j\neq 0$. Since, for a strictly convex polygon, a valid intersection can only occur when the (unperturbed) edge passes through the origin (i.e., an intersection with a strictly convex polygon cannot occur for an edge depicted in FIG. 11k), then the edge must cross the P axis, and therefore $q_i$ and $q_j$ must have opposite sign in this example. FIG. 11c shows two types of edges which fall into this category, for the two valid combinations of signs of $q_i$ and $q_j$. In this example, equation (2) becomes $f(v_i,v_j)=\varepsilon_pq_j-q_i\varepsilon_p=\varepsilon_p(q_j-q_i)$. Since $q_i$ and $q_j$ have opposite signs, the sign of $(q_j-q_i)$ is equal to the sign of $q_j$ and opposite to the sign of $q_i$. Therefore the sign of f will be the sign of $q_j$ which is the opposite of the sign of $q_i$. As such, the sign of the w parameter is set in this example to be the sign of $q_j$ or the opposite of the sign of $q_i$. The situation shown in FIG. 11c is its own dual case, i.e. its own reverse case, as the sign of $q_j$ is equal to the opposite of the sign of $q_i$.

In FIG. 11d the first vertex $v_i$ is on the P axis but not at the origin, i.e. $p_i\neq 0$ and $q_i=0$, and the second projected vertex $v_j$ is at the origin, i.e. $p_j=q_j=0$. FIG. 11d shows two types of edges which fall into this category, for the two possible signs of $p_i$. In this example, equation (2) becomes $f(v_i,v_j)=p_i\varepsilon_q$, so the sign of f will be the sign of $p_i$. As such, the sign of the w parameter is set in this example to be the sign of $p_i$. The dual case, i.e. the reverse case, to the situation shown in FIG. 11d is shown in FIG. 11h, for which the sign of the w parameter is set to be the opposite of the sign of $p_j$.

In FIG. 11e neither of the coordinates of the first vertex $v_i$ are zero, i.e. $p_i\neq 0$ and $q_i\neq 0$, and neither of the coordinates of the second vertex $v_j$ are zero, i.e. $p_j\neq 0$ and $q_j\neq 0$. Since, for a strictly convex polygon, a valid intersection can only occur when the (unperturbed) edge passes through the origin (i.e., an intersection with a strictly convex polygon cannot occur for an edge depicted in FIG. 11j), then the edge must cross the P axis so $q_i$ and $q_j$ must have opposite sign in this example, and the edge must cross the Q axis so $p_i$ and $p_j$ must have opposite sign in this example too. FIG. 11e shows four types of edges which fall into this category for the four valid combinations of signs of $p_i$, $q_i$, $p_j$ and $q_j$. In this example, equation (2) becomes $f(v_i,v_j)=p_i\varepsilon_q+\varepsilon_pq_j-q_i\varepsilon_p-\varepsilon_qp_j$, so since $0<\varepsilon_p<<\varepsilon_q$, the sign of f will be the sign of $(p_i-p_j)$. Since $p_i$ and $p_j$ have opposite signs, the sign of $(p_i-p_j)$ is equal to the sign of $p_i$ and opposite to the sign of $p_j$. Therefore the sign of f will be the sign of $p_i$ which is the opposite of the sign of $p_j$. As such, the sign of the w parameter is set in this example to be the sign of $p_i$ or the opposite of the sign of $p_j$. The situation shown in FIG. 11e is its own dual case, i.e. its own reverse case, as the sign of $p_i$ is equal to the opposite of the sign of $p_j$.

In FIG. 11f the first vertex $v_i$ is at the origin, i.e. $p_i=q_i=0$, and the second projected vertex $v_j$ is on the Q axis but not at the origin, i.e. $p_j=0$ and $q_j\neq 0$. FIG. 11f shows two types of edges which fall into this category, for the two possible signs of $q_j$. In this example, equation (2) becomes $f(v_i,v_j)=\varepsilon_pq_j$, so the sign of f will be the sign of $q_j$. As such, the sign of the w parameter is set in this example to be the sign of $q_j$. The dual case, i.e. the reverse case, to the situation shown in FIG. 11f is shown in FIG. 11b, for which the sign of the w parameter is set to be the opposite of the sign of $q_i$.

In FIG. 11g both vertices $v_i$ and $v_j$ are on the P axis but not at the origin, i.e. $p_i\neq 0$, $q_i=0$, $p_j\neq 0$ and $q_j=0$. Since, for a strictly convex polygon, a valid intersection can only occur when the (unperturbed) edge passes through the origin (i.e., an intersection with a strictly convex polygon cannot occur for an edge depicted in FIG. 11*l*), then the edge must cross the Q axis, and therefore $p_i$ and $p_j$ must have opposite sign in this example. FIG. 11*g* shows two types of edges which fall into this category, for the two valid combinations of signs of $p_i$ and $p_j$. In this example, equation (2) becomes $f(v_i,v_j)=p_i\varepsilon_q-\varepsilon_q p_j=\varepsilon_q(p_i-p_j)$. Since $p_i$ and $p_j$ have opposite signs, the sign of $(p_i-p_j)$ is equal to the sign of $p_i$ and opposite to the sign of $p_j$. Therefore the sign of f will be the sign of $p_i$ which is the opposite of the sign of $p_j$. As such, the sign of the w parameter is set in this example to be the sign of $p_i$ or the opposite of the sign of $p_j$. The situation shown in FIG. 11*g* is its own dual case, i.e. its own reverse case, as the sign of $p_i$ is the opposite of the sign of $p_j$.

In FIG. 11*h* the first vertex $v_i$ is at the origin, i.e. $p_i=q_i=0$, and the second projected vertex $v_j$ is on the P axis but not at the origin, i.e. $p_j\neq 0$ and $q_j=0$. FIG. 11*h* shows two types of edges which fall into this category, for the two possible signs of $p_j$. In this example, equation (2) becomes $f(v_i,v_j)=-\varepsilon_q p_j$, so the sign of f will be the opposite of the sign of $p_j$. As such, the sign of the w parameter is set in this example to be the opposite of the sign of $p_j$. The dual case, i.e. the reverse case, to the situation shown in FIG. 11*h* is shown in FIG. 11*d*, for which the sign of the w parameter is set to be the sign of $p_i$.

In FIG. 11*i* the first projected vertex $v_i$ is at the origin, i.e. $p_i=q_i=0$, but neither of the coordinates of the second vertex $v_j$ are zero, i.e. $p_j\neq 0$ and $q_j\neq 0$. FIG. 11*i* shows four types of edges which fall into this category for the four possible combinations of signs of $p_j$ and $q_j$. In this example, equation (2) becomes $f(v_i, v_j)=\varepsilon_p q_j-\varepsilon_q p_j$, so since $0<\varepsilon_p<<\varepsilon_q$, the sign of f will be the opposite of the sign of $p_j$. As such, the sign of the w parameter is set in this example to be opposite to the sign of $p_j$. The dual case, i.e. the reverse case, to the situation shown in FIG. 11*i* is shown in FIG. 11*a*, for which the sign of the w parameter is set to be the sign of $p_i$.

The situation shown in FIG. 11*j* is potentially problematic as we are unable to ensure anticommutativity of the parameter w purely based on the signs of $p_i$, $q_i$, $p_j$ and $q_j$, but as explained here it is actually not a problem. How anticommutativity of the parameter w cannot be guaranteed is outlined: Similar to the situation shown in FIG. 11*e*, neither of the coordinates of the first vertex $v_i$ are zero, i.e. $p_i\neq 0$ and $q_i\neq 0$, and neither of the coordinates of the second vertex $v_j$ are zero, i.e. $p_j\neq 0$ and $q_j\neq 0$. However, in the situation shown in FIG. 11*j*, although the edge (if extended) would pass through the origin (such that $p_i q_j-q_i p_j=0$), the edge actually stops before it reaches the origin. This situation is identified by seeing that the p coordinates (and/or the q coordinates) for the two vertices have the same sign, i.e. if $p_i$ and $p_j$ are both positive or are both negative (indicated by the symbol $\pm_p$ in FIG. 11*j*), and if $q_i$ and $q_j$ are both positive or are both negative (indicated by the symbol $\pm_q$ in FIG. 11*j*), then we can be in the situation shown in FIG. 11*j*. The potential problem with this situation is that the edge winding can be reversed without changing any of the input signs, e.g. by rotating the edge, e.g. by 180 degrees. Hence, for this situation, winding cannot be purely a function of input signs of the $p_i$, $q_i$, $p_j$ and $q_j$ coordinates. However, this is not actually a problem as, for this situation, the determination of the sign of w for these edges does not matter. This is because, where the polygon including this edge is a strictly convex polygon, the polygon is either degenerate or the ray does not intersect the strictly convex polygon no matter what sign we choose for this edge (e.g. when two of its edges return opposite signs for their w parameters in the sign-inequality intersection criterion). As such, we can set the sign of the w parameter to be anything in this example and it will not cause any errors. However, as described below, this situation is indistinguishable (purely based on the signs of $p_i$, $q_i$, $p_j$ and $q_j$) from the alternative situation shown in FIG. 12*j*, which may possibly occur when a RTZ type implementation is used to calculate f (and in this case rounds an underflowing result to zero). As we have assumed that the implementation of the 2D cross product is sign accurate (e.g., by using "sign accurate rounding") off of the kernel of f then, in the situation shown in FIG. 12*j*, the sign of f is correct. As such, the sign of the w parameter can be set to be equal to the sign of f in both alternative situations 11*j* and 12*j* (when an RTZ type implementation is used to calculate f, otherwise any value may be used for w). The lookup table or logic array may receive the sign of f as an input, and set the sign of the w parameter to be equal to the sign of f. The situation shown in FIG. 11*j* is its own dual case, i.e., its own reverse case.

The situation shown in FIG. 11*k* is also potentially problematic, as we are also unable to ensure anticommutativity of the parameter w purely based on the signs of $p_i$, $q_i$, $p_j$ and $q_j$, but as explained here it is actually not a problem. How anticommutativity of the parameter w cannot be guaranteed is outlined; similar to the situation in FIG. 11*c* both vertices $v_i$ and $v_j$ are on the Q axis but not at the origin, i.e. $p_i=0$, $q_i\neq 0$, $p_j=0$ and $q_j\neq 0$. However, in the situation shown in FIG. 11*k*, although the edge (if extended) would pass through the origin (such that $p_i q_j-q_i p_j=0$) the edge actually stops before it reaches the origin. This situation is identified by seeing that the q coordinates for the two vertices have the same sign, i.e. if $q_i$ and $q_j$ are both positive or are both negative, then we are in the situation shown in FIG. 11*k*. The potential problem with this situation is that the edge winding can be reversed without changing any of the input signs, e.g. by rotating the edge, e.g. by 180 degrees. Hence, for this situation, winding cannot be purely a function of input signs of the $p_i$, $q_i$, $p_j$ and $q_j$ coordinates. However, this is not actually a problem as, for this situation, the determination of the sign of w for these edges does not matter. This is because, where the polygon including this edge is a strictly convex polygon, the polygon is either degenerate or the ray does not intersect the strictly convex polygon no matter what sign we choose for this edge (e.g. when two of its edges return opposite signs for their w parameters in the sign-inequality intersection criterion). As such, we can set the sign of the w parameter to be anything in this example and it will not cause any errors (indicated by a X in FIG. 11*k*). The situation shown in FIG. 11*k* is its own dual case, i.e. its own reverse case.

The situation shown in FIG. 11*l* is also potentially problematic, as we are also unable to ensure the anticommutativity of the parameter w purely based on the signs of $p_i$, $q_i$, $p_j$ and $q_j$, but as explained here it is actually not a problem. How anticommutativity of the parameter w cannot be guaranteed is outlined; similar to the situation in FIG. 11*g* both vertices $v_i$ and $v_j$ are on the P axis but not at the origin, i.e. $p_i\neq 0$, $q_i=0$, $p_j\neq 0$ and $q_j=0$. However, in the situation shown in FIG. 11*l*, although the edge (if extended) would pass through the origin (such that $p_i q_j-q_i p_j=0$) the edge actually stops before it reaches the origin. This situation is identified by seeing that the p coordinates for the two vertices have the same sign, i.e. if $p_i$ and $p_j$ are both positive or are both negative, then we are in the situation shown in FIG. 11*l*. The potential problem with this situation is that the edge winding can be reversed without changing any of the input signs, e.g. by rotating the edge, e.g. by 180 degrees. Hence, for this situation, winding cannot be purely a function of input signs of the $p_i$, $q_i$, $p_j$ and $q_j$ coordinates. However, this is not actually a problem as, for this situation the determination of the sign of w for these edges does not matter. This is because, where the polygon including this edge is a strictly convex polygon, the polygon is either degenerate or the ray does not intersect the strictly convex polygon no matter what sign we choose for this edge (e.g. when two of its edges return opposite signs for their w parameters in the sign-inequality intersection criterion). As such, we can set the sign of the w parameter to be anything in this example and it will not cause any errors (indicated by a X in FIG. 11*l*). The situation shown in FIG. 11*l* is its own dual case, i.e. its own reverse case.

FIGS. 11*a* to 11*l* illustrate all of the situations for combinations of inputs to the lookup table or logic array for situations in which an (possibly extended) edge can exactly intersect the origin of the P and Q axes. Therefore, when using an implementation of a RAZ type FIGS. 11*a* to 11*l* illustrate all of the situations in which the lookup table or logic array is used, and indicate the outputs of the lookup table or logic array for the different combinations of inputs.

In some other examples, the polygon intersection testing unit(s) 114 may operate according to an implementation of the 2D cross product that is not a RAZ type for use in determining the w parameters. For example, the implementation of the 2D cross product may use a rounding mode that is round to nearest, round towards zero, round towards positive infinity or round to negative infinity. When a non-RAZ implementation type is used then the value of f may be determined to be (plus or minus) zero even though the exact value of f is not zero. For example, a value of f that is very close to zero may be rounded to (plus or minus) zero. This loss of precision in calculations involving floating point numbers is referred to as "underflow". Therefore, when a non-RAZ, but still sign accurate, implementation type (denoted RTZ) is used to calculate the 2D cross product, then the lookup table or logic array needs to account for situations in which the edge does not exactly intersect the origin (in addition to the situations in which the edge does exactly intersect the origin). One way to accomplish this is to provide an indication that underflow has occurred and in that case proceed to step S906 as if a nonzero value had been computed or, equivalently, supply both an indication of underflow and the sign of f as additional inputs to the lookup table in step S910 such that the sign is used as output. There are, however, alternative methods that make uses of steps S908 and S910 as now described. FIGS. 12*a* to 12*j* illustrate the positions of the P and Q axes and edges which do not exactly intersect with the origin of the P and Q axes, but for which f may be determined to be zero due to the kernel of its implementation being a strict superset of its own kernel (e.g., due to underflow in the calculation). As with FIGS. 11*a* to 11*l*, each edge is illustrated in FIGS. 12*a* to 12*j* by a line connecting the vertices $v_i$ to $v_j$ which define the edge, with the arrowheads pointing in the direction from $v_i$ to $v_j$. The actual vertices $v_i$ and $v_j$ are not labelled in FIGS. 12*a* to 12*j*. FIGS. 12*a* to 12*j* also show the position of the origin 1202, which does not appear perturbed, as shifting by $\varepsilon_p$ and $\varepsilon_q$ is negligible compared to the nonzero values of $p_i$, $q_i$, $p_j$ and $q_j$ in these underflow cases.

In FIG. 12*a* the first projected vertex $v_i$ is on the Q axis but not at the origin, i.e. $p_i=0$ and $q_i \neq 0$, and the second projected vertex $v_j$ is on the P axis but not at the origin, i.e. $p_j \neq 0$ and $q_j=0$. FIG. 12*a* shows four types of edges which fall into this category for the four possible combinations of signs of $q_i$ and $p_j$. In this example, the 2D cross product is $f(v_i,v_j)=-q_i p_j$, so the sign of f will be the opposite of the product of the signs of $q_i$ and $p_j$. As such, the sign of the w parameter is set in this example to be the opposite of the product of the signs of $q_i$ and $p_j$. The dual case, i.e. the reverse case, to the situation shown in FIG. 12*a* is shown in FIG. 12*b*, for which the sign of the w parameter is set to be equal to the product of the signs of $p_i$ and $q_j$.

When representing signs as + or −, indicating +1 or −1, we take the product of the signs to combine them and we negate to get the opposite result. When representing signs as 0 or 1, we take the XOR of the signs, or equivalently the sum of the signs modulo two, to combine them and we NOT, equivalently complement, to get the opposite result. The symbols in FIGS. 12*a* to 12*i* can indicate either of these respective operations, depending on the particular representation.

In FIG. 12*b* the first projected vertex $v_i$ is on the P axis but not at the origin, i.e. $p_i \neq 0$ and $q_i=0$, and the second projected vertex $v_j$ is on the Q axis but not at the origin, i.e. $p_j=0$ and $q_j \neq 0$. FIG. 12*b* shows four types of edges which fall into this category for the four possible combinations of signs of $p_i$ and $q_j$. In this example, the 2D cross product is $f(v_i,v_j)=p_i q_j$, so the sign of f will be the equal to the product of the signs of $p_i$ and $q_j$. As such, the sign of the w parameter is set in this example to be equal to the product of the signs of $p_i$ and $q_j$. The dual case, i.e. the reverse case, to the situation shown in FIG. 12*b* is shown in FIG. 12*a*, for which the sign of the w parameter is set to be the opposite of the product of the signs of $q_i$ and $p_j$.

In FIG. 12*c* the first projected vertex $v_i$ is on the Q axis but not at the origin, i.e. $p_i=0$ and $q_i \neq 0$, and neither of the coordinates of the second vertex $v_j$ are zero, i.e. $p_j \neq 0$ and $q_j \neq 0$. FIG. 12*c* shows eight types of edges which fall into this category for the eight possible combinations of signs of $q_i$, $p_j$ and $q_j$. In this example, the 2D cross product is $f(v_i,v_j)=-q_i p_j$, so the sign of f will be the opposite of the product of the signs of $q_i$ and $p_j$. As such, the sign of the w parameter is set in this example to be the opposite of the product of the signs of $q_i$ and $p_j$. The dual case, i.e. the reverse case, to the situation shown in FIG. 12*c* is shown in FIG. 12*e*, for which the sign of the w parameter is set to be equal to the product of the signs of $p_i$ and $q_j$.

In FIG. 12*d* the first projected vertex $v_i$ is on the P axis but not at the origin, i.e. $p_i \neq 0$ and $q_i=0$, and neither of the coordinates of the second vertex $v_j$ are zero, i.e. $p_j \neq 0$ and $q_j \neq 0$. FIG. 12*d* shows eight types of edges which fall into this category for the eight possible combinations of signs of $p_i$, $p_j$ and $q_j$. In this example, the 2D cross product is $f(v_i,v_j)=p_i q_j$, so the sign of f will be the equal to the product of the signs of $p_i$ and $q_j$. As such, the sign of the w parameter is set in this example to be equal to the product of the signs of $p_i$ and $q_j$. The dual case, i.e. the reverse case, to the situation shown in FIG. 12*d* is shown in FIG. 12*f*, for which the sign of the w parameter is set to be the opposite of the product of the signs of $q_i$ and $p_j$.

In FIG. 12*e* neither of the coordinates of the first vertex $v_i$ are zero, i.e. $p_i \neq 0$ and $q_i \neq 0$, and the second projected vertex $v_j$ is on the Q axis but not at the origin, i.e. $p_j=0$ and $q_j \neq 0$. FIG. 12*e* shows eight types of edges which fall into this category for the eight possible combinations of signs of $p_i$, $q_i$ and $q_j$. In this example, the 2D cross product is $f(v_i,v_j)=p_i q_j$, so the sign of f will be the equal to the product of the signs of $p_i$ and $q_j$. As such, the sign of the w parameter is set in this example to be equal to the product of the signs of $p_i$ and $q_j$. The dual case, i.e. the reverse case, to the situation shown in FIG. 12*e* is shown in FIG. 12*c*, for which the sign of the w parameter is set to be the opposite of the product of the signs of $q_i$ and $p_j$.

In FIG. 12*f* neither of the coordinates of the first vertex $v_i$ are zero, i.e. $p_i \neq 0$ and $q_i \neq 0$, and the second projected vertex $v_j$ is on the P axis but not at the origin, i.e. $p_j \neq 0$ and $q_j=0$. FIG. 12f shows eight types of edges which fall into this category for the eight possible combinations of signs of $p_i$, $q_i$ and $p_j$. In this example, the 2D cross product is $f(v_i,v_j)=-q_i p_j$, so the sign of f will be the opposite of the product of the signs of $q_i$ and $p_j$. As such, the sign of the w parameter is set in this example to be the opposite of the product of the signs of $q_i$ and $p_j$. The dual case, i.e. the reverse case, to the situation shown in FIG. 12f is shown in FIG. 12d, for which the sign of the w parameter is set to be equal to the product of the signs of $p_i$ and $q_j$.

The situation shown in FIG. 12g is potentially problematic, as we are unable to ensure the anticommutativity of the parameter w purely based on the signs of $p_i$, $q_i$, $p_j$ and $q_j$, but as explained here this problem can be overcome. How anticommutativity of the parameter w cannot be guaranteed is outlined; similar to the situation shown in FIG. 11e, neither of the coordinates of the first vertex $v_i$ are zero, i.e. $p_i \neq 0$ and $q_i \neq 0$, and neither of the coordinates of the second vertex $v_j$ are zero, i.e. $p_j \neq 0$ and $q_j \neq 0$. In this case the signs of $p_i$ and $q_i$ (indicated by the symbols $\pm_p$ and $\pm_q$ in FIG. 12g) match each other but are opposite to the signs of $p_j$ and $q_j$ (indicated by the symbols $\mp_p$ and $\mp_q$ in FIG. 12g). However, in the situation shown in FIG. 12g, the edge does not exactly pass through the origin, and instead f is determined to equal (plus or minus) zero only as the kernel of its implementation is a strict superset of its own kernel (e.g. due to underflow in the calculation). The potential problem with this situation is that the edge winding can be reversed without changing any of the input signs, e.g. by passing the edge across the origin. Hence, for this situation, winding cannot be purely a function of input signs of the $p_i$, $q_i$, $p_j$ and $q_j$ coordinates. In particular, the signs of $p_i$, $q_i$, $p_j$ and $q_j$ cannot distinguish the underflow case (shown in FIG. 12g) from a genuine f=0 case (shown in FIG. 11e), so the situation shown in FIG. 12g is not handled correctly even with "sign accurate rounding", as it will be overridden by the sign determination of the situation in FIG. 11e. In order to overcome this potential problem, the implementation of the 2D cross product can flag up a case of underflow to detect this alternative situation 12g. This underflow flag can be passed as an additional input bit to the lookup table or logic array, to choose between the sign determination of the situation in FIG. 11e, when the flag is not set, and the sign of the (sign accurate) determination of the 2D cross product for the situation in FIG. 12g, when the flag is set. As an alternative method, leveraging unused encodings in the floating-point format, when the 2D cross product identifies that f=0; that the signs of the inputs $p_i$, $q_i$, $p_j$ and $q_j$ coordinates are as shown in FIGS. 11e and 12g; and that underflow will occur (indicating the situation in FIG. 12g); then, rather than rounding to (plus or minus) zero, the unrounded result of the 2D cross product can be encoded as special tokens $-\varepsilon$ or $+\varepsilon$. Hence, in this alternative, and given that the f=0 on-edge case is avoided, the sign of the 2D cross product (i.e. the sign of either $-\varepsilon$ or $+\varepsilon$) would be used as the sign of the w parameter, the same as for all f≠0 cases. The situation shown in FIG. 12g is its own dual case, i.e. its own reverse case, the same as the situation in FIG. 11e.

The situation shown in FIG. 12h is similar to the situation shown in FIG. 11e as neither of the coordinates of the first vertex $v_i$ are zero, i.e. $p_i \neq 0$ and $q_i \neq 0$, and neither of the coordinates of the second vertex $v_j$ are zero, i.e. $p_j \neq 0$ and $q_j \neq 0$. However, it differs from the situation shown in FIG. 11e as the signs of $p_i$ and $p_j$ are opposite to each other, and the signs of $q_i$ and $q_j$ match each other. In this example, the 2D cross product is $f(v_i,v_j)=p_i q_j - q_i p_j$, and since we know that the signs of $p_i$ and $p_j$ are opposite to each other, and the signs of $q_i$ and $q_j$ match each other, the sign of f will be equal to the product of the signs of $p_i$ and $q_j$, which is the opposite of the product of the signs $q_i$ and $p_j$. As such, the sign of the w parameter is set in this example to be equal to the product of the signs of $p_i$ and $q_j$, or the opposite of the product of the signs of $q_i$ and $p_j$. The situation shown in FIG. 12h is its own dual case, i.e. its own reverse case, as the sign of $p_i$ is opposite to the sign of $p_j$, and the sign of $q_i$ matches the sign of $q_j$.

The situation shown in FIG. 12i is similar to the situation shown in FIG. 11e as neither of the coordinates of the first vertex $v_i$ are zero, i.e. $p_i \neq 0$ and $q_i \neq 0$, and neither of the coordinates of the second vertex $v_j$ are zero, i.e. $p_j \neq 0$ and $q_j \neq 0$. However, it differs from the situation shown in FIG. 11e as the signs of $p_i$ and $p_j$ match each other, and the signs of $q_i$ and $q_j$ are opposite to each other. In this example, the 2D cross product is $f(v_i,v_j)=p_i q_j - q_i p_j$, and since we know that the signs of $p_i$ and $p_j$ match each other, and the signs of $q_i$ and $q_j$ are opposite to each other, the sign of f will be the opposite of the product of the signs of $q_i$ and $p_j$, which is the product of the signs of $p_i$ and $q_j$. As such, the sign of the w parameter is set in this example to be the opposite of the product of the signs of $q_i$ and $p_j$, or the product of the signs of $p_i$ and $q_j$. The situation shown in FIG. 12i is its own dual case, i.e. its own reverse case, as the sign of $q_i$ is opposite to the sign of $q_j$, and the sign of $p_i$ matches the sign of $p_j$.

The situation shown in FIG. 12j is potentially problematic, as we are also unable to ensure the anticommutativity of the parameter w purely based on the signs of $p_i$, $q_i$, $p_j$ and $q_j$, but as explained here this problem can be overcome. How anticommutativity of the parameter w cannot be guaranteed is outlined: Similar to the situation shown in FIG. 11e, neither of the coordinates of the first vertex $v_i$ are zero, i.e. $p_i \neq 0$ and $q_i \neq 0$, and neither of the coordinates of the second vertex $v_j$ are zero, i.e. $p_j \neq 0$ and $q_j \neq 0$. In this case the signs of $p_i$ and $p_j$ match each other, and (independently) the signs of $q_i$ and $q_j$ match each other. However, in the situation shown in FIG. 12g, the edge does not exactly pass through the origin, and instead the implementation of the 2D cross product f is determined to equal (plus or minus) zero only as the kernel of its implementation is a strict superset of its own kernel (e.g. due to underflow in the calculation). As with the situation shown in FIG. 11j, the potential problem with this situation is that the edge winding can be reversed without changing any of the input signs, e.g. by rotating the edge, e.g. by 180 degrees. Hence, for this situation, winding cannot be purely a function of input signs of the $p_i$, $q_i$, $p_j$ and $q_j$ coordinates. However, we can detect the situations shown in FIGS. 12j and 11j by checking that the implementation of the 2D cross product f=0 and by checking that the input $p_i$, $q_i$, $p_j$ and $q_j$ coordinates have appropriate signs. We have assumed that the implementation of the 2D cross product function has "sign accurate rounding" off of the kernel of f meaning that, even in an underflow case, such as the situation shown in FIG. 12j, the sign of the implementation of the 2D cross product matches the sign of f. As such, the sign of the w parameter can be set to be equal to the sign of f. The lookup table or logic array may receive the sign of f as an input, and set the sign of the w parameter to be equal to the sign of f. Since the situations shown in FIGS. 11j and 12j are indistinguishable to the lookup table or logic array (i.e. the same input trits are received for the two cases), the sign of the w parameter is also set to be equal to the sign of f in the situation shown in FIG. 11j (when an RTZ type implementation is used to calculate f, otherwise any value may be used for w) This is fine because, as described above, the sign of w does not matter in the situation shown in FIG.

11j, because an intersection cannot occur with a strictly convex polygon including such an edge. The situation shown in FIG. 12j is its own dual case, i.e. its own reverse case.

There is a trichotomy (negative, (plus or minus) zero, positive) for each of the four input coordinates. When the convex polygons are triangles, the case of $p_i=q_i=p_j=q_j=0$ does not need to be included in the lookup table or logic array because, in general, any projected edge such that $p_i=p_j$ and $q_i=q_j$ represents a degenerate projected edge, i.e. it appears as a point, and triangle polygons including such edges can be discarded because they must be degenerate, and a ray does not need to be determined to intersect degenerate polygons. So, in total, there are $3^4-1=80$ examples (excluding the degenerate point line), and the FIGS. 11a to 12j illustrate what sign for w is output from the lookup table or logic array for each of these classifications.

For a general convex polygon having n sides, at least n−2 projected edges must be degenerate for the projected polygon to be degenerate, i.e. to have zero projected area, and hence able to be culled freely. If there are fewer than n−2 degenerate projected edges, then the signs of degenerate edge tests (i.e., the case of $p_i=p_j$ and $q_i=q_j$) can be ignored when testing whether all edge signs are equal, so the case of $p_i=q_i=p_j=q_j=0$ does not need to be included in the lookup table of logic array for a general convex polygon either. Such edges can be detected simply by checking if the two projected endpoints are equal. Geometrically, a higher order polygon with such degenerate edges collapses to a lower order polygon (similar to a non-strictly convex polygon). Such pathological cases can be avoided by ensuring that no two vertices of a strictly convex polygon are equal. When the normal of the (planar) convex polygon is perpendicular to the ray direction it will also have zero area as it appears as a line, and hence will also be a degenerate projected polygon, even if it has no degenerate (i.e. point) projected edges.

In one example, two bits can be used as the input for a coordinate to indicate negative, zero or positive. For example, a first bit could indicate that the input coordinate is either zero or non-zero, and a second bit could indicate that the input coordinate is either negative or positive. In this example, in the situation that the first bit indicates that the input coordinate is zero, then it doesn't matter what the second bit is; whereas if the first bit indicates that the input coordinate is non-zero, then the second bit is used to indicate that the input coordinate is either negative or positive. In another example, for each of the four input coordinates, the three values of a trit (i.e., 0, 1 and 2) can be assigned to encode the trichotomy of −, ±0 or + in any order. Then, the four trits (plus possibly an additional bit for the sign of the 2D cross product, plus possibly another additional bit for underflow detection, both for an RTZ implementation type) can be merged into a value between 0 and 80 (e.g. representing a case ID between 1 and 81 as shown in the table below) (or between 0 and 161, or 0 and 323), so that the value can be encoded in binary with 7 (or 8, or 9) bits.

The lookup table or logic array may be hardcoded in fixed function circuitry in the polygon intersection testing unit(s) 114 of the intersection testing module 108. Table 2 below shows an example of the inputs and outputs of an implementation of the lookup table or logic array, with some explanatory comments. A value of 0 for an input coordinate $p_i$, $q_i$, $p_j$ or $q_j$ indicates a value of either plus or minus zero. Likewise, a result of 0 for the implementation of the 2D cross product f indicates a value of either plus or minus zero. For any input of output, a "don't care" value is represented by the symbol 'X':

TABLE 2

Example inputs, outputs and explanatory data for the lookup table or logic array

| | Inputs | | | | | | | Dual | Is Case Due to |
|---|---|---|---|---|---|---|---|---|---|
| Case ID | Underflow Flag Set? | sgn (f) | $p_i$ | $q_i$ | $p_j$ | $q_j$ | Figure | Output Sign of w | Case ID | $f = ±0$ or Underflow? |
| 1.0 | X | + | − | − | − | − | 11j/12j | + (RTZ type) X (RAZ type) | 1.1 | $f = 0$/Underflow |
| 1.1 | X | − | − | − | − | − | 11j/12j | − (RTZ type) X (RAZ type) | 1.0 | $f = 0$/Underflow |
| 2 | X | ± | − | − | − | 0 | 12f | − | 10 | Underflow |
| 3 | X | ± | − | − | − | + | 12i | − | 19 | Underflow |
| 4 | X | ± | − | − | 0 | − | 12e | + | 28 | Underflow |
| 5 | X | ± | − | − | 0 | 0 | 11a | − | 37 | $f = 0$ |
| 6 | X | ± | − | − | 0 | + | 12e | − | 46 | Underflow |
| 7 | X | ± | − | − | + | − | 12h | + | 55 | Underflow |
| 8 | X | ± | − | − | + | 0 | 12f | + | 64 | Underflow |
| 9.00 | N | + | − | − | + | + | 11e | − | 73.01 | $f = 0$ |
| 9.01 | N | − | − | − | + | + | 11e | − | 73.00 | $f = 0$ |
| 9.10 | Y | + | − | − | + | + | 12g | + | 73.11 | Underflow |
| 9.11 | Y | − | − | − | + | + | 12g | − | 73.10 | Underflow |
| 10 | X | ± | − | 0 | − | − | 12d | + | 2 | Underflow |
| 11 | X | ± | − | 0 | − | 0 | 11l | X | 11 | $f = 0$ |
| 12 | X | ± | − | 0 | − | + | 12d | − | 20 | Underflow |
| 13 | X | ± | − | 0 | 0 | − | 12b | + | 29 | Underflow |
| 14 | X | ± | − | 0 | 0 | 0 | 11d | − | 38 | $f = 0$ |
| 15 | X | ± | − | 0 | 0 | + | 12b | − | 47 | Underflow |
| 16 | X | ± | − | 0 | + | − | 12d | + | 56 | Underflow |
| 17 | X | ± | − | 0 | + | 0 | 11g | − | 65 | $f = 0$ |
| 18 | X | ± | − | 0 | + | + | 12d | − | 74 | Underflow |
| 19 | X | ± | − | + | − | − | 12i | + | 3 | Underflow |
| 20 | X | ± | − | + | − | 0 | 12f | + | 12 | Underflow |
| 21.0 | X | + | − | + | − | + | 11j/12j | + (RTZ type) X (RAZ type) | 21.1 | $f = 0$/Underflow |
| 21.1 | X | − | − | + | − | + | 11j/12j | − (RTZ type) X (RAZ type) | 21.0 | $f = 0$/Underflow |

TABLE 2-continued

Example inputs, outputs and explanatory data for the lookup table or logic array

| Case ID | Inputs Underflow Flag Set? | sgn (f) | $p_i$ | $q_i$ | $p_j$ | $q_j$ | Figure | Output Sign of w | Dual Case ID | Is Case Due to $f = \pm 0$ or Underflow? |
|---|---|---|---|---|---|---|---|---|---|---|
| 22 | X | ± | − | + | 0 | − | 12e | + | 30 | Underflow |
| 23 | X | ± | − | + | 0 | 0 | 11a | − | 39 | $f = 0$ |
| 24 | X | ± | − | + | 0 | + | 12e | − | 48 | Underflow |
| 25.00 | N | + | − | + | + | − | 11e | − | 57.01 | $f = 0$ |
| 25.01 | N | − | − | + | + | − | 11e | − | 57.00 | $f = 0$ |
| 25.10 | Y | + | − | + | + | − | 12g | + | 57.11 | Underflow |
| 25.11 | Y | − | − | + | + | − | 12g | − | 57.10 | Underflow |
| 26 | X | ± | − | + | + | 0 | 12f | − | 66 | Underflow |
| 27 | X | ± | − | + | + | + | 12h | − | 75 | Underflow |
| 28 | X | ± | 0 | − | − | − | 12c | − | 4 | Underflow |
| 29 | X | ± | 0 | − | − | 0 | 12a | − | 13 | Underflow |
| 30 | X | ± | 0 | − | − | + | 12c | − | 22 | Underflow |
| 31 | X | ± | 0 | − | 0 | − | 11k | X | 31 | $f = 0$ |
| 32 | X | ± | 0 | − | 0 | 0 | 11b | + | 40 | $f = 0$ |
| 33 | X | ± | 0 | − | 0 | + | 11c | + | 49 | $f = 0$ |
| 34 | X | ± | 0 | − | + | − | 12c | + | 58 | Underflow |
| 35 | X | ± | 0 | − | + | 0 | 12a | + | 67 | Underflow |
| 36 | X | ± | 0 | − | + | + | 12c | + | 76 | Underflow |
| 37 | X | ± | 0 | 0 | − | − | 11i | + | 5 | $f = 0$ |
| 38 | X | ± | 0 | 0 | − | 0 | 11h | + | 14 | $f = 0$ |
| 39 | X | ± | 0 | 0 | − | + | 11i | + | 23 | $f = 0$ |
| 40 | X | ± | 0 | 0 | 0 | − | 11f | − | 32 | $f = 0$ |
| 41 | X | ± | 0 | 0 | 0 | 0 | N/A | X | 41 | $f = 0$ |
| 42 | X | ± | 0 | 0 | 0 | + | 11f | + | 50 | $f = 0$ |
| 43 | X | ± | 0 | 0 | + | − | 11i | − | 59 | $f = 0$ |
| 44 | X | ± | 0 | 0 | + | 0 | 11h | − | 68 | $f = 0$ |
| 45 | X | ± | 0 | 0 | + | + | 11i | − | 77 | $f = 0$ |
| 46 | X | ± | 0 | + | − | − | 12c | + | 6 | Underflow |
| 47 | X | ± | 0 | + | − | 0 | 12a | + | 15 | Underflow |
| 48 | X | ± | 0 | + | − | + | 12c | + | 24 | Underflow |
| 49 | X | ± | 0 | + | 0 | − | 11c | − | 33 | $f = 0$ |
| 50 | X | ± | 0 | + | 0 | 0 | 11b | − | 42 | $f = 0$ |
| 51 | X | ± | 0 | + | 0 | + | 11k | X | 51 | $f = 0$ |
| 52 | X | ± | 0 | + | + | − | 12c | − | 60 | Underflow |
| 53 | X | ± | 0 | + | + | 0 | 12a | − | 69 | Underflow |
| 54 | X | ± | 0 | + | + | + | 12c | − | 78 | Underflow |
| 55 | X | ± | + | − | − | − | 12h | − | 7 | Underflow |
| 56 | X | ± | + | − | − | 0 | 12f | − | 16 | Underflow |
| 57.00 | N | + | + | − | − | + | 11e | + | 25.01 | $f = 0$ |
| 57.01 | N | − | + | − | − | + | 11e | + | 25.00 | $f = 0$ |
| 57.10 | Y | + | + | − | − | + | 12g | + | 25.11 | Underflow |
| 57.11 | Y | − | + | − | − | + | 12g | − | 25.10 | Underflow |
| 58 | X | ± | + | − | 0 | − | 12e | − | 34 | Underflow |
| 59 | X | ± | + | − | 0 | 0 | 11a | + | 43 | $f = 0$ |
| 60 | X | ± | + | − | 0 | + | 12e | + | 52 | Underflow |
| 61.0 | X | + | + | − | + | − | 11j/12j | + (RTZ type) X (RAZ type) | 61.1 | $f = 0$/Underflow |
| 61.1 | X | − | + | − | + | − | 11j/12j | − (RTZ type) X (RAZ type) | 61.0 | $f = 0$/Underflow |
| 62 | X | ± | + | − | + | 0 | 12f | + | 70 | Underflow |
| 63 | X | ± | + | − | + | + | 12i | + | 79 | Underflow |
| 64 | X | ± | + | 0 | − | − | 12d | − | 8 | Underflow |
| 65 | X | ± | + | 0 | − | 0 | 11g | + | 17 | $f = 0$ |
| 66 | X | ± | + | 0 | − | + | 12d | + | 26 | Underflow |
| 67 | X | ± | + | 0 | 0 | − | 12b | − | 35 | Underflow |
| 68 | X | ± | + | 0 | 0 | 0 | 11d | + | 44 | $f = 0$ |
| 69 | X | ± | + | 0 | 0 | + | 12b | + | 53 | Underflow |
| 70 | X | ± | + | 0 | + | − | 12d | − | 62 | Underflow |
| 71 | X | ± | + | 0 | + | 0 | 11l | X | 71 | $f = 0$ |
| 72 | X | ± | + | 0 | + | + | 12d | + | 80 | Underflow |
| 73.00 | N | + | + | + | − | − | 11e | + | 9.01 | $f = 0$ |
| 73.01 | N | − | + | + | − | − | 11e | + | 9.00 | $f = 0$ |
| 73.10 | Y | + | + | + | − | − | 12g | + | 9.11 | Underflow |
| 73.11 | Y | − | + | + | − | − | 12g | − | 9.10 | Underflow |
| 74 | X | ± | + | + | − | 0 | 12f | + | 18 | Underflow |
| 75 | X | ± | + | + | − | + | 12h | + | 27 | Underflow |
| 76 | X | ± | + | + | 0 | − | 12e | − | 36 | Underflow |
| 77 | X | ± | + | + | 0 | 0 | 11a | + | 45 | $f = 0$ |
| 78 | X | ± | + | + | 0 | + | 12e | + | 54 | Underflow |
| 79 | X | ± | + | + | + | − | 12i | − | 63 | Underflow |
| 80 | X | ± | + | + | + | 0 | 12f | − | 72 | Underflow |
| 81.0 | X | + | + | + | + | + | 11j/12j | + (RTZ type) X (RAZ type) | 81.1 | $f = 0$/Underflow |

TABLE 2-continued

Example inputs, outputs and explanatory data for the lookup table or logic array

| | | Inputs | | | | | | Dual | Is Case Due to |
|---|---|---|---|---|---|---|---|---|---|
| Case ID | Underflow Flag Set? | sgn (f) | $p_i$ | $q_i$ | $p_j$ | $q_j$ | Figure | Output Sign of w | Case ID | $f = \pm 0$ or Underflow? |
| 81.1 | X | – | + | + | + | + | 11j/12j | – (RTZ type) X (RAZ type) | 81.0 | $f = 0$/Underflow |

It can be seen that Table 2 has symmetry about its median value (i.e., case 41), whereby an underflow case maintains its output sign (as rotating an edge by 180 degrees should fix the circulation of an interior intersection), whereas an f=0 case reverses its sign (as rotating an edge by 180 degrees should reverse the circulation of an on-edge intersection), when going from case c to case 82–c. Table 2 also has symmetry in its duality: swapping the first two trits with the second two trits switches between a case and its dual case, reversing the output sign, as required by the anticommutative property of the signed area calculation. Both of these properties can be leveraged to reduce the size of a LUT implementing Table 2, by using a certain amount of pre- or post-processing logic, or to reduce the complexity of a logic array implementing Table 1.

In the table above, the "dual case ID" column gives the case ID of the situation in which the order of the vertices defining the edge has been swapped. It can be seen that the dual case gives the opposite output for the sign of the w parameter. This ensures that when a ray intersects a shared edge, it is determined to intersect one (and only one) of the polygons which include the shared edge. In the final column, "f=0" indicates that this situation occurs because the exact value of the 2D cross product is zero, i.e., no underflow has occurred (e.g. as shown in FIGS. 11a to 11l). In the final column, "Underflow" indicates that this situation occurs due to underflow in the implementation of the 2D cross product, even though the exact value of f is not zero (e.g. as shown in FIGS. 12a to 12j). When a RAZ implementation type is used then the lookup table or logic array does not need to include the rows which can only occur due to underflow, and does need to include the underflow flag or the sign of f as input columns. Hence, the lookup table or logic array can be made smaller if the rounding mode is known to be a RAZ implementation type, thereby reducing the amount of silicon needed to hardcode the lookup table or logic array into the intersection testing module 108. In other words, in a RAZ implementation type the cases indicated as "Underflow" in the table above are not "valid" combinations of classifications of the $p_i$, $q_i$, $p_j$ and $q_j$ coordinates for the lookup table or logic array, i.e. they cannot validly occur when f=±0, as f and its implementation have matching kernels. However, when an RTZ implementation type is used (and step S904 hasn't been modified such that step S906 is performed if underflow occurs) then the lookup table or logic array does include the rows which can only occur due to underflow (as well as all of the other rows), and these cases do represent "valid" combinations of classifications of the $p_i$, $q_i$, $p_j$ and $q_j$ coordinates for the lookup table or logic array, i.e. they can validly occur when f=±0, as the kernel of the implementation of f is a strict superset of its own kernel. As described in examples above, the underflow flag is set during the determination of the 2D cross product if the 2D cross product is determined to be not exactly equal to zero, but is rounded to zero. Entries in the lookup table can be avoided for the RTZ examples by only invoking the watertightness behaviours if both the magnitude of w is zero and the underflow flag has not been set. In other words, in some examples, the ray may be determined to intersect a point on an edge if: (i) the 2D cross product of the positions of two projected vertices defining the edge has a magnitude of zero, and (ii) an underflow flag has not been set during the determination of the 2D cross product. In these examples, if the 2D cross product of the positions of two projected vertices defining the edge is determined to have a magnitude of zero but the underflow flag has been set during the determination of the 2D cross product then the ray is not determined to intersect a point on an edge, and the sign of w for the edge may be set to be equal to the sign of the 2D cross product (which is either +0 or –0).

For some of the rows of the lookup table or logic array the output value is denoted by 'X' indicating a "don't care" result. In these examples, the sign of w does not matter because a strictly convex polygon with such an edge cannot be intersected by the ray, e.g. because the ray does not pass on the inside of one of the other edges of the polygon. The case in which $p_i=q_i=p_j=q_j=0$ is not required: either a triangle polygon including such an edge is degenerate, so can be discarded, or such an edge of a higher order polygon can be identified, in order to exclude its sign from the intersection determination. In either case, it does not need to be included in the lookup table or logic array.

In step S912 the output from the lookup table or logic array indicating the sign of the w parameter is received at the polygon intersection testing unit(s) 114 of the intersection testing module 108. Then the method passes to step S314 which is described above, and the method continues.

The method describing that an intersection is determined only if the universal plane direction matches the winding direction of a shared edge ensures "non-redundant watertightness" when the polygons forming a mesh all have consistent winding orders, even on silhouette edges, and hence is denoted a "winding/orientation dependent" scheme, as mentioned earlier. The methods described with reference to FIGS. 4, 5 and 9, when used in conjunction with a sign-equality test in step S318, ensure "non-redundant watertightness" even when the polygons forming a mesh do not have consistent winding orders, but not on silhouette edges (where zero or double hits may occur), and hence is denoted a "winding/orientation independent" scheme. In some implementations it is safe to assume that the geometry (i.e. the polygons) will be submitted to the ray tracing system 100 with consistent winding orders, e.g. orientable surfaces. However, it is possible that polygons may be submitted to the ray tracing system 100 with inconsistent winding orders, e.g. non-orientable surfaces. In either situation "non-redundant watertightness" cannot be ensured, using any method, universally (i.e. with arbitrary winding and both on and off silhouette edges), as demonstrated by considering FIGS. 13a to 13d. However, by alternating between a "winding/orientation dependent" and "winding/orientation independent" scheme, we can select where zero and double hits occur, e.g. on or off the silhouette edge of the polygon mesh.

Figure 13A:
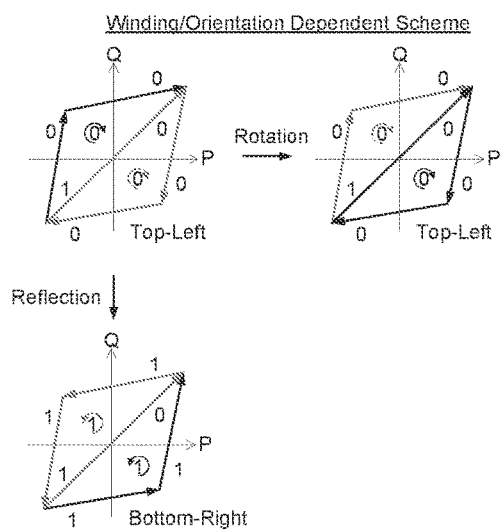
FIG. 13a illustrates a rotation and a reflection of a pair of polygons in a "winding/orientation dependent" scheme.
Figure 13B:
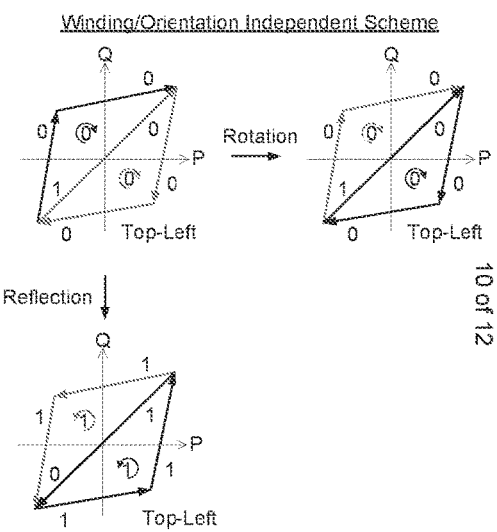
FIG. 13b illustrates a rotation and a reflection of a pair of polygons in a "winding/orientation independent" scheme.

For example, the differentiating functionality between a "winding/orientation dependent" scheme and a "winding/orientation independent" scheme is made clear in FIGS. 13a and 13b, which show three polygon pairs (colour-coded black/grey), projected onto the PQ plane, for both scheme types: FIG. 13a corresponds to a "winding/orientation dependent" scheme; FIG. 13b corresponds to a "winding/orientation independent" scheme. In FIGS. 13a and 13b a zero denotes clockwise and a one denotes anticlockwise, for both the perceived orientation of a polygon and the circulation of a directed edge. In each respective polygon pair, the directed edge going through the origin is considered clockwise when directed towards the right or precisely up and considered anticlockwise when directed towards the left or precisely down. This exhibits the behaviour of a "Left-Top Rule" for polygons with a clockwise orientation.

The first (i.e. top left) respective polygon pairs in both FIGS. 13a and 13b denote the default configuration: a ray intersecting a consistent shared edge (i.e., the edge has opposite winding direction in the two polygons sharing the edge) for two polygons with clockwise orientation. In this case the consistent shared edge is considered part of the bottom right polygon (the grey one) as all three edge booleans match for that polygon.

The second (i.e. top right) respective polygon pairs in both FIGS. 13a and 13b denote the configuration rotated by 180 degrees, with a ray still intersecting the same consistent shared edge. As a rotation has been applied, the two polygons still have a clockwise orientation and, in either mode, the consistent shared edge is still considered part of the bottom right polygon (now the black one) as all three edge booleans still match for that polygon.

The third (i.e. bottom left) respective polygon pairs in both FIGS. 13a and 13b denote the configuration reflecting along the consistent shared edge (e.g., when folding an edge so that it falls behind the silhouette), with a ray still intersecting that same consistent shared edge. As a reflection has been applied, the two polygons now have an anticlockwise orientation. In the "winding/orientation independent" watertightness scheme (shown in FIG. 13b), the consistent edge is still considered part of the bottom right polygon (now the black one) as all three edge booleans still match for that polygon (albeit with opposite value), so still exhibits the behaviour of a "Left-Top Rule". In the "winding/orientation dependent" watertightness scheme (shown in FIG. 13a), the consistent shared edge is now considered part of the top left polygon (now the grey one) as all three edge booleans now match for that polygon, so now exhibits the dual behaviour, i.e., that of a "Right-Bottom Rule".

The difference in behaviour between the two types of scheme (shown in FIGS. 13a and 13b) only comes into effect in the reflected case as the orientation of the polygons has changed. One behaviour can be achieved from the other by XORing (an involution) the on-edge edge booleans by the polygon orientation boolean (as described below).

Figure 13C:
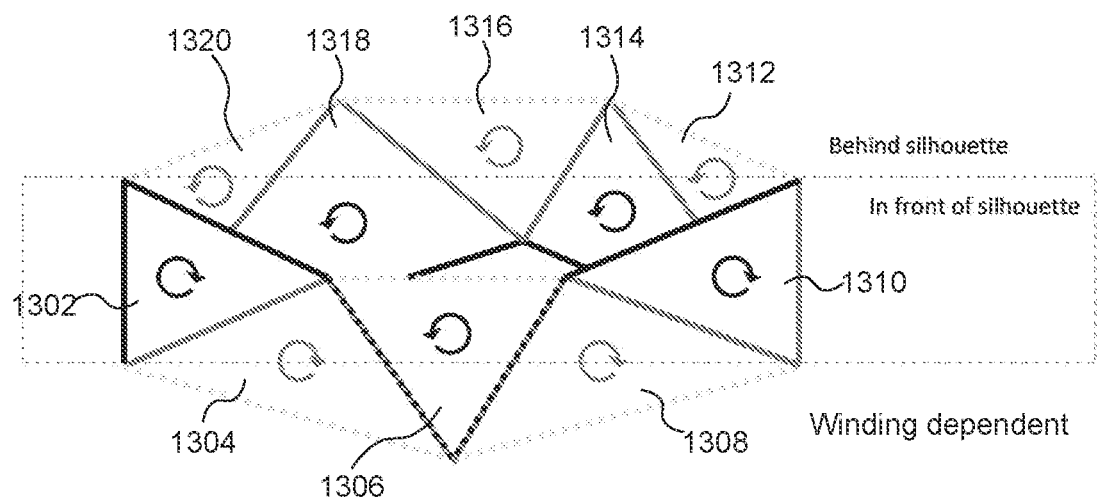
FIG. 13c shows a mesh of polygons forming a circular band with indications of which edges are considered to be part of which polygons in a "winding/orientation dependent" scheme.

FIG. 13c shows a mesh of polygons 1302 to 1320 forming a circular band (i.e. annulus) with indications, by appropriate shading, of which edges are considered to be part of each polygon in a "winding/orientation dependent" scheme (e.g. as described above with reference to the method where an intersection is determined only if the universal plane direction matches the winding direction of a shared edge). FIG. 13c is a view of the (unprojected) polygons from a viewpoint that is slightly above the camera's origin, for a camera firing primary rays away from its origin. From the camera's origin only primitives 1302 to 1310, denoted the front polygons, may be visible, whereas primitives 1312 to 1320, denoted the back polygons, may be occluded by the primitives in front of them. The silhouette boundary of the polygon mesh from the shown viewpoint is given by the boundary between the front and back polygons, i.e. the shared edge between polygons 1302 and 1320 and the shared edge between polygons 1310 and 1312. A clockwise orientation of a front polygon has consistent winding with an anticlockwise orientation of a back polygon, and an anticlockwise orientation of a front polygon (e.g., polygon 1306) would have consistent winding with a clockwise orientation of a back polygon (not shown in FIG. 13c). This can be appreciated by imagining rotating the band of polygons and considering how the orientation of each polygon changes as it transitions from being a front polygon (i.e. in front of the silhouette) to a back polygon (i.e. behind the silhouette) and vice versa. The winding order of each polygon can be inferred from its perceived orientation in FIG. 13c, and it can be seen that all of the polygons have a consistent winding order (i.e., each edge has opposite winding direction in the two polygons sharing the edge) except polygon 1306. The polygons are alternately colour coded grey or black for visual clarity only: the colour of a polygon is seen in FIG. 13c by the colour of the winding symbol in the interior of the polygon. When only a single hit occurs, a shared edge has a solid line of either black or grey to indicate which of the black polygon or the grey polygon sharing the edge would be hit by a ray precisely intersecting the shared edge. Note that the shared silhouette edge between polygons 1302 and 1320, and also the shared silhouette edge between polygons 1310 and 1312, returns single hits only. When no hit occurs, a dotted edge of a light grey colour indicates that no polygon shown in FIG. 13c would be hit by a ray precisely intersecting the edge. When a double hit occurs, a shared edge has a dotted line of both black and grey to indicate that both the black polygon and the grey polygon sharing the edge would be hit by a ray precisely intersecting the shared edge. For example, due to the inconsistent winding order of polygon 1306 relative to the other polygons, for the inconsistent shared edge between polygons 1304 and 1306, both of the polygons will be determined to be hit by a ray precisely intersecting the shared edge. Similarly, for the inconsistent shared edge between polygons 1306 and 1308, both of the polygons will be determined to be hit by a ray precisely intersecting the shared edge. In other examples, not shown in FIG. 13c, zero hits may occur on shared edges in the interior (i.e. not on the silhouette boundary) of a polygon mesh due to inconsistent winding. Double/zero hits can cause rendering redundancies/artefacts, respectively, at positions on such shared edges for a "winding/orientation dependent" scheme.

The occurrence of such rendering redundancies/artefacts described in the previous example (which may occur due to inconsistent winding orders of the polygons forming a mesh) cannot be universally removed, but they can be relocated so that they occur only at the silhouette edges of a mesh of polygons. Visual artefacts at the silhouette edges of geometry in a rendered image are less noticeable to a viewer of the rendered image than visual artefacts in the middle of an object which may, for example in the instance of zero hits, give the appearance of the object having a hole in it, such that a background colour or occluded geometry can be seen through the object. Although visual artefacts are ameliorated, rendering redundancies, in the form or double hits, still occur. Therefore, overall, it can be preferable to move the possible rendering artefacts to the silhouette edges. This can be achieved in a winding/orientation independent scheme (such as the methods described with reference to FIGS. 4, 5 and 9), which is described with reference to FIG. 13d.

Figure 13D:
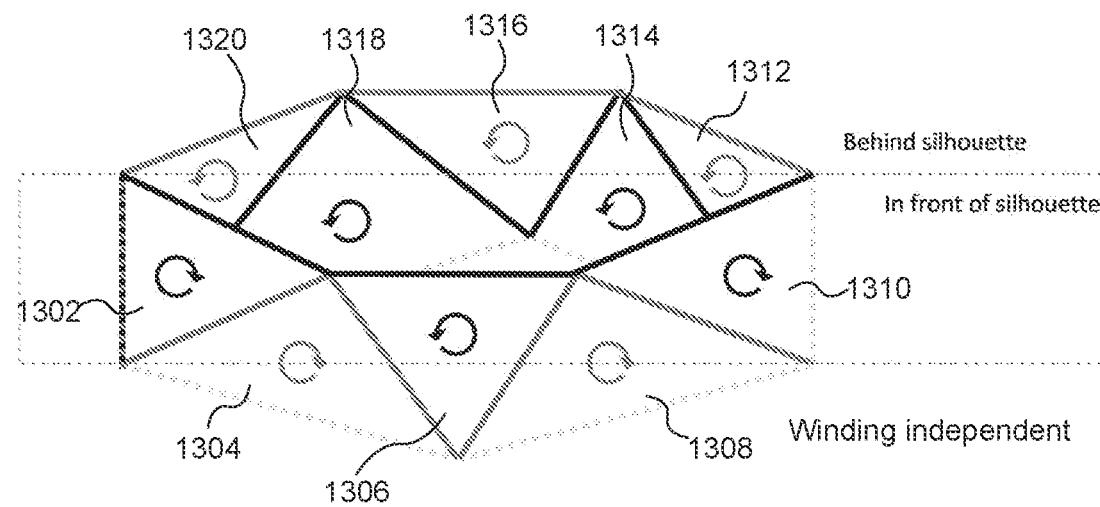
FIG. 13d shows a mesh of polygons forming a circular band with indications of which edges are considered to be part of which polygons in a "winding/orientation independent" scheme.

FIG. 13d shows the same mesh of polygons as those shown in FIG. 13c, which form a circular band (i.e. annulus) with indications, by appropriate shading, of which edges are considered to be part of each polygon in a "winding/orientation independent" scheme. To modify a "winding/orientation dependent" scheme to a "winding/orientation independent" scheme, the same methods can be used for intersection testing, but with the addition of a post-processing XOR operation on the sign of the w parameter, by the sign of the w parameter of another edge of the convex polygon, when the ray intersects a point on an edge of a polygon (i.e. when f=±0). For example, if the ray is determined to intersect a point on an edge of a convex polygon then, between steps S314 and S318, there is an additional step performing an XOR operation using: (i) the sign of the signed parameter, w, for the edge such that f=±0 and (ii) the sign of the signed parameter, w, for an edge such that f≠±0, indicating the perceived orientation of the convex polygon. Note that, for any nondegenerate convex polygon (i.e., with nonzero projected area), there exists at least one edge such that f is not equal to zero (otherwise the projected area of the convex polygon would be zero, being a sum of zeros). The sign of the signed parameter, w, being 0 could be used to indicate a clockwise orientation of a convex polygon, and the sign of the signed parameter, w, being 1 could be used to indicate an anticlockwise orientation of a convex polygon (or vice versa). The result of the XOR operation can be used as the sign bit of the w parameter, which can then be used in the determination of whether the ray intersects the convex polygon (e.g., by checking that the signs of all edges of a convex polygon are equal). By moving double/zero hits to the silhouette boundary of a polygon mesh, this ensures "non-redundant watertightness" within the interior of a mesh of polygons, even if the winding orders of the polygons are inconsistent. However, it can result in a lack of "non-redundant watertightness", e.g., double/zero hits, on a silhouette edge of the mesh of polygons, regardless of the winding orders of the two polygons sharing the silhouette edge. For example, in FIG. 13d there are no rendering artefacts within the interior (i.e. not on the silhouette boundary) of the mesh of polygons (e.g. no rendering artefacts on the edges of polygon 1306 even though it has an inconsistent winding order relative to the other polygons). However, on the left silhouette shared edge (i.e. the edge shared by polygons 1302 and 1320) both of the polygons 1302 and 1320 will be determined to be hit by a ray precisely intersecting the shared edge, as indicated by the black and grey shading of the dotted line. On the right silhouette shared edge (i.e. the edge shared by polygons 1310 and 1312) neither of the polygons 1310 and 1312 will be determined to be hit by a ray precisely intersecting the shared edge, as indicated by the light grey shading of the dotted line. Both behaviours occur even though polygons 1302, 1310, 1312 and 1320 have consistent winding orders. However, in some applications, it is in fact desirable for a pair of intersections to occur through any convex object (e.g. in refraction) so that an entry and exit point are defined. In this case, the winding independent scheme guarantees the desired behaviour, whereas the winding dependent scheme does not.

The post-processing XOR operation, being an involution, can be used both to transform a "winding/orientation dependent" scheme into a "winding/orientation independent" scheme and to transform a "winding/orientation independent" scheme into a "winding/orientation dependent" scheme. Hence, this technique can be used to convert the method, where an intersection occurs only if the universal plane direction matches the winding direction of a shared edge, into a "winding/orientation independent" scheme, and also used to convert the methods as described above with reference to FIGS. 4, 5 and 9 into a "winding/orientation dependent scheme".

In some examples of a "winding/orientation independent" scheme (e.g., the methods as described above with reference to FIGS. 4, 5 and 9), a ray is determined to intersect a convex polygon if and only if the sign of the w parameter is equal for all edges of the convex polygon. E.g., for a triangle polygon, we have an intersection if and only if $sgn(w_0)=sgn(w_1)=sgn(w_2)$ for signed parameters $w_0$, $w_1$ and $w_2$, corresponding to the three edges of the triangle. After modifying the scheme to be "winding dependent", if $w_0$ is the signed parameter of an on-edge case (i.e., f=±0) and $w_1$ is the signed parameter of an off-edge case (i.e., f≠±0) then, with the post-processing XOR operation, the intersection determination becomes $sgn(w_0) \oplus sgn(w_1)=sgn(w_1)=sgn(w_2)$. This is satisfied only if $sgn(w_0)=0$. In other words, for an intersection to occur, the sign of the signed parameter $w_0$ for the on-edge case must be 0, regardless of the sign of the signed parameter of any other edge. In this scenario, the intersection logic can be re-expressed as $(sgn(w_0)=0) \wedge (sgn(w_1)=sgn(w_2))$. If instead, for an intersection to occur, the sign of the signed parameter $w_0$ must be 1 then the "winding dependent" scheme exhibits the reverse tie-breaking behaviour for on-edge cases. Note that this is consistent with the intersection criterion described earlier that treats edge intersections as special cases, in place of the simple sign-equality test. Here we have described a method to reconcile the two approaches with a flexible over-arching scheme.

By augmenting the on-edge signs by the sign of the polygon (denoting its perceived orientation) in the "winding/orientation dependent" scheme, the tie-breaking behaviour reverses between a polygon with a sign of 0 and a polygon with a sign of 1. The eight characterisations of the tie-breaking behaviour split into four pairs: "Top-Left Rule" and "Bottom-Right Rule", "Top-Right Rule" and "Bottom-Left Rule", "Left-Top Rule" and "Right-Bottom Rule", and "Right-Top Rule" and "Left-Bottom Rule". One member of each of these tie-break behaviour pairs corresponds to a polygon with a sign of 0, and the other to a polygon with a sign of 1. This is demonstrated in FIG. 13c where a "Right-Bottom Rule" applies to polygon 1306, whereas a "Left-Top Rule" applies to all other polygons.

In summary, if consistent winding orders of polygons are expected (or even guaranteed) to be submitted, e.g., orientable surfaces, e.g., an annulus, then the "winding/orientation dependent" scheme may be preferable, whereas if inconsistent winding orders of polygons are expected (or even impossible to avoid) to be submitted, e.g., non-orientable surfaces, e.g., a Mobius band, then the "winding/orientation independent" scheme may be preferable.

Figure 14:
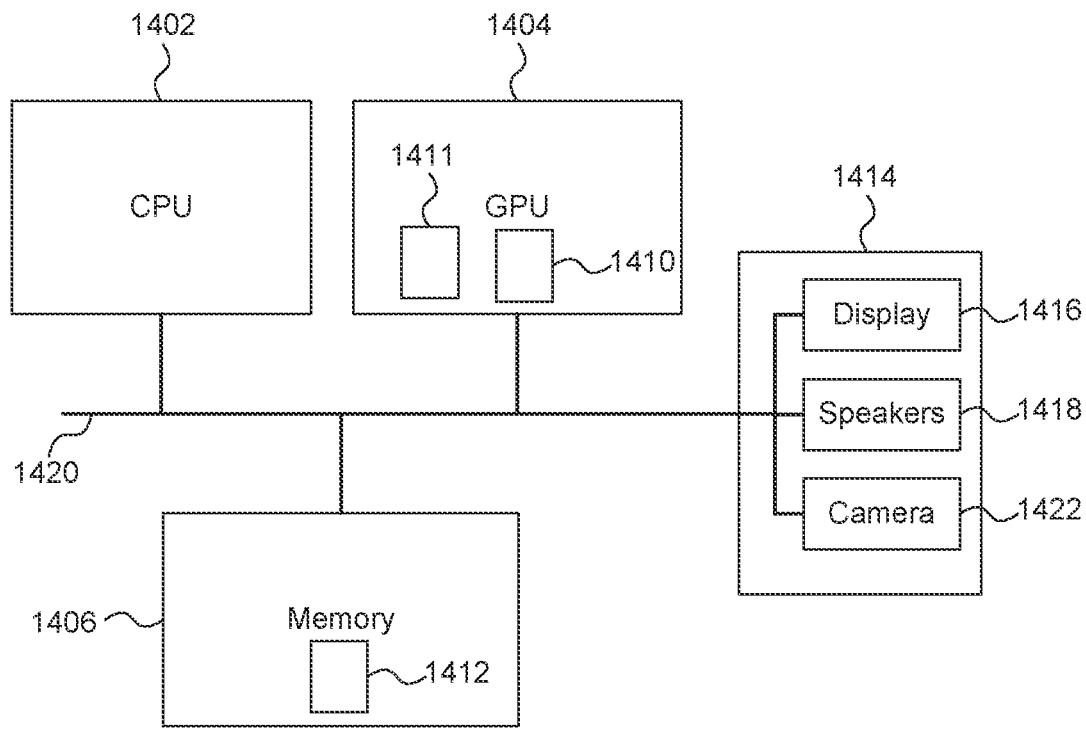
FIG. 14 shows a computer system in which a ray tracing system is implemented.

FIG. 14 shows a computer system in which the ray tracing systems described herein may be implemented. The computer system comprises a CPU 1402, a GPU 1404, a memory 1406 and other devices 1414, such as a display 1416, speakers 1418 and a camera 1422. A ray tracing unit 1410 (corresponding to ray tracing unit 102) is implemented on the GPU 1404, as well as a Neural Network Accelerator (NNA) 1411. In other examples, the ray tracing unit 1410 may be implemented on the CPU 1402 or within the NNA

1411 or as a separate processing unit in the computer system. The components of the computer system can communicate with each other via a communications bus 1420. A store 1412 (corresponding to memory 104) is implemented as part of the memory 1406.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The intersection testing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing module configured to perform any of the methods described herein, or to manufacture an intersection testing module comprising any apparatus described herein. An integrated circuit definition dataset may be, for example, an integrated circuit description.

Therefore, there may be provided a method of manufacturing, at an integrated circuit manufacturing system, an intersection testing module as described herein. Furthermore, there may be provided an integrated circuit definition dataset that, when processed in an integrated circuit manufacturing system, causes the method of manufacturing an intersection testing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing module will now be described with respect to FIG. 15.

Figure 15:
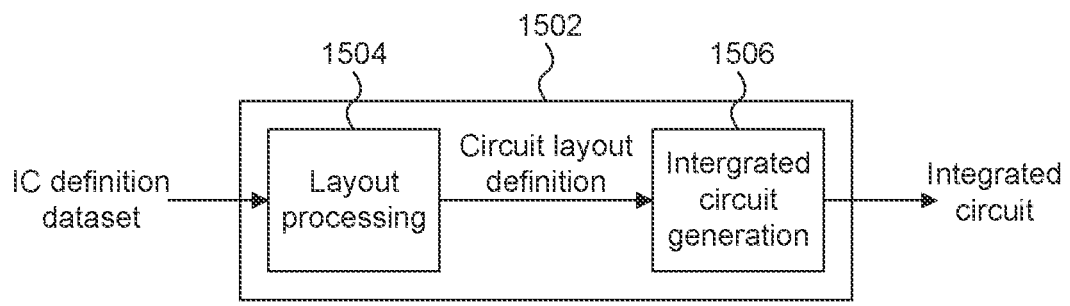
FIG. 15 shows an integrated circuit manufacturing system for generating an integrated circuit embodying a ray tracing system.

FIG. 15 shows an example of an integrated circuit (IC) manufacturing system 1502 which is configured to manufacture an intersection testing module as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining an intersection testing module as described in any of the examples herein), process the IC definition dataset, and generate an IC according to the IC definition dataset (e.g. which embodies an intersection testing module as described in any of the examples herein). The processing of the IC definition dataset configures the IC manufacturing system 1502 to manufacture an integrated circuit embodying an intersection testing module as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing intersection testing of a ray with a convex polygon in a ray tracing system, wherein the ray and the convex polygon are defined in a 3D space using a space-coordinate system, and wherein the ray is defined with a ray origin and a ray direction, the method comprising:

using a ray-coordinate system to perform intersection testing, wherein the ray-coordinate system has an origin at the ray origin, and wherein the ray-coordinate system has three basis vectors, wherein a first of the basis vectors is aligned with the ray direction; and wherein a second and a third of the basis vectors: (i) are both orthogonal to the first basis vector, (ii) are not parallel with each other, and (iii) have a zero as one component when expressed in the space-coordinate system; and outputting a result of performing the intersection testing for use by the ray tracing system.

2. The method of claim 1, further comprising translating vertices defining the convex polygon, for use in performing the intersection testing, by subtracting the ray origin from the positions of the vertices defining the convex polygon.

3. The method of claim 1, wherein the second and the third of the basis vectors of the ray-coordinate system have a value of ±1 as one component when expressed in the space-coordinate system.

4. The method of claim 1, wherein the first basis vector, S, when expressed with components of the space-coordinate system is $S=A(D_x,D_y,D_z)$, wherein the second basis vector, P, when expressed with components of the space-coordinate system is P=B(D$_z$, 0,−D$_x$); and wherein the third basis vector, Q, when expressed with components of the space-coordinate system is Q=C(0, D$_z$,−D$_y$);

wherein D$_x$, D$_y$ and D$_z$ are components of the ray direction in the space-coordinate system and A, B and C are scalar values.

5. The method of claim 4, wherein B is a simplified fraction with D$_x$ in its denominator, and C is a simplified fraction with D$_y$ in its denominator.

6. The method of claim 3, wherein the first basis vector, S, when expressed with components of the space-coordinate system is S=A(D$_x$,D$_y$,D$_z$), wherein the second basis vector, P, when expressed with components of the space-coordinate system is $$P = \left(\pm 1, 0, \mp \frac{D_x}{D_z}\right);$$

and wherein the third basis vector, Q, when expressed with components of the space-coordinate system is $$Q = \left(0, \pm 1, \mp \frac{D_y}{D_z}\right);$$

wherein D$_x$, D$_y$ and D$_z$ are components of the ray direction in the space-coordinate system and A is a scalar value.

7. The method of claim 3, wherein the first basis vector, S, when expressed with components of the space-coordinate system is S=A(D$_x$,D$_y$,D$_z$), wherein the second basis vector, P, when expressed with components of the space-coordinate system is $$P = \left(\pm \frac{D_z}{D_x}, 0, \mp 1\right);$$

and wherein the third basis vector, Q, when expressed with components of the space-coordinate system is $$Q = \left(0, \pm \frac{D_z}{D_y}, \mp 1\right);$$

wherein D$_x$, D$_y$ and D$_z$ are components of the ray direction in the space-coordinate system and A is a scalar value.

8. The method of claim 1, wherein the first basis vector, S, when expressed with components of the space-coordinate system is S=A(D$_x$,D$_y$,D$_z$), wherein the second basis vector, P, when expressed with components of the space-coordinate system is $$P = \left(\pm \frac{1}{D_x}, 0, \mp \frac{1}{D_z}\right);$$

and wherein the third basis vector, Q, when expressed with components of the space-coordinate system is $$Q = \left(0, \pm \frac{1}{D_y}, \mp \frac{1}{D_z}\right);$$

wherein D$_x$, D$_y$ and D$_z$ are components of the ray direction in the space-coordinate system and A is a scalar value.

9. The method of claim 1, wherein the first basis vector, S, when expressed with components of the space-coordinate system is S=A(D$_x$,D$_y$,D$_z$), wherein the second basis vector, P, when expressed with components of the space-coordinate system is P=(±D$_z$, 0,∓D$_x$); and wherein the third basis vector, Q, when expressed with components of the space-coordinate system is Q=(0, ±D$_z$,∓D$_y$);

wherein D$_x$, D$_y$ and D$_z$ are components of the ray direction in the space-coordinate system and A is a scalar value.

10. The method of claim 4, wherein $$A = \frac{1}{|D_z|}.$$

11. The method of claim 1, further comprising transforming the ray and the convex polygon from the space-coordinate system into the ray-coordinate system, wherein the intersection testing is performed in the ray-coordinate system.

12. The method of claim 1, wherein the intersection testing is performed using fixed function circuitry, and optionally wherein the fixed function circuitry comprises one or more multiply-and-add components for performing multiplications and additions using the second and third basis vectors of the ray-coordinate system.

13. The method of claim 1, further comprising selectively permuting the components of the ray and the vertices defining the convex polygon, such that |D$_z$|≥|D$_x$| and |D$_z$|≥|D$_y$|, before performing intersection testing of the ray with the convex polygon.

14. The method of claim 1, further comprising selectively reversing the components of the ray and the vertices defining the convex polygon, such that D$_x$≥0, D$_y$≥0 and D$_z$≥0, before performing intersection testing of the ray with the convex polygon.

15. The method of claim 13, further comprising storing a mapping indication of whether the mapping from the space-coordinate system to the ray-coordinate system affects the perceived polygon orientation, wherein the mapping indication is used to perform said intersection testing of the ray with the convex polygon.

16. The method of claim 1, wherein values of at least one of:

$$\frac{D_x}{D_z} \text{ and } \frac{D_y}{D_z}, \quad \text{(i)}$$

$$\frac{D_z}{D_x} \text{ and } \frac{D_z}{D_y}, \quad \text{(ii)}$$

$$\frac{1}{D_x} \text{ and } \frac{1}{D_y}, \text{ and} \quad \text{(iii)}$$

$$\frac{1}{D_z} \qquad \text{(iv)}$$

or $D_z$, are pre-computed for the ray and stored in a store, wherein the method comprises reading the stored values from the store for use in performing intersection testing.

17. The method of claim 1, wherein the outputted result is used in the ray tracing system for rendering an image of a 3D scene.

18. A method of performing intersection testing of a ray with a convex polygon in a ray tracing system, wherein the ray and the convex polygon are defined in an n-dimensional space using a space-coordinate system, wherein n≥3, and wherein the ray is defined with a ray origin and a ray direction, the method comprising:
    using a ray-coordinate system to perform intersection testing, wherein the ray-coordinate system has an origin at the ray origin, and wherein the ray-coordinate system has n basis vectors,
        wherein a first of the basis vectors is aligned with the ray direction,
        wherein (n−1) of the basis vectors are orthogonal to the first basis vector,
        wherein no pairing of the (n−1) basis vectors are parallel with each other, and
        wherein the (n−1) basis vectors have zeros for (n−2) components when expressed in the space-coordinate system; and
    outputting a result of performing the intersection testing for use by the ray tracing system.

19. An intersection testing module, for use in a ray tracing system, configured to perform intersection testing of a ray with a convex polygon, wherein the ray and the convex polygon are defined in a 3D space using a space-coordinate system, and wherein the ray is defined with a ray origin and a ray direction, the intersection testing module being configured to:
    use a ray-coordinate system to perform intersection testing, wherein the ray-coordinate system has an origin at the ray origin, and wherein the ray-coordinate system has three basis vectors,
        wherein a first of the basis vectors is aligned with the ray direction; and
        wherein a second and a third of the basis vectors: (i) are both orthogonal to the first basis vector, (ii) are not parallel with each other, and (iii) have a zero as one component when expressed in the space-coordinate system; and
    output a result of performing the intersection testing for use by the ray tracing system.

20. The intersection testing module of claim 19, wherein the first basis vector, S, when expressed with components of the space-coordinate system is $S=A(D_x,D_y,D_z)$,
    wherein the second basis vector, P, when expressed with components of the space-coordinate system is $P=B(D_z, 0, -D_x)$; and
    wherein the third basis vector, Q, when expressed with components of the space-coordinate system is $Q=C(0, D_z, -D_y)$;
    wherein $D_x$, $D_y$ and $D_z$ are components of the ray direction in the space-coordinate system, A is a scalar value, and either:

$$B = \pm \frac{1}{D_x} \text{ and } C = \pm \frac{1}{D_y}, \text{ or} \qquad \text{(i)}$$

$$B = \pm \frac{1}{D_z D_x} \text{ and } C = \pm \frac{1}{D_z D_y}. \qquad \text{(ii)}$$

\* \* \* \* \*

UNITED STATES PATENT AND TRADEMARK OFFICE
CERTIFICATE OF CORRECTION

PATENT NO. : 11,682,161 B2
APPLICATION NO. : 17/700377
DATED : June 20, 2023
INVENTOR(S) : Peter Smith-Lacey et al.

It is certified that error appears in the above-identified patent and that said Letters Patent is hereby corrected as shown below:

In the Specification

Column 81, Claim 7, Line 42, please replace:

$P = \left(\pm \frac{D_z}{D_x}, 1, \pm 0\right)$

With:

-- $P = \left(\pm \frac{D_z}{D_x}, 0, \mp 1\right)$ --

Column 81, Claim 7, Line 51, please replace:

$Q = \left(1, \pm \frac{D_z}{D_y}, \pm 0\right)$

With:

-- $Q = \left(0, \pm \frac{D_z}{D_y}, \mp 1\right)$ --

Signed and Sealed this
Eighth Day of October, 2024

Katherine Kelly Vidal
*Director of the United States Patent and Trademark Office*